US009910246B2

(12) United States Patent
Zohrabyan et al.

(10) Patent No.: US 9,910,246 B2
(45) Date of Patent: Mar. 6, 2018

(54) IN-FLIGHT AUTO FOCUS METHOD AND SYSTEM FOR TUNABLE LIQUID CRYSTAL OPTICAL ELEMENT

(71) Applicant: LensVector Inc., Sunnyvale, CA (US)

(72) Inventors: Armen Zohrabyan, Quebec (CA); Tigran Galstian, Quebec (CA); Karen Asatryan, Quebec (CA); Vladimir Presniakov, Quebec (CA); Marco Thiboutot, Quebec (CA); Aram Bagramyan, Quebec (CA); Amir Tork, Quebec (CA); Jeffrey James Parker, Millis, MA (US); Ted Cooper, Sunnyvale, CA (US); Behzad Khodadad, Los Altos, CA (US); Gongjian Hu, Marina, CA (US); Chong I Cheang, San Jose, CA (US)

(73) Assignee: LENSVECTOR INC., Sunnyvale, CA (US)

(*) Notice: Subject to any disclaimer, the term of this patent is extended or adjusted under 35 U.S.C. 154(b) by 58 days.

(21) Appl. No.: 15/196,421

(22) Filed: Jun. 29, 2016

(65) Prior Publication Data

US 2016/0377830 A1 Dec. 29, 2016

Related U.S. Application Data

(63) Continuation of application No. 14/680,513, filed on Apr. 7, 2015, now Pat. No. 9,405,093, which is a
(Continued)

(51) Int. Cl.
*H04N 5/232* (2006.01)
*G02B 7/36* (2006.01)
(Continued)

(52) U.S. Cl.
CPC ............... *G02B 7/36* (2013.01); *G02B 7/38* (2013.01); *G02F 1/1347* (2013.01);
(Continued)

(58) Field of Classification Search
CPC ...................................... G02F 1/1347
(Continued)

(56) References Cited

U.S. PATENT DOCUMENTS 6,166,784 A    12/2000   Murata et al.
7,683,975 B2    3/2010   Kageyama
(Continued)

FOREIGN PATENT DOCUMENTS

WO    2009153764 A2    12/2009

OTHER PUBLICATIONS

PCT/CA2011/050651 2nd international search report.
(Continued)

*Primary Examiner* — Joel Fosselman
(74) *Attorney, Agent, or Firm* — J-Tek Law PLLC; Jeffrey D. Tekanic; Scott T. Wakeman

(57) ABSTRACT

An auto-focus system employing a tunable liquid crystal lens is provided that collects images at different optical power values as the liquid crystal molecules are excited between a ground state and a maximum optical power state tracking image focus scores. An image is acquired at a desired optical power value less than maximum optical power established with the liquid crystal molecules closer a fully excited state than the maximum optical power state having the same image focus score. This drive signal employed during image acquisition uses more power than was used to achieve the same optical power value during the auto-focus scan, while actively driving the liquid crystal molecules is fast. A pause due to image transfer/processing delays after acquisition is employed to allow slow relaxation
(Continued)

of the liquid crystal molecules back to the ground state in preparation for a subsequent focus search.

23 Claims, 39 Drawing Sheets

Related U.S. Application Data continuation of application No. 13/822,911, filed as application No. PCT/CA2011/050651 on Oct. 14, 2011, now Pat. No. 9,030,595.

(60) Provisional application No. 61/473,118, filed on Apr. 7, 2011, provisional application No. 61/424,946, filed on Dec. 20, 2010, provisional application No. 61/393,268, filed on Oct. 14, 2010.

(51) Int. Cl.
*G02B 7/38* (2006.01)
*G02F 1/1347* (2006.01)
*G02F 1/29* (2006.01)
*G03B 3/10* (2006.01)
*G02F 1/1337* (2006.01)
*G02F 1/1343* (2006.01)

(52) U.S. Cl.
CPC .... *G02F 1/13439* (2013.01); *G02F 1/133784* (2013.01); *G02F 1/29* (2013.01); *G03B 3/10* (2013.01); *H04N 5/23212* (2013.01); *G02F 2001/294* (2013.01)

(58) Field of Classification Search
USPC .............................................. 348/349; 349/36
See application file for complete search history.

(56) References Cited

U.S. PATENT DOCUMENTS

| 7,986,178 | B2 | 7/2011 | Lynch |
| 8,629,932 | B2 | 1/2014 | Galstian et al. |
| 9,429,799 | B2* | 8/2016 | Galstian ............ G02F 1/134309 |
| 2005/0225877 | A1 | 10/2005 | Tang |
| 2007/0268417 | A1 | 11/2007 | Kato et al. |
| 2007/0279365 | A1 | 12/2007 | Kageyama |
| 2007/0279539 | A1 | 12/2007 | Suzuki et al. |
| 2008/0088756 | A1 | 4/2008 | Tseng et al. |
| 2008/0225404 | A1 | 9/2008 | Tang |
| 2008/0239136 | A1 | 10/2008 | Kanai et al. |
| 2009/0021823 | A1 | 1/2009 | Heim et al. |
| 2009/0128922 | A1 | 5/2009 | Justis et al. |
| 2009/0213321 | A1 | 8/2009 | Galstian et al. |
| 2010/0039532 | A1 | 2/2010 | Galstian et al. |
| 2011/0109824 | A1 | 5/2011 | Galstian |
| 2011/0216257 | A1 | 9/2011 | Galstian et al. |
| 2013/0314632 | A1* | 11/2013 | Zohrabyan ................ G02F 1/29 349/36 |

OTHER PUBLICATIONS

PCT/CA2011/050651 2nd written opinion.
PCT/CA2011/050651 first international search report.
PCT/CA2011/050651 first written opinion.

* cited by examiner

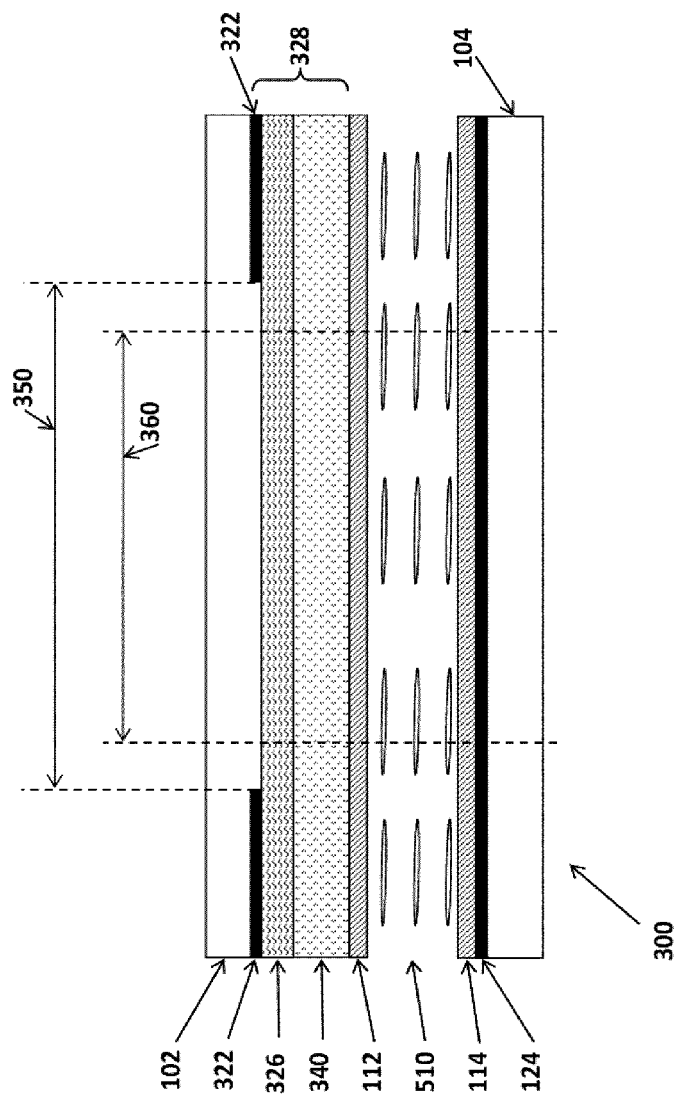

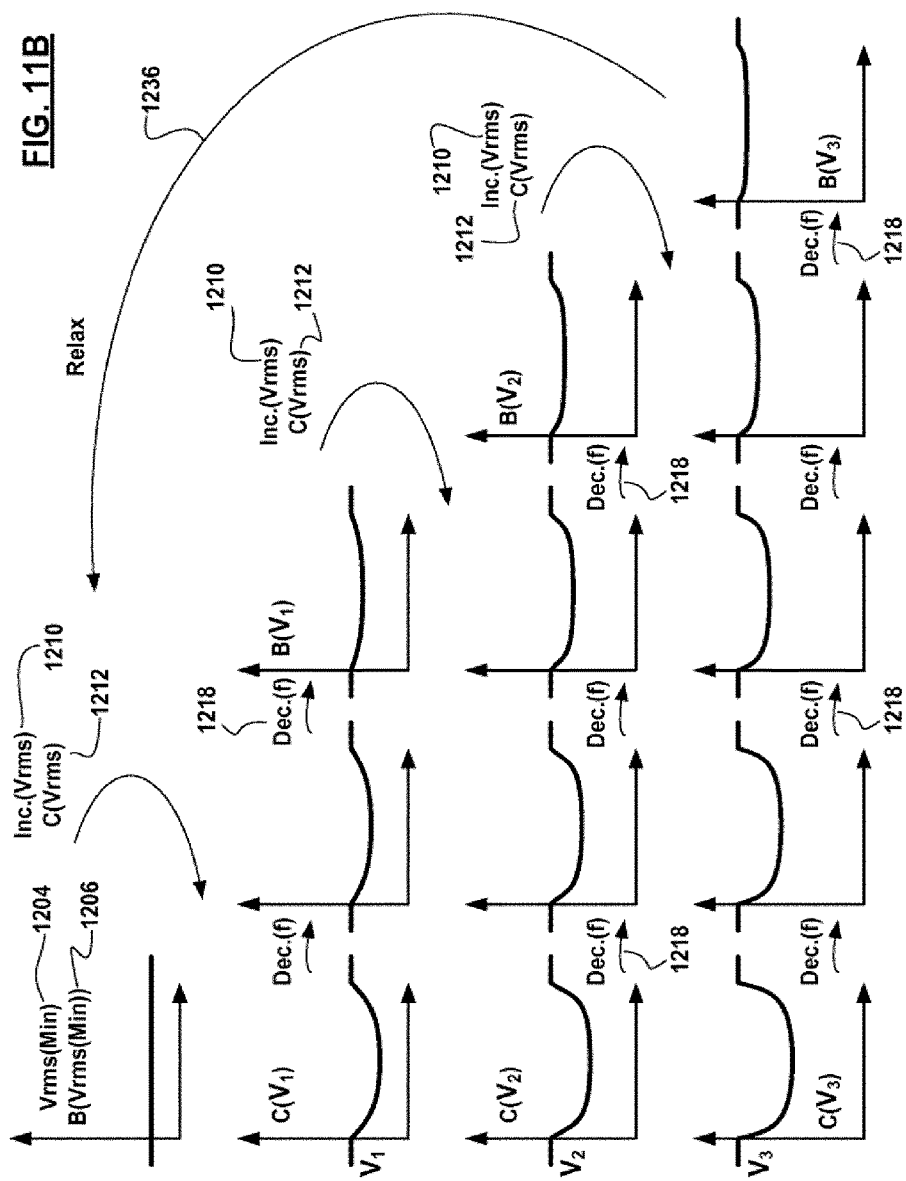

IN-FLIGHT AUTO FOCUS METHOD AND SYSTEM FOR TUNABLE LIQUID CRYSTAL OPTICAL ELEMENT

REFERENCE TO RELATED APPLICATIONS

This application is a continuation of U.S. patent application Ser. No. 14/680,513, filed Apr. 7, 2015, which is a continuation of U.S. patent application Ser. No. 13/822,911, filed Sep. 25, 2013, now U.S. Pat. No. 9,030,595, which is a U.S. National Stage of PCT/CA2011/050651, filed Oct. 14, 2011, which claims priority from U.S. Provisional Patent Application Ser. No. 61/424,946, filed Dec. 20, 2010; and U.S. Provisional Patent Application Ser. No. 61/393,268, filed Oct. 14, 2010; and U.S. Provisional Patent Application Ser. No. 61/473,118, filed Apr. 7, 2011, all of which are incorporated herein by reference.

TECHNICAL FIELD

The present invention relates generally to electrically tunable optical devices and, more particularly, to liquid crystal optical elements having an adjustable optical characteristic employed in focusing a scene image on a sensor.

BACKGROUND

Tunable Liquid Crystal (TLC) optical devices are described, for example, in related International Patent Application WO/2007/098602, which claims priority from U.S. Provisional Patent Application Ser. No. 60/778,380, filed Mar. 3, 2006, both of which are incorporated herein by reference. TLC optical devices are typically flat multi-layered structures having at least one Liquid Crystal (LC) layer. The liquid crystal layer has a variable refractive index which changes in response to an electromagnetic field applied thereto. In general, TLC's are said to have an index of refraction which varies as a function of an applied drive signal producing the electromagnetic field. Applying a non-uniform (spatially modulated) electromagnetic field to such liquid crystal layer, provides a liquid crystal layer with a non-uniform (spatially modulated) index of refraction. Moreover, liquid crystal refractive index variability is responsive to a time variable electric field and the liquid crystal layer exhibits negligible to non-measurable hysteresis with respect to achievable optical parameters given sufficient time. This is a significant advantage over many other autofocus systems, including most mechanical systems, because the TLC will attain the same stable optical parameter level no matter from which direction that level is approached (i.e. no matter from what optical parameter level the TLC starts to change, whether it be lower or greater), and regardless of any previous optical parameter changes. This means that once an optical parameter level is passed, no excessive amount of "backtracking" in terms of control is necessary (e.g. given sufficient time, there is no need for "reset" so that optical parameter changes can proceed to a targeted level).

The nature of the variability of the index of refraction in response to an applied electromagnetic field depends on the physical properties of TLC multi-layered structure, including properties of the liquid crystal layer material, geometry, etc. A quasi-linear "functional" relationship between the drive signal applied and the index of refraction of a TLC optical device exists over a usable drive signal variability range. However, the overall relationship is non-linear: In some TLC devices, an abrupt change in liquid crystal orientation, known as disclination, is observed as the liquid crystal molecules begin to align with the electric field from a ground state orientation to an orientation dictated by the applied field. In broad terms, when the applied field is essentially homogenous, non-linearity means that the change in optical property (e.g. index of refraction) per unit drive signal change varies over the range of optical property change of the optical device.

A multitude of optical devices may include a TLC optical device. For example, with an appropriate geometry a tunable lens, a beam steering device, an optical shutter, etc. may be built. A Tunable Liquid Crystal Lens (TLCL) provides a lensing effect by creating regions of differing indices of refraction in the liquid crystal layer when subjected to an electromagnetic stimulus, for example creating a Gradient Index Lens.

Tunable lenses employing a TLC optical device offer the advantage of being thin and compact. Factors such as thickness and size are important in certain applications, such as in the case of handheld equipment including, but not limited to: mobile telephone cameras, inspection equipment, etc. The performance of TLC lenses may be measured by a multitude of parameters, including: a tunable focus range, optical power (diopter) range, a level of aberration, an auto-focusing speed, power consumption, etc.

Different approaches have been proposed for providing tunable liquid crystal lenses, for example:

A notable prior art experimental attempt at providing a TLC lens is Naumov et al., "Liquid-Crystal Adaptive Lenses With Modal Control" Optics Letters, Vol. 23, No. 13, p. 992, Jul. 1, 1998, which describes a one hole-patterned layered structure defined by a non-conductive center area of an electrode covered by a transparent high resistivity layer. With reference to FIG. 1A, TLC 100 includes: top 102 and bottom 104 substrates, and a middle Liquid Crystal (LC) layer 110 sandwiched between top 112 and bottom 114 liquid crystal orienting layers. LC orienting layers 112/114 include polyimide coatings rubbed in a predetermined direction to align LC molecules in a ground state, namely in the absence of any controlling electric field. The predetermined orientation angle of LC molecules in the ground state is referred to herein as the pre-tilt angle. The average orientation of long liquid crystal molecular axes in a liquid crystal layer is referred to as a director. An electric field is applied to the LC layer 110 using a uniform bottom transparent conductive electrode layer 124 of Indium Tin Oxide (ITO), and the top hole-patterned conductive ring electrode layer 122 of Aluminum (Al). The low resistivity hole-patterned conductive layer 122 together with the high resistivity layer 126 immediately below the hole-patterned conductive layer 122 form an electric field shaping control layer 128. In accordance with Naumov's approach, the reactive impedance of the LC layer 110 which has capacitance and the complex impedance of the high resistivity layer 126 play a strong role, requiring driving the TLCL via specific voltage and frequency parameter pairs to minimize root means square deviation from a parabolic phase retardation profile for corresponding desired optical power settings (transfer function) to gradually spatially shape (spatially modulate) the applied electrical field otherwise spanning between the uniform bottom transparent electrode 124 and the hole-patterned top electrode 122.

Unfortunately, from a manufacturing perspective it is very difficult to re-produce the required sheet resistance of high resistivity material with high optical transparency for the highly resistive layer 126, and therefore in practice it is very difficult to re-produce a TLCL in accordance with the geometry described by Naumov. The manufacturing process typically suffers from a very low yield. Different TLCL's of the same manufacturing batch have slightly different resistances. Such sheet resistance variability coupled with the fact that control is very dependent on the precise LC cell thickness, leads to each individual TLC lens requiring separate calibration and drive. Also, the minimum diameter of such a TLC lens is limited to about 2 mm—below this size the required resistivity of the ITO layer exceeds some 10 MΩ/sq.

Another notable prior art experimental attempt at providing a TLC lens is Sato et al., "Realization of Liquid Crystal Lens of Large Aperture and Low Driving Voltages Using Thin Layer of Weakly Conductive Material", Optics Express, Vol. 16, No. 6, p. 4302, 17 Mar. 2008, which describes a layered structure 200 having three flat electrodes in two groups, as shown in FIG. 1B. Two patterned electrodes form one group, and a single uniform electrode forms the other group. Compared to Naumov, Sato describes an additional transparent disc-shaped electrode used to provide relatively uniform electrical fields across the LC layer 110 when needed and a weakly conductive layer (WCL). Electric field shaping control layer 228 differs from that of Naumov in that the top substrate 202 and the top electrode 222/230 (group) are present in reverse order. The top electrode group includes distinct electrodes 222 and 230 in an inter-hole pattern formed in the same plane. Electrode 222 is a hole-patterned ring electrode of conductive Al, while the center electrode 230 in the top group is a fixed disk-shaped transparent conductive layer of ITO. Two drive signals U_ring and U_disk are employed. The role of the hole-patterned electrode 222 with voltage U_ring applied thereto is to create a lensing electric field profile, while the role of the central disk-shaped electrode 230 with voltage U_disk applied thereto is to reduce disclinations and to control the electric field gradient (e.g., to erase the lens). The WCL 226 in this configuration allows close positioning of the top (patterned) electrode to the bottom ITO electrode 124, thus reducing required voltages.

Unfortunately, the complex patterning of the top electrode, the necessity of using two distinct drive signal voltages and a separate WCL 226 are difficult to manufacture as a unit and inhibit practical use of this approach. For example, the use of this approach to build a polarization independent lens would require the use of six to seven thick glass lens elements.

Both of the above mentioned approaches suffer from additional drawbacks. In using Naumov's approach, the performance of such a TLC lens is very sensitive to the thickness of the LC cell as well very sensitive to the sheet resistance R_s of the highly resistive layer 126. It happens that, for millimeter size lenses, the value of R_s, for almost all known solid state materials, is in the middle of an electrical conductivity transition (percolation) zone, where the sheet resistance has a very drastic natural variation with layer 126 geometry (thickness). Thus, it is extremely difficult to achieve consistency (repeatability) in building highly resistive layers 126 with the same R_s.

Each of Naumov's and Sato's approaches require the use of two highly resistive layers 126 or WCLs 226 to build polarization independent lenses. Thus, the problems of R_s reproducibility and complexity drastically reduce manufacturing yields and increase manufacturing costs.

As mentioned, prior art tunable LC lenses employ a driving signal having an adjustable voltage to change the optical properties of the LC layer. As mentioned above, another problem with prior art systems having patterned electrodes is the effect of "disclination." When using a spatially non-uniform voltage for tuning a TLC lens the initial voltage increase creates non-uniform electric field lines that cause some of the LC molecules to realign differently than others which experience the same electric field strength. Such disclinations cause optical aberrations in the lens which persist with gradual voltage adjustments necessarily employed in tuning. Such disclinations can be removed (in Sato's approach) by aligning all molecules with a very high voltage pulse that erases the lens, before reducing the voltage back to the appropriate range for providing a desired optical power, however such high voltage pulses are undesirable for example due to operational parameter violations of the overall device.

Auto-Focus (AF) is a process implemented in many camera systems to enable easier focus acquisition for camera users, sparing them of the need to manually focus a scene. Handheld digital camera operation in auto-focus mode is negatively affected by both increased power consumption and slow response speed, factors which further negatively influence each other. An important performance characteristic of auto-focus operation is the maximum time taken by the focus acquisition process to complete. Auto-focus applications, such as handheld camera systems require good auto-focus speed performance.

Auto-focus systems are used with TLC lenses where the optical power of the TLC lens is changed by applying a drive signal to the TLC lens as indicated by an auto-focus algorithm. In contrast with conventional focusing systems, TLC lenses remain stationary at all times. For image focusing purposes, an optical power of a TLC lens refers to the amount of bending (convergence) that the TLC lens imparts to incident light (and more specifically to an incident light field referred to as a scene) passing therethrough.

There are a number of algorithmic techniques which can be employed to compute convergence to an optical power setting corresponding with best focus scores for a given scene. Auto-focus algorithms implement a so called full search approach, hill climb approach, etc. Auto-focus speed is in part dependent on the optical power change speed.

The full search algorithm typically involves adjustment of the tunable lens across its full range of optical power in small and even drive signal adjustment steps. Focus scores are determined and recorded for each step, the variation of focus scores with either drive signal level or optical power is referred to as a focus curve. A maximum of the focus score variation (curve) is determined, and the optical power of the (TLC) lens is set to correspond to that for the maximum focus score. This technique is also referred to as staircase, because the up and down drive signal adjustment steps employed resemble a staircase. One drawback to this algorithm is that in practice implementations are slow. Each small step requires a non-trivial amount of time to complete, and the aggregate number of steps can take up a substantial amount of time. Moreover, the required traversal of the entire optical power range and therefore the traversal of the entire drive signal control range to implement the full search algorithm for a variable voltage controlled TLC lens may leave the molecules of the LC layer in a saturated high power state at the end of the focus search. Employing the full search algorithm with a voltage controlled TLC lens typically further suffers from a slow response time due to slow LC molecular relaxation from the required LC molecular saturated state of the highest voltage applied at the end of the full search to a lower voltage moderate power state needed to subsequently acquire the image at best focus. The slow response time is not only undesirable but variable. The more the maximum focus is found at extreme drive signal voltages, the longer the relaxation time required.

The hill climbing algorithm employs a technique for detecting which optical power setting corresponds to a peak focus score. This technique assumes that there will be a single peak in a focus score curve varying with optical power. This is typically considered a safe assumption in naturally occurring scenes in consumer photography and video. The general shape of such a focus score curve resembles a hill. With reference to FIGS. 2A and 2B, the hill climbing algorithm involves stepping through at least a portion of the optical power range of the tunable lens while detecting the climb up the hill in terms of focus scores, and then, immediately after the peak is passed (indicated by a drop in the focus scores), pulling back to the optical power level observed at the focus score peak. One approach to the hill climb technique involves selecting substantially equally spaced samples across the adjustable optical range, as illustrated in FIG. 2A.

Because the hill climbing algorithm aborts the focus search after the focus score peak is detected, the overall number of steps can be reduced thereby reducing the focus acquisition time delay. Because the hill climb approach essentially stops and retreats a bit after it passes over the peak, the amount of time it takes to complete in this procedure depends on how far into the optical range the peak is located. If the focus peak is near the beginning of the optical range sweep, the procedure involves a relatively few steps. However, if the focus peak is near the end of the optical range sweep, the procedure involves relatively more steps. To reduce the amount of time the entire procedure takes on average, it may be beneficial to make larger steps at the beginning of the focus scan sweep than those later in the focus scan sweep, as illustrated in FIG. 2B. Far few steps are taken to reach peaks positioned further away from the beginning of the optical range sweep, thus taking less time to complete the entire procedure. In those cases where the best focus score peak is nearer the beginning of the optical range, additional time may be taken to perform larger backward steps, but this is acceptable because the procedure will have spent relatively little time traveling to that early backtrack position. Compared, to a full scan algorithm, the hill climbing algorithm only involves sweeping across the entire optical range for scenes requiring a focal distance outside the focus range of the optical system (typically too close).

SUMMARY

For some autofocus applications, such as certain camera systems requiring exceptional autofocus speed performance, the staircase and hill climb algorithms that use a step-by-step approach in pacing across the optical range are too slow. There is a need for tunable lenses and systems which provide improved autofocus performance.

It has been discovered that for a TLCL having a substantially bell shaped optical power response to a control parameter, the TLCL can be used to ascertain focus scores on one side of the response curve while progressively driving the TLCL in an excitation direction, and to reconfigure the TLCL for optimum focus acquisition on the other side of the curve by progressively driving the TLCL in the excitation direction.

It has been further discovered that faster auto-focus acquisition may be achieved by employing full excitation TLCL control in accordance with a scheme driving of the TLCL in the excitation direction.

It has been discovered that taking into account spatial non-uniformity of liquid crystal alignment of a TLC device in generating spatially non-uniform overdrive signals, enables fast reorientation transitions in spatially non-uniform geometries.

It has been discovered that enhanced optical power transition speeds in the relaxation direction can be achieved in a two electrode tunable liquid crystal optical device employing a frequency dependent layer by applying controlled shaped transient electric fields.

In accordance with an aspect of the invention there is provided, a method for auto-focus image acquisition using a variable optical power liquid crystal gradient index lens, said liquid crystal lens having a first low magnitude optical power at or near a liquid crystal orientation ground state, a maximum magnitude optical power when said liquid crystal is in an intermediate excitation state, and a second low magnitude optical power when said liquid crystal is in an advanced excitation state, the method comprising: exciting said liquid crystal of said liquid crystal to progress from at or near said ground state to at or near said intermediate excitation state, while collecting a number of images through said lens to determine a best attainable focus corresponding to an image acquisition optical power for acquiring an image through said lens; further exciting said liquid crystal to be in an image acquisition excitation state between said intermediate excitation state and said advanced excitation state to have an optical power corresponding to said image acquisition optical power; acquiring a best attainable focus image through said lens in said image acquisition excitation state; and allowing said liquid crystal to relax toward said ground state to be ready for a subsequent auto-focus image acquisition.

In accordance with another aspect of the invention there is provided an auto-focus module for a camera having an image sensor, a focus score module connected to said sensor for providing a focus score signal, and providing auto-focus image acquisition, the module comprising: a variable optical power liquid crystal gradient index lens, said liquid crystal lens having a first low magnitude optical power at or near a liquid crystal orientation ground state, a maximum magnitude optical power when said liquid crystal is in an intermediate excitation state, and a second low magnitude optical power when said liquid crystal is in an advanced excitation state; an excitation source for said liquid crystal of said liquid crystal lens; a controller connected to said source and receiving said focus score signal, said controller being configured to: excite said liquid crystal to progress from at or near said ground state to at or near said intermediate excitation state, while collecting a number of images through said lens to determine a best attainable focus corresponding to an image acquisition optical power for acquiring an image through said lens; further excite said liquid crystal to be in an image acquisition excitation state between said intermediate excitation state and said advanced excitation state to have an optical power corresponding to said image acquisition optical power; acquire a best attainable focus image through said lens in said image acquisition excitation state; and allow said liquid crystal to relax toward said ground state to be ready for a subsequent auto-focus image acquisition.

In accordance with a further aspect of the invention there is provided a method for auto-focus image acquisition using a variable optical power liquid crystal gradient index lens, said liquid crystal lens having a first low magnitude optical power at or near a liquid crystal orientation ground state, a maximum magnitude optical power when said liquid crystal is in an intermediate excitation state, and a second low magnitude optical power when said liquid crystal is in an advanced excitation state, the method comprising: exciting said liquid crystal of said liquid crystal to progress from at or near said advanced excitation state to near said intermediate excitation state, while collecting a number of images through said lens for focus score determination; detecting an image corresponding to a drop in focus scores to assert a best attainable previous focus score corresponding to an image acquisition optical power for acquiring an image through said lens; failing to detect a drop in focus scores upon approaching said intermediate excitation state, further exciting said liquid crystal briefly to an excitation state substantially at said intermediate excitation state to obtain a final focus score; acquiring a best attainable focus image through said lens in image acquisition excitation state near said intermediate excitation state if said final focus score represents a focus score drop; and exciting said liquid crystal to said advanced excitation state to be ready for a subsequent auto-focus image acquisition.

In accordance with a further aspect of the invention there is provided a tunable optical device comprising: a tunable liquid crystal component including a liquid crystal layer exhibiting a liquid crystal molecular orientation distribution in response to at least one drive signal component, said liquid crystal molecular orientation distribution causing a spatially modulated optical property variation in a light beam passing through said liquid crystal layer; and an optical property transition controller configured to selectively drive said liquid crystal layer using at least one transient drive signal component configured to temporarily apply a transient potential distribution across said liquid crystal layer before driving said liquid crystal layer using at least one final steady state drive signal component causing said liquid crystal layer to exhibit a desired final steady state spatially modulated optical property variation if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said desired final steady state.

It is noted that for a tunable liquid crystal lens, depending on the optical power transition, the transient drive signal may not necessarily correspond to an optical power, that is the transient potential distribution profile may not correspond to a steady state potential distribution profile of an optical power setting.

In accordance with a further aspect of the invention there is provided a camera module comprising: a tunable liquid crystal lens including a liquid crystal layer exhibiting a liquid crystal molecular orientation distribution in response to at least one drive signal component, said liquid crystal molecular orientation distribution causing a light ray deviation in a light beam passing through said liquid crystal layer imparting an optical power; an optical power transition controller configured to selectively drive said liquid crystal layer using at least one transient drive signal component configured to temporarily apply a transient potential distribution across said liquid crystal layer before driving said liquid crystal layer using at least one final steady state drive signal component causing said liquid crystal layer to exhibit a desired final steady state optical power if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said desired final steady state optical power, said selectively driving said liquid crystal layer using said at least one transient drive signal component being responsive to said optical property transition controller detecting a change in said provided at least one steady state drive signal component; and a focus controller configured to cause the application of said at least one steady state drive signal component across said liquid crystal layer.

In accordance with a further aspect of the invention there is provided a method of operating a tunable optical device to cause an optical property transition, the method comprising: selectively applying a drive signal sequence of at least two drive signal components including using at least one transient drive signal configured to temporarily apply a transient potential distribution across a liquid crystal layer before driving said liquid crystal layer using at least one final steady state drive signal causing said liquid crystal layer to exhibit a desired final steady state spatially modulated optical property variation if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said final desired steady state.

In accordance with yet another aspect of the invention there is provided an auto-focus method for acquiring focus in an imaging system, the method comprising: selectively applying a drive signal sequence of at least two drive signal components including using at least one transient drive signal component configured to temporarily apply a transient potential distribution across a liquid crystal layer of a tunable liquid crystal lens before driving said liquid crystal layer using at least one final steady state drive signal causing said liquid crystal layer to exhibit a desired final steady state spatially modulated optical property variation if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said desired final steady state, said liquid crystal layer exhibiting a liquid crystal molecular orientation distribution in response to said at least one drive signal component, said liquid crystal molecular orientation distribution causing a light ray deviation in a light beam passing through said liquid crystal layer imparting an optical power; obtaining a focus score from an image generated by said light beam; determining parameters for said drive signal components to cause said optical power to change; and repeating the method.

BRIEF DESCRIPTION OF THE DRAWINGS

The invention will be better understood by way of the following detailed description of embodiments of the invention with reference to the appended drawings, in which:

FIG. 3 is a schematic diagram showing a tunable liquid crystal lens layered structure in accordance with the proposed solution;

FIG. 11B is a schematic diagram showing charge mobility induced voltage distributions across a cross-section through a tunable liquid crystal lens corresponding to FIG. 11A;

DETAILED DESCRIPTION

Tunable Liquid Crystal Lens Structure

Figure 1A:
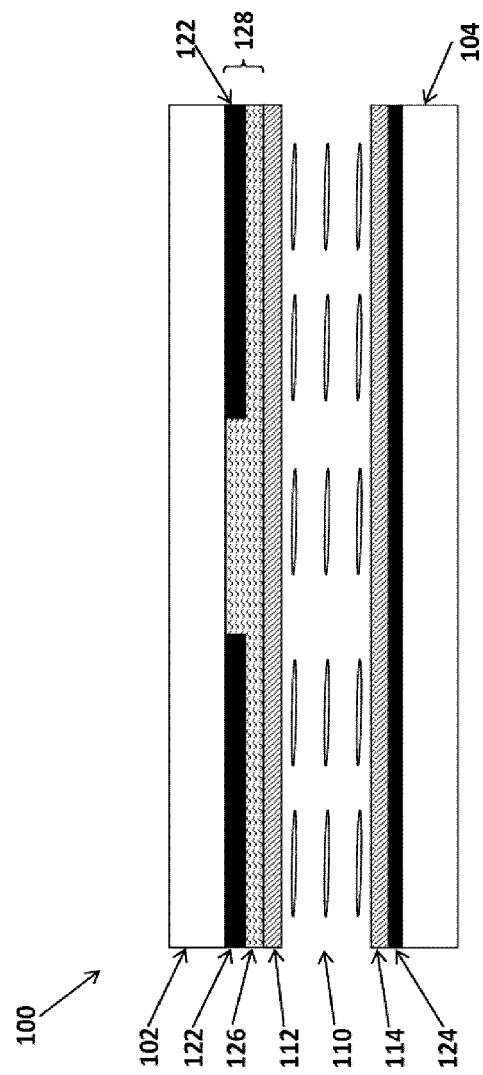
FIG. 1A is a schematic diagram showing a prior art tunable liquid crystal optical device.
Figure 1B:
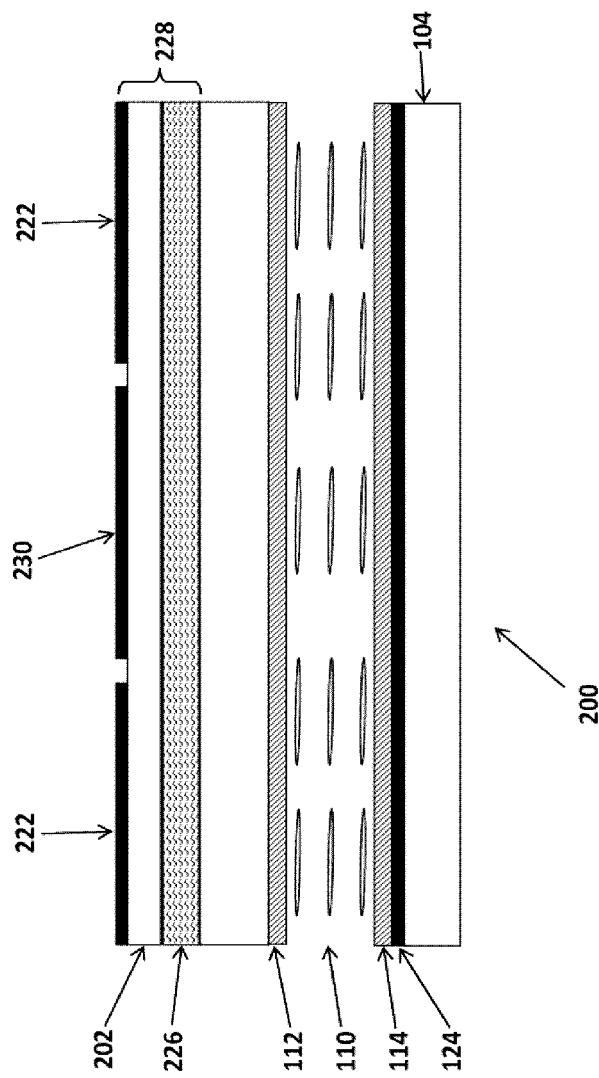
FIG. 1B is a schematic diagram showing another prior art tunable liquid crystal optical device.
Figure 2A:
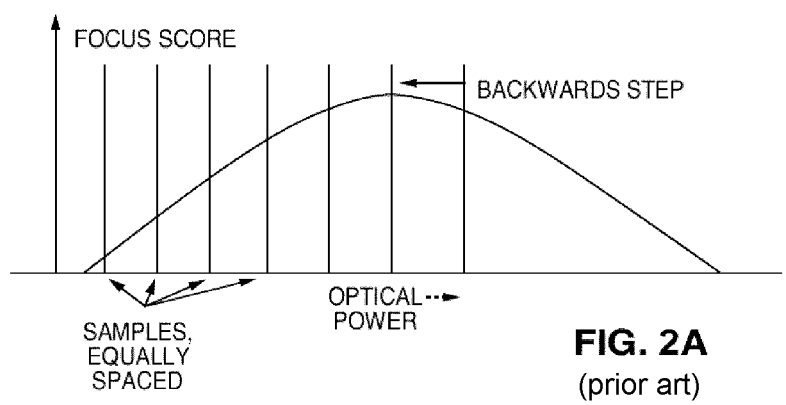
FIG. 2A is a schematic plot showing highest focus score determination employing a hill climbing auto-focus algorithm in accordance with the proposed solution.
Figure 2B:
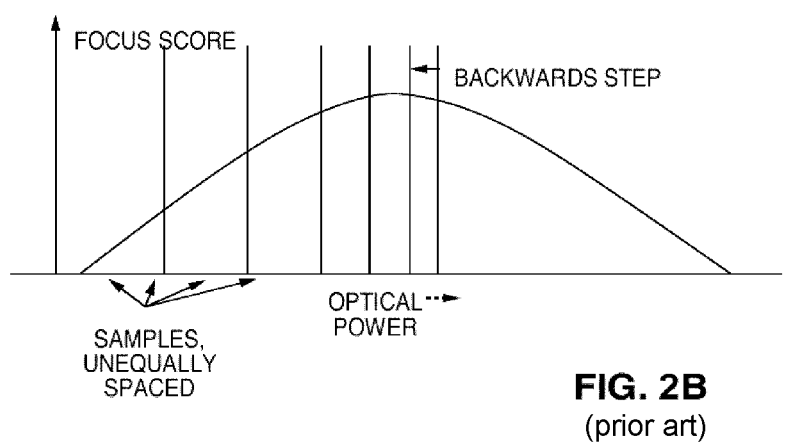
FIG. 2B is a schematic plot showing highest focus score determination employing another hill climbing auto-focus algorithm in accordance with the proposed solution.

In accordance with an aspect of the proposed solution, a variable optical device is provided for controlling the propagation of light passing therethrough. The sensitivity to the LC cell thickness is alleviated by employing a buffer substrate.

Voltage Gradient Softening

FIG. 3 illustrates a flat single polarization Tunable Liquid Crystal Lens (TLCL) structure in accordance with the proposed solution. TLCL 300 has an electric field shaping control (layer) substructure 328 including a top fixed hole-patterned conductive ring electrode 322 forming an aperture on top of a Weakly Conductive Layer (WCL) 326 separated from the LC layer 510 by a buffer layer 340. The WCL 326 is either in direct physical contact with the top hole-patterned ring electrode 322 or in electrical contact therewith subject to manufacturing considerations including choice of specific layer materials (not all layer materials bond to each other, as well large index of refraction differences between layers 102, 326 and 340 may require sandwiching dielectric layers therebetween, dielectric layers which have intermediary refractive indices to prevent reflections). The electrical contact provided between the top hole-patterned electrode 322 and the WCL 326 enables the TLCL 300 to employ only two electrodes 322 and 124 to apply a spatially modulated electric field to liquid crystal layer 510. Therefore, TLCL 300 requires a single drive signal minimizing complexity of drive signal generation, drive signal traces and control electronics. The top hole-patterned electrode 322, without limiting the invention, can be made of Al. Other low resistance electrode compositions can be employed, such material selection depending on manufacturing factors familiar to persons of skill in the art of thin wafer fabrication.

In accordance with the proposed solution, buffer layer 340 reduces the sensitivity of the TLCL to LC cell thickness. In accordance with one implementation of the proposed solution, the thickness of buffer layer 340 provides a "buffer spacing" between the WCL 326 and the LC layer 510, geometry which softens the gradient of the electric field applied. In accordance with another implementation of the proposed solution, "dielectric properties" of the buffer layer 340 softens the sensitivity to LC cell thickness. The invention is not limited to the above examples of buffer layers 340, it is envisioned that in practice buffer layer 340 would be configured to employ a combination of layer thickness and material properties to soften the electric sensitivity. The buffer layer 340 can further be configured to provide properties typically required of a top substrate of the TLCL 300 structure in order to further minimize overall TLCL thickness. For example, buffer layer 340 can include optically transparent (dielectric) materials not limited to polymers, ceramics, etc.

For certainty, the TLCL structure 300 illustrated in FIG. 3 is schematic and not representative of actual proportions of a TLCL structure. Layer thicknesses are greatly exaggerated for ease of illustration. As well, the hole-patterned electrode 322 aperture is not shown in proportion to the overall TLCL structure 300. The diameter 350 of the hole-patterned electrode aperture is also referred to herein control electrode aperture. A smaller diameter 360 represents a clear aperture of the TLCL and includes a region which refracts incident light at an optical power. Some applications and manufacturing requirements put an upper limit on the overall size of the TLCL, while physical properties (of light passing through small apertures) limit the clear aperture 360 to a portion of the control electrode diameter 350.

Figure 4:
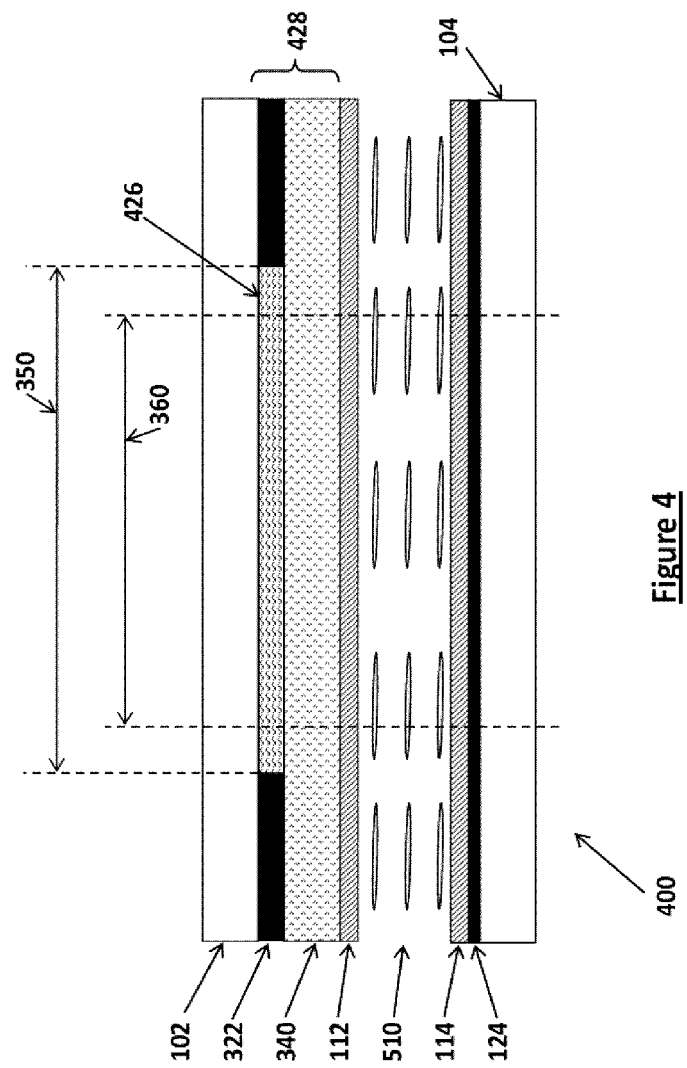
FIG. 4 is a schematic diagram showing another tunable liquid crystal lens layered structure having a variable conductivity layer geometry in accordance with the proposed solution.

In accordance with the proposed solution, FIG. 4 illustrates another implementation of tunable liquid crystal lens. TLCL 400 includes a two tier electric field shaping control layer 428. The buffer layer 340 forms a bottom tier immediately adjacent to a variable conductivity layer formed by the top hole-patterned conductive electrode 322 having control electrode diameter 350 and a weakly conductive layer 426 filling the control electrode aperture (350) in the center of the hole-patterned electrode 322. The buffer layer 340 softens the gradient of the electric field applied to the LC 510.

Full TLCL

While FIGS. 3 and 4 describe TLC lens structures configured to control light propagation, such light propagation control is provided only for a single light polarization due to the preferential directionality provided by the orienting layers 112/114. Such TLCL structures are said to be polarization dependent referred to as half TLCLs. For operation in natural lighting conditions (sun, lamp), two cross-oriented LC cells are required to control light propagation for two orthogonal polarizations of incident light to provide a polarization independent TLCL.

Prior art optical device geometries proposed by Naumov require the use of two high resistivity layers, which will almost always have different values of R_s. Thus two orthogonal light polarizations will typically not operate synchronously in accordance with such prior art.

In accordance with another aspect of the proposed solution, a variable optical device is provided for controlling the propagation of light passing therethrough, the geometry of the variable optical device including a common variable conductivity layer employing only one weakly conductive layer for controlling two liquid crystal cells of a polarization independent variable optical device.

In accordance with the proposed solution, the polarization dependent geometry presented in FIG. 4 can be extended to provide a polarization independent TLCL structure. Preferably a polarization independent tunable liquid crystal lens for a digital camera is configured to control light propagation for two orthogonally polarized incident light beam components employing a mirrored TLCL structure, referred to as full TLCL.

Figure 5:
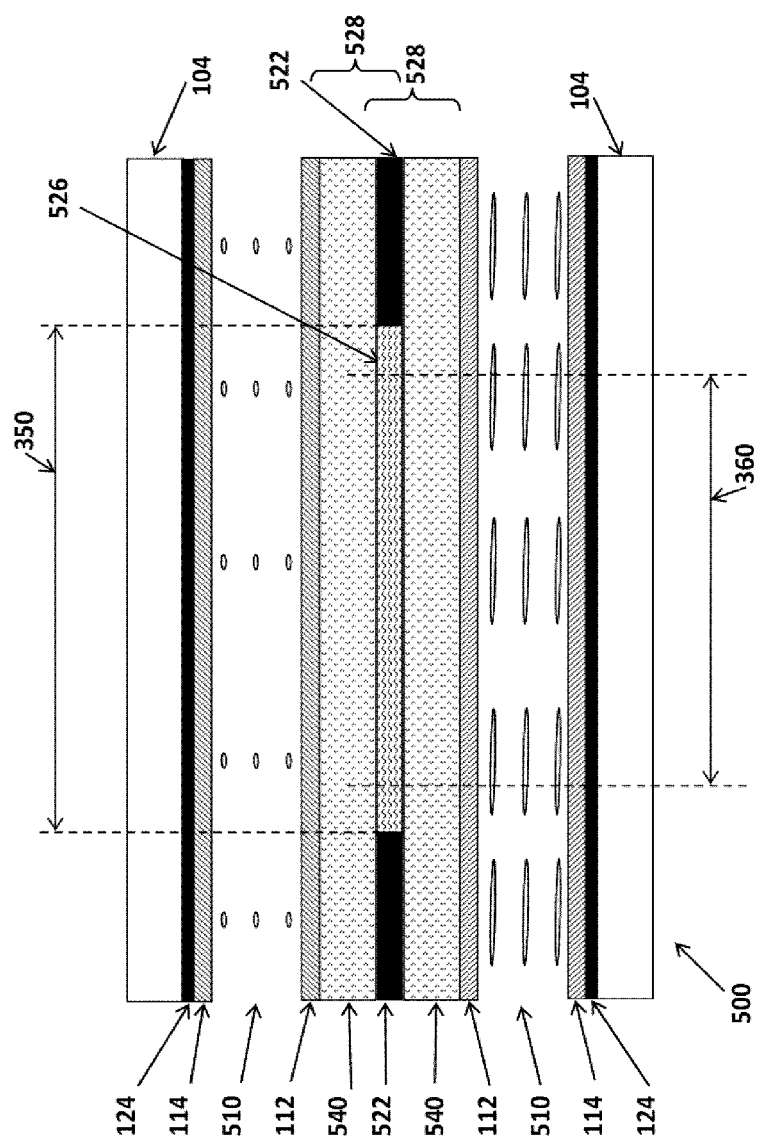
FIG. 5 is a schematic diagram showing a polarization independent tunable liquid crystal lens layered structure having a common variable conductivity layer in accordance with the proposed solution.

With reference to FIG. 5, TLCL structure 500 has a variable conductivity layer including a common hole-patterned mid conductive electrode 522 having a control electrode diameter 350 and a common weakly conductive layer 526 filling the aperture in the center of the common hole-patterned electrode 522. Top and bottom electric field shaping control layers 528 share the variable conductivity layer, each layer 528 employing a respective top and bottom buffer layer 540. Remaining layers are present in mirror fashion about the mid variable conductivity layer shown bearing similar labels according to the functionality provided (qualified by top and bottom identifiers herein below). The central variable conductivity layer is positioned between two LC layers 510. Electrodes 124, to which the drive signal is provided, are located, respectively, adjacent to each LC layer 510, away from the central variable conductivity layer and therefore away from the common hole-patterned conductive electrode 522.

Each one of the two liquid crystal layers 510 employed may be said to have a different LC director orientation as do orienting coatings 112 and 114. Preferably, the two LC layers 510 have directors in substantially orthogonal planes (cross oriented with respect to one another). For example, with the normal of the TLCL layered structure 500 designated as the Z axis, one of the directors might be in the XZ plane while the second director being in the YZ plane.

In accordance with a preferred embodiment, the same WCL 526 is being employed simultaneously for controlling both LC cells. Not only is the TLCL 500 polarization independent, also the focusing of both orthogonal polarizations of the incident natural light is substantially synchronized. In addition, small cell gap variations do not significantly affect overall performance as buffer substrates 540 soften such dependence.

For ease of description of the following TLCL functionality, an abstraction of control electrode structures providing spatial shaping of the driving electric field is made by referring to the electric field shaping control layer 328/428/528. For ease of description, reference to structural elements is made with respect to the half TLCL implementation shown in FIG. 4. However, the invention is not limited to the implementation shown in FIG. 4, the functionality described hereinbelow applies to other implementations of the proposed solution such as, but not limited to, those shown in FIGS. 3 and 5. Preferred implementations include full TLC lens structures 500 illustrated in FIG. 5.

Operational Characteristics

Tuneability of TLC lenses may be achieved through various drive signal modes, divided for ease of description herein, into: application of a variable voltage amplitude drive signal (fixed frequency amplitude modulation), and application of drive signals having a frequency and an amplitude. References are also made herein to applying a drive signal having a "variable frequency at fixed voltage" (fixed amplitude frequency modulation). A person of ordinary skill in the art would understand references to the "fixed voltage" in the context of a drive signal having a frequency, as the Root Means Square (RMS) voltage amplitude of the drive signal (Vrms).

Without limiting the invention, a drive signal can include a variety of electrical parameters used to control the optical characteristics, including but not limited to focusing power, of the TLC. As used herein, a vector (group) of such parameters affecting the TLC is referred to as the "control vector". Each such control vector occupies a point in an n-dimensional control space, with each n-dimension corresponding to a different electrical parameter affecting the TLC optical characteristics. Besides the voltage and frequency electrical parameters mentioned herein above, other electrical parameters (severally or in combination) could include drive signal frequency, pulse duration, signal duration, signal modulation (e.g. Amplitude Modulation (AM), Pulse Width Modulation (PWM), Frequency Modulation (FM)), and/or any other frequency composition or duty cycle parameter. Therefore, the term "control vectors" describes the group of electrical parameters, and the term "control regime" describes this control space (which is used to control the TLC).

Complex electric field profile shaping is provided. For example:

Variable Voltage Tuneability

Figure 6A:
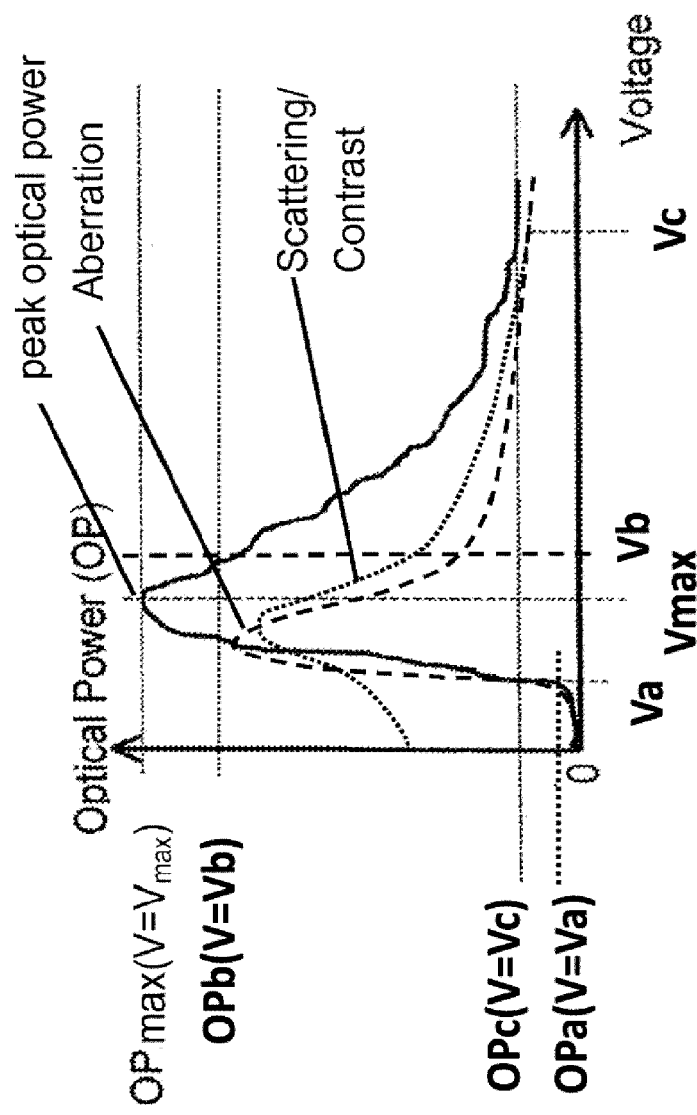
FIG. 6A is a schematic diagram showing a variation of a tunable liquid crystal lens optical property with an applied variable voltage drive signal.
Figure 6B:
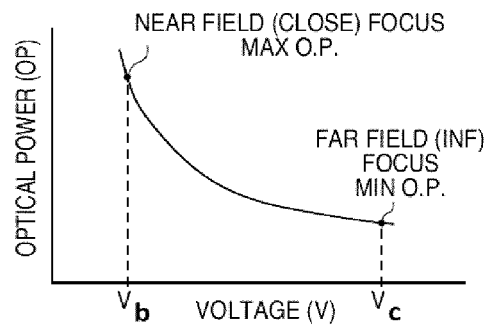
FIG. 6B is a graph illustrating a low aberration optical power transfer function with an applied variable voltage drive signal.

The basic behavior of the TLCL 400 is illustrated in FIGS. 6A and 6B via a modulation transfer function which maps a control vector (in this example—voltage amplitude levels) to levels of optical power. With reference to FIG. 6A, TLCs driven via variable voltages quickly to align LC molecules in response to an applied spatially modulated electrical field created by the application of a variable voltage drive signal (voltage amplitude modulated drive signal). For example, in the case of a positive TLC lens, the highest optical power OPmax of such voltage controlled TLC lens is understood to be achieved as the applied voltage Vmax subjects the LC layer 510 to an electrical field having the highest spatial variability (modulation/contrast) for a given TLC geometry 400. This is provided by a strong electrical field on the periphery and a weak electrical field in the center. This spatial variability of the electrical field in turn generates a corresponding non-uniform orientation of LC molecules greater at the periphery and lesser in the center. Such reorientation is said to be achieved while the TLCL transitions from an Un-powered Low-Optical-Power state (U-LOP) or liquid crystal orientation ground state to a Powered High-Optical-Power (P-HOP) state or intermediate excitation state at Vmax.

Amplitude Modulation Equipotentials

Figure 8:
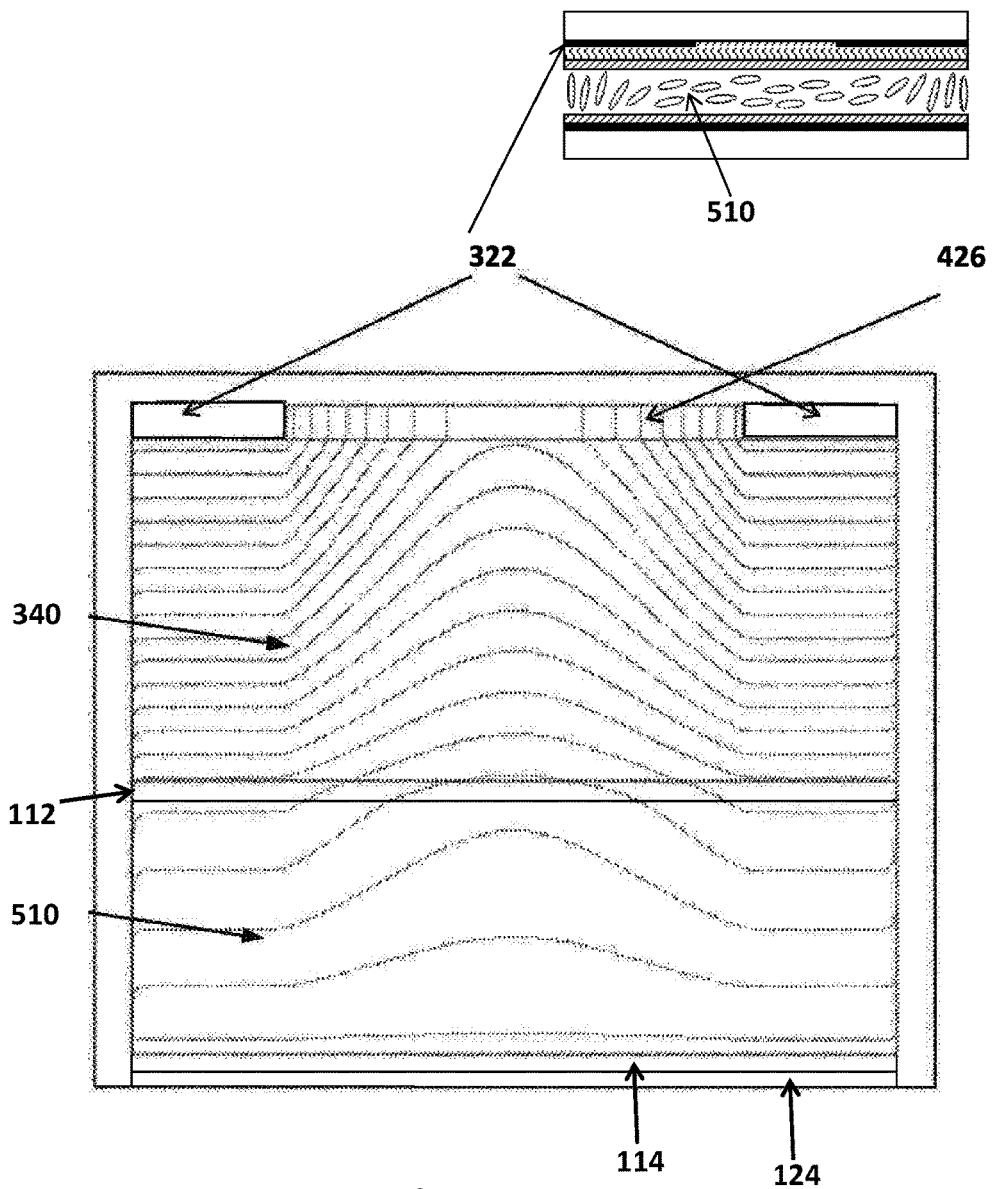
FIG. 8 is a schematic diagram illustrating an equipotentials distribution for a tunable liquid crystal lens subjected to a spatially modulated electric field in accordance with the proposed solution.

With reference to voltage amplitude modulation providing optical power variability, the application of a drive signal across electrodes 124, 322 of TLCL 400 having maximum voltage amplitude creates a spatially modulated electric field of high variability having equipotentials illustrated in FIG. 8. The inset depicts a highly variable LC molecular orientation and therefore the TLCL has a high optical power. The application of a drive signal across electrodes 124, 322 of TLCL 400 having low voltage amplitude creates an electric field of low variability having equipotentials illustrated in FIG. 9. The inset illustrates LC molecular orientation of low variability and therefore the TLCL has a low optical power.

Returning to FIG. 6A, empirically, optical power decreases with increasing applied voltage levels higher than Vmax(f). Higher voltages employed reduce the spatial variability of the electric field applied to the LC layer 510 compared to that applied by the P-HOP voltage Vmax. The application of higher voltages leads to reorienting LC molecules along electric field lines having lower alignment variability understood as a consequence of saturating the LC molecular reorientation across the LC layer. Aligning LC molecules to an electric field having low variability results in low index of refraction variability across the LC layer and therefore to low optical power. A state referred to as a High electrically Powered Low-Optical-Power (HP-LOP) state or advanced excitation state, requires high driving voltages while providing lower optical power OPc(V=Vc). The transition from HP-LOP advanced excitation state to P-HOP intermediate excitation state requires a relaxation of the central molecules in the LC layer as voltage is reduced, relaxation which has been experimentally found to be slow.

While optical power is reduced by drive signals supplying voltages higher than the voltage Vmax at P-HOP, there is no guarantee of a successful return to a focus value identified during a full focus scan between U-LOP and P-HOP as typically OPc in the HP-LOP advanced excitation state has a higher optical power compared to OPa of the U-LOP ground state. Relaxation back to U-LOP ground state is suggested in the prior art in order to ensure return to any focus value identified during the focus scan. In accordance with such prior art suggestions, the electric field is simply removed and the LC molecules are allowed to relax. LC materials have been experimentally found to be slow to respond to the removal of a controlling electric field applied. For auto-focusing purposes such passive relaxation has been found to be very long. Therefore, employing high voltages is a strong drawback to such auto-focusing techniques.

The modulation transfer function illustrated in FIGS. 6A and 6B represents the levels of optical power reached after a period of stabilization at a given drive signal (RMS voltage). Likewise, if one is using a different kind of control vector than voltage, a transfer function will represent optical power after a period of stabilization to that control vector. What FIGS. 6A and 6B do not indicate is the dynamic behavior of the TLCL 400 with respect to optical power as the TLCL drive signal changes from one control vector to another. Since auto-focusing (or even simply traveling from far field focus to near field focus) involves a change in optical power, that dynamic behavior is important to the effectiveness of the TLCL system in cameras, as will be pointed out hereinbelow. It is important, however, to note that in some cases changes in a control vector with additional parameters may likewise induce a useful transfer function. Similar transfer functions exist for parameters such as frequency instead of voltage, or the even the combination of the both.

As a generalization, a TLC layered structure can be understood to have an intrinsic capacitance and high resistivity. The TLC structure exhibits a fast optical power settling response to increasing drive signal voltage which is referred to as the "excitation" direction or mode. In contrast, the TLC structure exhibits a slow optical power settling response to decreasing drive signal voltage which is referred to as the "relaxation" direction or mode.

Improved Auto-Focusing

As mentioned hereinabove, while TLC exhibit no significant hysteresis with respect to achievable optical parameters such as optical power, TLC often times exhibit significant response time asymmetry in terms of how quickly continuous progress may be made in one direction through the optical parameter range as opposed to the other direction (see FIG. 17). This asymmetry in speed in the two directions, when present, means that the auto-focusing system preferably should take maximum advantage of the fast direction (to the extent possible), and should minimize the use of the slower direction.

Auto-focus algorithms typically require at least one up-and-down cycle in optical power. In accordance with the proposed solution, such optical property change response time asymmetry is considered in automatic focus acquisition. In the context of auto-focusing, a sweep is understood to mean a progressive variation of a control parameter, for voltage controlled TLCLs a progressive variation of the voltage drive signal between Va and Vmax is referred to as an increasing voltage sweep, the corresponding optical power variation between OPa and OPmax is referred to as an optical power sweep. For a positive TLC lens an increasing voltage sweep in the Va to Vc drive signal range corresponds to increasing (positive diopter) optical power in the Va to Vmax drive signal range, and corresponds to a decreasing (positive diopter) optical power in the Vmax to Vc drive signal range. An increasing voltage sweep is said to be a sweep in an excitation direction irrespective of the optical power variance.

In accordance with the proposed solution, an in-flight focus search technique making continuous progress in the excitation direction across the optical range of a TLC lens is employed irrespective of which drive signal control parameter is varied. That said, the initial state may actually depend on which drive signal control parameter is varied. In practice, a TLCL control table is provided characterizing optical parameter variability with respect to at least one drive signal control parameter. For image acquisition, the auto-focus system selects entries from a drive signal control table based on focus scores generated. Without limiting the invention, the control table may also hold special entries defining special control drive signal parameter values defining control signal variability ranges, excitation sweep ranges, etc. For example, if the drive signal voltage parameter is employed to excite the liquid crystal in the excitation direction, then the continuous progress in the excitation direction can start from the low optical power state Va at or near the liquid crystal orientation ground state by increasing the voltage to Vmax, or having excited the liquid crystal molecules out of the ground state to reduce disclinations continuous progress in the excitation direction can start from Vmax to Vc. The latter is illustrated in FIG. 6B. However, if the drive signal frequency parameter is employed to excite the liquid crystal in the excitation direction, then the continuous progress in the excitation direction can start from at or near a maximum magnitude optical power intermediate excitation state of intermediate frequency by decreasing the frequency (as will be described hereinbelow with reference to FIG. 10).

In-flight auto-focus systems can be implemented (in cameras) in several ways. Before the (camera) auto-focus system is turned on, the lens is preferably focused on far field objects. In some TLCL configurations, the far field can be either at Va (0V no drive voltage applied) (or at a low-frequency excitation state as described hereinbelow with reference to frequency control) or at Vc (corresponding to the minimum optical power OPc). Configuring TLCLs in this way allows Va (drawing minimal power in its use in preview mode) or Vc to be used as a preview mode, which is likely to be largely the most used mode for the camera when turned on. The focus search may start from minimum OPa/OPc or maximum peak optical power OPmax (corresponding to near field focus). In cases in which Va=0V is the preview mode, the transition to peak optical power OPmax can be performed by using a specific control vector sequence to avoid declinations and to provide fastest possible transition.

TLCLs have been found to be desirable focusing devices for continuous optical power adjustment, because TLCLs can take acceptable pictures while actively changing optical power, that is, while a TLC lens is driven in the excitation direction sweeping across an optical parameter range, for example from OPa to OPmax in FIG. 6A, in a continuous fashion (in a "quasi-stationary" mode of variation). Despite aberration and scattering effects, the optical properties of TLC lenses have been experimentally found acceptable for images acquired during the sweep to be used (either by the user or) to determine such things as focus scores. It bears emphasizing, that this in-flight functionality is possible with TLC lenses and unlike many mechanical auto-focus systems, in which physical lens movements require stabilization time at any given optical power, sometimes quite significant in duration, before acceptable images can be acquired for any purpose.

Figure 7:
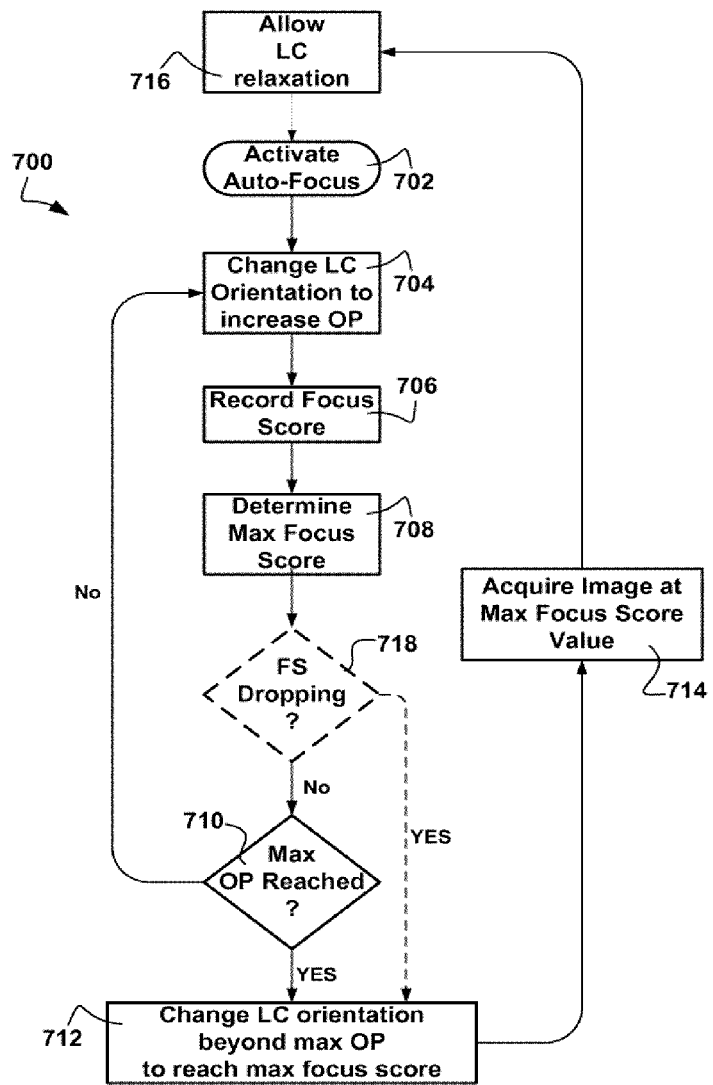
FIG. 7 is a schematic diagram showing an auto-focus process for a tunable liquid crystal lens in accordance with the proposed solution.

For example, an auto-focus process is illustrated in FIG. 7. Auto-focus process 700 starts with the activation 702 of auto-focus functionality. Using a full search staircase algorithm, (mentioned herein above with reference to paragraph 0) involves sweeping through the optical range of the TLCL in the excitation direction (between OPa and OPmax). Throughout the sweep in the excitation direction of the auto-focus process 700, control table entries will cause the TLCL to travel across the optical range in a prescribed fashion 704 to 710. Focus scores (which may be determined by the sharpness of an image) are recorded 706 for a number of optical parameters and analyzed 708 to determine a maximum focal score. When the maximum optical parameter has been reached 710, drive signal is increased 702 in the excitation direction, between Vmax and Vc, to an optical parameter corresponding to the determined maximum focus score. That is, in accordance with this embodiment of the proposed solution, the optical parameter backtracking is implemented in a voltage controlled TLC by increasing the voltage parameter in the excitation direction to the other side of the optical power transfer function illustrated in FIG. 6A. Focusing activity ceases and image acquisition at the maximum focus score value is activated 714 in an image acquisition excitation state and the LC layer 110 is permitted to relax to the ground state 716 as the acquired image is shifted out of the image sensor into storage. Process 700 starts anew from 702. This technique is suited to achieve fast auto-focus performance due to focusing functionality being performed during the excitation mode only. The invention is not limited to employing a full search auto-focus algorithm, other auto-focus algorithms may be employed to the extent to which such other algorithms can be implemented in excitation mode.

In accordance with a variation of the auto-focus process 700, the in-flight auto-focus sweep preferably comes to a halt once the auto-focusing process 700 (and system) determines that a peak focus has been attained and/or somewhat passed. For example, employing a hill climbing auto-focus algorithm, the process 700 follows a climb up a hill in terms of focus scores. The auto-focus process 700 selects entries from the look-up table based on focus scores generated along. Throughout the forward travel phase of the auto-focus process 700, table entries cause the TLCL to travel across the optical range in a prescribed fashion, while focus scores are recorded and analyzed to determine the peak focal score. When the auto-focusing system determines 718 that the peak of a focus score curve has been reached and/or somewhat passed (for example indicated by a drop in focus scores), the in-flight auto-focus sweep is preferably aborted before maximum optical parameter has been reached. Table entries are employed to drive the TLCL causing the TLCL immediately travel 712 in the excitation direction to the optical parameter corresponding to the determined peak focus score. This technique is further suited to achieve fast auto-focus performance due to an early sweep abort.

As a specific example, employing a voltage driven TLC lens having an optical power variance illustrated in FIG. 6A, advantageously, the particular shape of the optical power variation curve enables in-flight focus score determination in the excitation direction of travel of the sweep between OPa and OPmax by sweeping from Va to Vmax. By setting Va such that OPa=OPc(Vc), and by focusing the TLC lens at infinity when Vc is applied, each optical power between OPa and OPmax will have a corresponding optical power in the range OPmax to OPc. Once a best focus score is determined on in the OPa to OPmax sweep, a corresponding optical power is found 712 in the range OPmax to OPc, that is control signal adjustment for the optical power found in 712 is in the excitation direction with respect to drive signal between Va to Vmax. Moreover, in accordance with this specific voltage controlled example, while the focus scores are determined under unfavorable aberration and/or scattering conditions, the image acquired at 714 in the image acquisition excitation state employs a voltage drive signal setting providing low aberration and/or scattering in drive signal range Vmax to Vc.

For in-flight auto-focus systems, the speed of the sweep (scan) can be an important factor. For example, an in-flight process could involve setting the TLCL to the lowest optical power OPa, and allowing the TLCL to sweep quickly across the optical range to OPmax. A difficulty with this approach, however, is that the transition would simply be too fast (FIG. 6A) for most camera sensors to do an adequate job in acquiring enough focus scores so that the focus score peak could readily be detected (and/or predicted see below) before the transition to the peak focus score. For example, it may take only 200 ms for some TLCLs to travel across the entire optical range from minimum optical power OPa to peak optical power OPmax. If the camera sensor achieves frame rates in the worst case of only 15 frames per second, then each frame requires 66 ms. This means only 3 or 4 focus scores could be acquired across the full optical range. Such a sparse sampling might easily miss the peak of focus scores, since sometimes the hill around that peak can be fairly narrow. With a camera sensor of this or similar speeds, it is preferable to stretch the time it takes to travel across the optical power range so that more focus scores can be recorded, and a finer grain analysis of the focus score curve can be obtained.

Plots optical power variability against time in the transition OPa to OPmax, the curve so described is roughly linear. If the curve deviates significantly from a linear curve, much the same problem will result as with a too fast progress across optical power, in which, for at least some portion of the curve, the slope will be so steep that at a fixed frame rate, the focus score samples will be too far away from each other in terms of optical power to detect the peak of focus scores. These concepts are illustrated in FIGS. 6C to 6E.

Figure 6C:
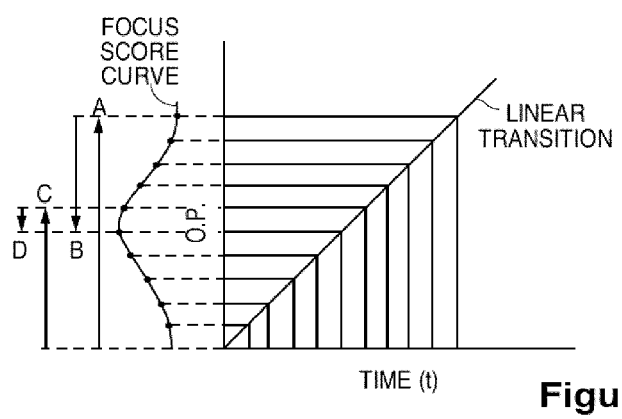
FIG. 6C is a schematic graph illustrating a linear progression of optical power over time, and the corresponding focus scores for a middle field object being imaged.

FIG. 6C illustrated how an in-flight activation of the TLCL which engenders a linear progression across the range of optical power might behave with respect to sampling focus scores. Each vertical line represents a frame and focus score. The curve to the left is the curve of focus scores for a middle field object being imaged as the scan proceeds across the range of optical power, and is mapped to the optical powers achieved when the frames are captured. In this linear progression case, the sampling is fairly dense in all regions of the focus score curve, allowing the auto-focus algorithm to have an accurate indication of how the focus curve is shaped, and where the exact peak of the focus curve is. (Incidentally, the need for prior art backtracking is minimized because the gaps between the samples are relatively small. Arrow A illustrates an initial full sweep across the optical range, which is followed by the travel back to the optical power corresponding to the determined peak focus score as illustrated by arrow B. Alternately, arrow C illustrates an initial sweep across the optical range until the focus scores start dropping, at which point the sweep is ceased and is followed by the travel back to the optical power corresponding to the determined peak focus score as illustrated by arrow D.)

Figure 6D:
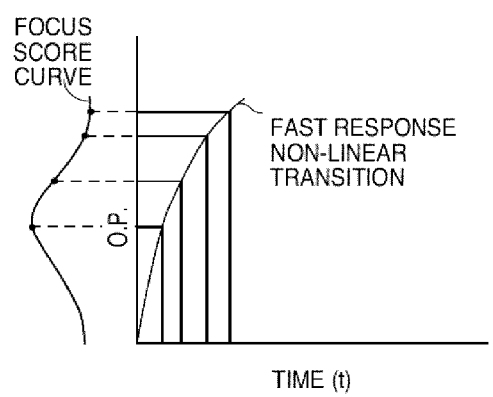
FIG. 6D is a schematic graph illustrating a fast response non-linear progression of optical power over time, and the corresponding focus scores for a middle field object being imaged.

FIG. 6D illustrates a case in which the progress across the optical range is very fast (i.e. as fast as a high energy electrical pulse might drive the TLCL across the optical range). The response curve is both very short in duration, and also quite deviant from linear. It is similarly mapped across to the samples represented in the focus score curve. Notably, the samples are both very sparsely populated and unevenly distributed. It would be very difficult for an AF algorithm to determine the peak of focus scores.

Figure 6E:
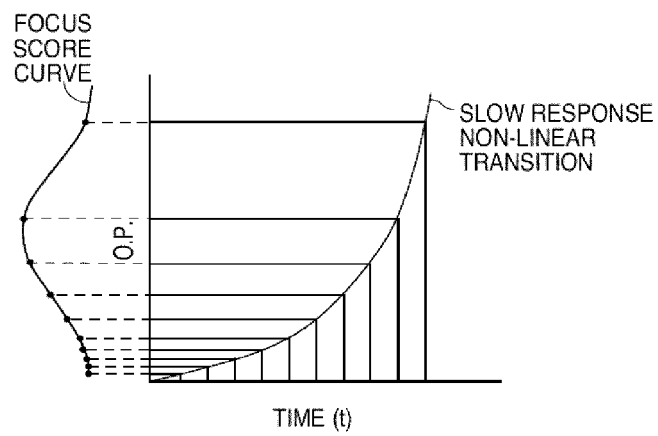
FIG. 6E is a schematic graph illustrating a slow response non-linear progression of optical power over time, and the corresponding focus scores for a middle field object being imaged.

FIG. 6E illustrates a case in which the curve takes the same amount of time to cross the optical range as the linear curve, but where a significant deviation from the linear exists. The sampling, while equal in number to the linear case, is very unevenly distributed across the focus score curve. This too creates a situation in which it may be difficult for an auto-focus algorithm to determine the focus peak.

It is preferable but not necessary to synchronize the in-flight sweep regime with the rate at which the image frames are captured by the photosensitive sensor, and hence the rate at which the focus scores are generated. It is important to note that the in-flight mode can be configured to proceed across the optical range at a desired time period. The shape of the optical power response curve is likewise configurable to become linear or any other desired shape—with some constraints on that shape being imposed only as it approaches the fastest possible response times across the optical range. This configurability can enable useful and desired effects, such as creating improved (optimal) response curves for fast autofocus algorithms.

There is, however, at least one algorithmic reason why it would be desirable to deviate (at least somewhat) from a linear optical power response curve. If it is desired to have (image) focus score samples across the optical range that are not evenly spaced, then a non-linear response curve could better accommodate that goal. For example, the hill climbing algorithm could purposely take unevenly spaced samples in order to reduce the amount time spent in a portion of the optical power curve furthest away from the focus score peak.

The highest speed performance achievable by an auto-focus system is also dictated by the speed of the photosensitive (frame rate) sensor. Alternatively then, a very fast frame rate sensor may very well be able to sample the optical range at such small intervals that the focus score peak might readily be determined by either a very small dip from the highest score using a non-predictive hill climb algorithm, or by using a predictive algorithm whose predictions can be made exceedingly precise because of the robust sampling of the focus score curve. In either case, the final focus score of the in-flight algorithm may be so close to the actual focus score peak that it can be considered quite acceptable simply to acquire images with that corresponding optical power, since the difference from ideal focus, if any, would not be regarded as perceptible.

Figure 6F:
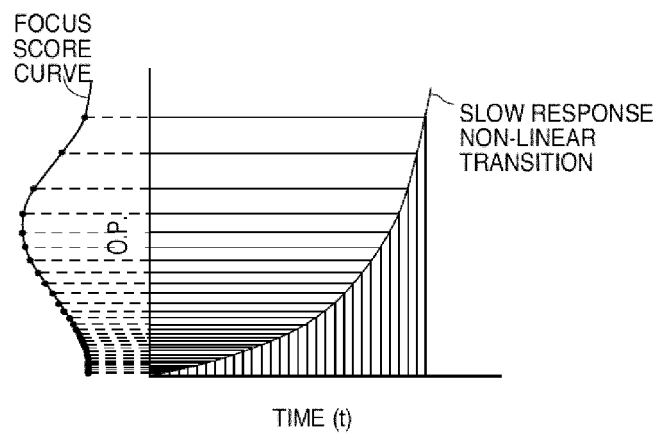
FIG. 6F is a schematic graph illustrating a slow response non-linear progression of optical power over time for a fast frame rate sensor, and the corresponding focus scores for a middle field object being imaged.
Figure 6G:
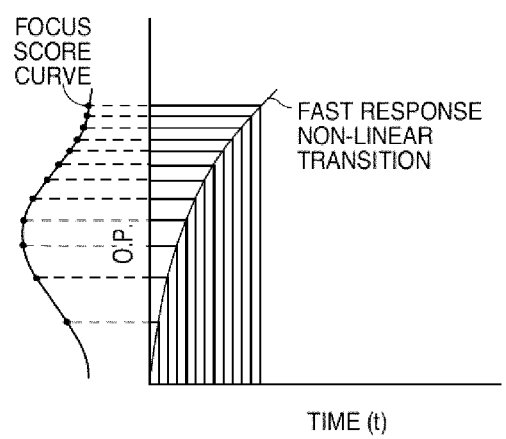
FIG. 6G is a schematic graph illustrating a fast response non-linear progression of optical power over time for a fast frame rate sensor, and the corresponding focus scores for a middle field object being imaged.
Figure 6H:
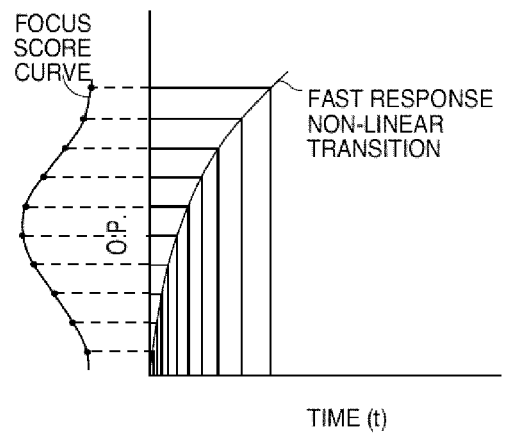
FIG. 6H is a schematic graph illustrating a fast response non-linear progression of optical power over time for variable focus sampling spacings, and the corresponding focus scores for a middle field object being imaged.

A fast frame rate sensor would be compatible with non-linear optical power response versus time curves, as illustrated in FIGS. 6F and 6G. Despite the steepness and non-linearity of these response curves, the sampling points are still sufficiently dense. In fact, it is conceivable that a frame rate sensor could be fast enough to allow the in-flight algorithm to drive the TLCL as fast as physically possible and still have an acceptable level of aberrations (i.e. immediately setting the drive voltage to its Vmax voltage). Such an optical power vs. time response curve would be far from linear (see FIG. 6G). Yet even under such circumstances, the sampling rate can be ample to be able to determine the focus score peak accurately, and abort the in-flight algorithm 700 quickly at, or very near, that peak. FIG. 6H illustrates how the timing of the focus sampling can be unevenly spaced (in time) so that the spacing of the determined focus scores on the focus score curve is even. This configuration would avoid needlessly measuring focus scores that are spaced very close together (i.e. to save on power consumption).

As mentioned herein immediately above, the response of TLCLs (and other TLCs) can sometimes deviate significantly from a linear response when mapping optical power against time, greatly reducing in some stages of the curve the number of samples. However, if the frame rate of the sensor is very high, the steepness of the response curve may be acceptable in terms of effective sampling rates across the optical range. Even at the steepest portion of the curve, the number of samples can be great enough that between samples only a relatively small portion of the optical range is traversed. Without limiting the invention, the nature of the continuous change in optical power can be configured in a variety of ways to suit various purposes (e.g. linear change across the optical range when mapped against time, non-linear change matching a desired curve, change designed to optimize the time needed to sweep across the optical range, etc.).

Therefore in general, with a fast frame rate sensor, the speed at which the TLCL can be driven, as well more generally the shape of the curve of optical power to time, can be manipulated in fairly arbitrary ways so that the autofocus process can achieve various desirable ends. One desirable end is to reduce to a minimum the overall time required for auto-focus. This can involve pushing the TLCL across the necessary portion of the optical range at the fastest (or approaching the fastest) speed possible that both allows that portion to be traversed while acquiring useful focus scores (i.e., focus scores that can be used to predict true focus quality at the various levels in the optical range) and allows the convergence at, or after, the end of that adjustment to a state where high quality, focused images can be acquired. The sampling ability of a fast frame sensor may also accommodate varying shapes of the optical power versus time curve under different operating conditions.

Implementation of a Fast Frame Rate Sensor for Focus Score Determination

Typically focus scores reflect the "sharpness" of an image by noting local regions of great contrast where the transition is especially abrupt. Generally, filters which calculate focus scores attempt to ignore what is merely noise in the image, since, especially on a pixel-to-pixel basis, that noise may look like a very sharp transition. Moreover, the filters may attempt to emphasize features that are of greatest interest to the user of the camera—for example, some filters attempt to emphasize transitions to be found in faces. Typically, too, the filters will attend to vertical edges in an image, because scan lines in a sensor are organized horizontally, and so vertical edges are the ones that show up in filters applied to those horizontal lines.

One way to achieve at least some of the effects of a fast frame rate sensor described herein above, even when the sensor may not be able to read out full frames at a fast frame rate, is to create a region of interest over which focus scores are actually calculated which is much smaller than an entire picture frame, and simply not read out the entire contents of the frame. This depends mostly on whether accurate focus scores can be obtained by relatively short integration times over the pixels being examined. That is, if the pixels do not require a great deal of integration time to come to an accurate assessment of intensity information (essentially, something that reliably responds to enough photons so that accurate intensity levels can be determined), and the reading out of a frame is principally gated by the amount of time it takes to read out all pixels from the frame, then subsampling the frame to calculate the focus scores can speed up the determination of focus scores. Such a speed up may be enabled either when the sensor is very sensitive to light, or when there is sufficient light for a given sensor in a given scene that the integration time for pixels in the frame is appreciably less than the (electronic) readout of the entire frame.

The subsampling can include contiguous lines of pixels in a given region, or portions of such lines, or these lines or portions themselves need not be contiguous only a subset within a given region (which region may be the entire frame or less). Indeed, even non-contiguous pixels within a line can be employed, further reducing the number of pixels that need be read out, so long as enough pixels are read out in a relevant proximity to generate meaningful focus scores.

Noise reduction techniques are used to prevent false focus score results (e.g. a false finding of "sharpness") due to the presence of noise in the image signal caused by any aberrations and transitions of the TLCL as its optical power is changed. Such techniques are used to reduce the impact of, and/or actually discard, focus score readings that might include transient noise from the image sensor which do not represent objects in the real image, and which could potentially drive the focus scores "through the roof" if not addressed. Noise reduction techniques can be important particularly when frame subsampling is employed to determine focus scores. Noise reduction techniques can be implemented on the image signal itself, and/or on the calculations made based upon the image signal. One noise reduction technique is the use of moving window averages, where each frame of data or subsampling (or calculations therefrom) are averaged with data or calculated results from adjacent frames of data or subsampled frames (within a predetermined window). This averaging can reduce the negative impact of transient data or calculations that are only present in a few or even one frame of data. Another noise reduction technique (which could be employed in conjunction with the moving window averages technique) is the use of peak outlier rejection, where focus score data (or calculations therefrom) are discarded if the specific data point or calculation deviates from its immediate neighbors by some threshold. This technique can potentially limit the negative impact of erroneous transient data (other than the loss of data or calculations for the discarded frame(s) of data).

As mentioned, this (subsampling) manner of achieving fast frame rate response does not generally produce a full frame, and therefore the data read out can't be used generally to produce an image that is useful to display to the user of the camera (one exception can be a case in which either the user is zooming in on an image, and/or one in which the user is in preview mode, and the pixels read out are sufficient to put together a reasonable video). However, if the frame rate is already fast enough, it may be possible to put together acceptable video, either in the preview mode or to commit to a recorded or otherwise usable video, simply by skipping a certain number of subsampled frames used to obtain focus scores, and reading out the entire frame, or what is necessary from that frame, periodically so that the video composed of those frames (or sufficient subsamples) is itself acceptable.

Employing the in-flight algorithm, once the focus score peak is identified, the TLCL optical power is then set to that which corresponds to that focus score peak. However, because the focus scores are determined without allowing the TLCL to settle at any given optical power and without any direct way of measuring the optical power when the peak focus score is achieved (or expected to be achieved), it can be difficult to determine the control vector needed for the TLCL to settle at the corresponding optical power for the peak focus score. However, reliable correlation between how much time has passed since the beginning of the optical power scan and the optical power can be determined through calibration. This correlation can be established for a set of control vectors used to implement the optical power scan, and can even be established for each individual TLCL. Therefore, the in-flight algorithm can also track the time that has elapsed since the beginning of the scan and the determined focus scores, and then uses the timing (or the predicted timing) of the peak focus score to determine which optical power generated (or is predicted to generate) that peak focus score (and the control vector needed to settle at the optical power). Said another way, the in-flight algorithm maps the elapsed scan time to optical power values achieved by the scan, and uses the elapsed times of the image acquisitions to determine which optical power value corresponds to the peak focus score and/or what drive signal is needed to get to that optical power value.

Variations in operating conditions (such as temperature, humidity, pressure, etc.) can introduce variances in the response time characteristics of the CTL (and TLCL in particular). Therefore, under certain conditions, the process of generating control vectors based upon scan timing may need to take into account the effects of environmental conditions and/or other factors. The variation, and hence errors in the response, can be corrected by modifying the control vectors appropriately. An alternate way of compensating for deviations in the response time includes storing response tables at calibration each tailored to a different combination of operating conditions, and to choose the correct response table after determining or sensing the operating conditions during the execution of the auto-focus algorithm.

TLC drive tables, as mentioned hereinabove, consist of a table of entries, where each entry is composed of a sequence of control vectors that are designed to induce a certain sweep in the TLCL optical power. This sweep can be interrupted at any time by a calculation (test) of the auto-focus algorithm signifying that the peak of focus scores has been reached or passed. As mentioned hereinabove, for the in-flight mode, there is a correlation between the amount of time that it has taken to reach and/or pass the peak focus, and the optical power of that peak. There can be a separate table that determines how to adjust from the various optical power levels at which the in flight mode algorithm might stop its travel across the optical range, to the optical power that corresponds to the actual or predicted peak. This may involve some interpolation between entries in the table in order to achieve the most accurate level.

There are a couple of accommodations that can be made to the drive tables to compensate for how operating conditions affect the response time of the TLCL. First, for each set of operating conditions (where each set includes one or more specific operating conditions that may affect the focusing operation) in the usable range, a specific table can be used for the initial activations across the optical range at that set of operating conditions. A minimum resolution in operating conditions can be used, and interpolation between these conditions can be utilized. Second, the table correlating time spent in the activation across the optical range to the optical power achieved at that time can be configured for each set of operating conditions. The auto-focus algorithm would therefore use the operating conditions as a pointer into the correct table to converge on to an accurate optical power. The operating conditions themselves can be monitored and measured using sensor(s) to detect for example: temperature, resistance, humidity, pressure, etc.

Advantages are derived from combining a TLCL with a fast frame rate sensor allowing the TLCL to travel through a number of focal planes in a short period of time, provided that those focus planes are relatively near, requiring relatively short adjustments in the optical power levels of the TLCL. Because the changes in optical power, and therefore in focal plane, can be very small from one frame to the next, the movement of objects in the image can be reduced. From frame to frame, object motion in the image is going to be greatly minimized. This allows much better and easier correlation between images so that objects can be tracked, whether the object movement is due to actual movement of the objects in the physical world, or due to changes in the positioning of the camera. Moreover, the camera can put together information from frames of neighboring planes of focus because each one of those frames is far less likely to exhibit motion blur. Motion blur is an especially troublesome issue in handheld devices in general, and for cell phone cameras in particular since cell phones are typically held with one hand when used to take pictures, and they are typically held toward the bottom (away from the camera lens toward the middle or top, exaggerating movements such as hand shaking).

It is understood that while reference has been made to focus scores and auto-focusing employing a TLC lens in describing process 700, the invention is not limited to TLC lens applications. Process 700 may be used for a generic TLC employing a different feedback score determination other than focus score determination.

While the above voltage modulation techniques have been found to perform very well, these suffer from one drawback, in that, high voltages and therefore significant power is required.

Frequency Control Tuneability

It is realized that with fixed electrode structures, such as those of prior art systems, no frequency tuning is possible and there is no way to perform complex shaping of the electric field profile. The proposed solution is further directed to a variable Tunable Liquid Crystal (TLC) optical device configured to control the propagation of light passing therethrough by employing frequency and amplitude excitation. Complex electric field profile shaping is provided. For example:

In accordance with a further aspect of the proposed solution, a variable optical device controlling the propagation of light passing therethrough makes use of a frequency dependent material and an electrical signal generator generating a drive signal at a plurality of frequencies and amplitudes to modify a spatial profile of the electric field. An electrical signal generator generates drive signal components at a plurality of different frequency and voltage combinations and supplies a combined drive signal to the electrodes of the TLCL 400 so as to generate an electric field across LC layer 510.

In accordance with an implementation of the proposed solution, the control signal for tuning the Tunable Liquid Crystal Lens (TLCL) 400 is provided by a frequency control signal circuit configured to cause the TLC lens 400 to change the optical power and as a result tune the focus of an incident image of a scene.

Modified Weakly Conductive Layer

In accordance with a preferred embodiment of the proposed solution, TLCL 400 employs a weakly conductive layer 426 including a frequency dependent material therein, and frequency control to provide further significant improvements in optical power change speeds (transition times) and consequently in auto-focus acquisition times. The frequency dependent material enables the WCL 426 to function as a frequency-responsive electric field gradient control layer by shaping the electric field applied to (and experienced) by the LC layer 510. Frequency control is provided by a variable frequency control drive signal circuit configured to cause the TLCL 400 to control light propagation as a function of control drive signal frequency at a selected corresponding RMS voltage amplitude (Vrms).

The material properties of the variable conductivity layer are such that supplying an Alternating Current (AC) drive signal to the variable conductivity layer leads to a spatially modulated electric field. With reference to FIG. 4, the electric field may have a portion substantially defined by the fixed hole-patterned conductive electrode 322, and a portion defined by the frequency dependent material in the weakly conductive layer 426.

The frequency dependent material of the WCL 426 interacts with the electric field and therefore affects the shape the electric field otherwise present between conductive electrodes 124 and 322. For ease of description, however without limiting the invention, the frequency dependent material may include a high dielectric constant material. Functionally, the frequency dependent material of this example has the characteristic of allowing a limited degree of charge mobility therethrough.

The frequency dependent material has a charge mobility which is dependent on the drive signal frequency causing a spatial profile of the electric field to vary as a function of drive signal frequency. Periods of time available for charge to flow within the frequency dependent material are longer at low frequencies which results in higher charge mobility. Similarly, at higher frequencies at the same Vrms amplitude, the electric potential in each positive or negative cycle is applied for shorter periods of time, and the resulting charge flow within the frequency dependent material is correspondingly greatly reduced. Thus "charge mobility" is used to refer to the overall ability of electric charge to (radially) penetrate within the frequency dependent material present in the aperture of the hole patterned electrode within the constraints of the alternating electric drive signal applied. Without loss of generality, for the reminder of the description herein, the weakly conductive layer 426/526 will be referred to as the frequency dependent layer 426.

Frequency dependent materials may consist of a variety of different possible materials. In one embodiment, the frequency dependent material is a thermally polymerizable conductive material, while in another embodiment frequency dependent material is a photo-polymerizable conductive material. Other possibilities include vacuum (or otherwise, e.g. "sol-gel") deposited thin films, high dielectric constant liquids, electrolyte gels, conductive ionic liquids, electronic conductive polymers, materials with electronic conductive nanoparticles, etc. The desired feature of the frequency dependent material being that it has a charge mobility that is frequency dependent. When the frequency dependent material is a thermally or photo-polymerizable conductive material, it may include: a polymerizable monomer compound having at least one ethylenically unsaturated double bond; an initiator that is a combination of UV-vis, NIR sensitive or thermally sensitive molecules; an additive to change the dielectric constant of the mixture, where the additive is selected from the group consisting of organic ionic compounds and inorganic ionic compounds; and a filler to change a viscosity of the mixture. The material may also include an adhesive selective from the group consisting of adhesives sensitive to UV-Vis, adhesives sensitive to NIR and adhesives polymerized using a thermal initiator. An optical elastomer may also be included.

When the frequency dependent material is a high dielectric constant liquid, it may include a transparent liquid material having an epsilon between 2.0 and 180.0 at a relatively low frequency that allows electric charge to move in a frequency dependent manner. When the frequency dependent material is an electrolyte gel material, it may include: a polymer material; an ionic composition; and an ion transporter. When the frequency dependent material is a conductive ionic liquid, it may include an ionic species selected from the group consisting of cholorate, perchlorate, borate, phosphate and carbonate.

For certainty, the presence of the WCL 426 in a TLCL layered structure greatly reduces the aberrations described with reference to FIG. 6A. Therefore, it is pointed out that the geometries limited in operation to the Vb to Vc range, and correspondingly limited to OPb to OPc range, even for voltage amplitude modulation only controlled TLCLs, represent example implementations only without limiting the invention thereto.

TLC Frequency Response

The frequency dependent layer 426 can be employed to dynamically create an effective electrode profile.

At zero frequency and zero Vrms amplitude, the LC layer 510 is governed by the orienting layers 112 and 114. LC molecules are substantially aligned, for example at 3°. The index of refraction of the LC layer 510 has no variability. No lensing is provided by the LC layer 510, and therefore the TLCL 400 provides zero optical power. This ground state is a passive state governed by the physical properties of the geometry.

Figure 10:
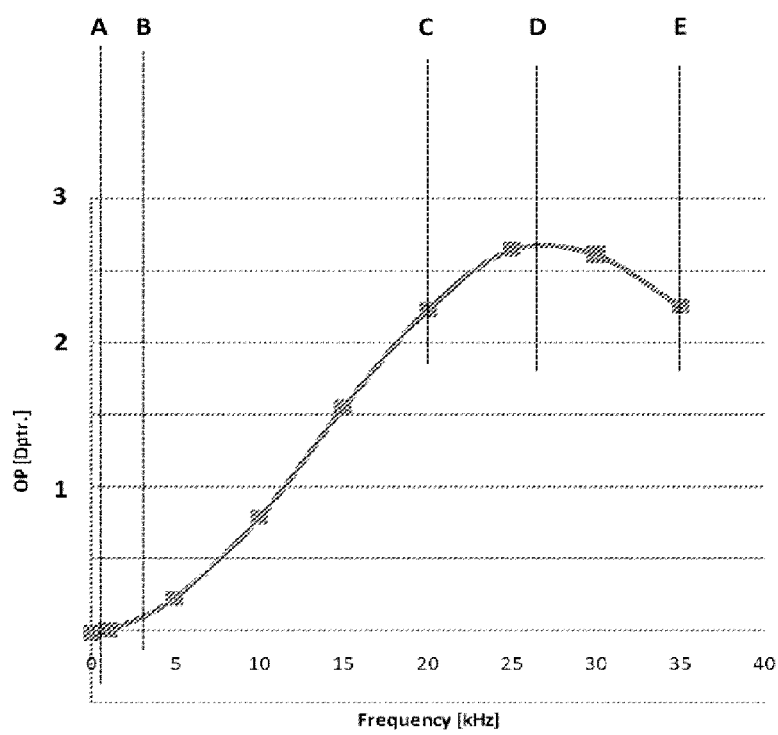
FIG. 10 is a schematic diagram showing a variation of a tunable liquid crystal lens optical property with drive signal frequency at constant root means square voltage amplitude.

FIG. 10 illustrates an observed non-linear optical property response of a tunable LC lens, having a geometry schematically illustrated in FIG. 4, to a frequency variable drive signal applied at fixed Vrms.

For a given (low) Vrms amplitude above an empirically determined threshold, an initial application of a relatively low frequency drive signal creates an effective uniform electrode profile as charge penetrates across (into) the aperture. A corresponding uniform electric field profile, created due to extensive charge penetration into the frequency dependent layer 426, lifts LC molecules across the LC layer 510 out of the ground state to have an initial orientation. Substantially all LC molecules will be reoriented to have a common angular orientation, for example 10° to 15° instead of the pre-tilt angle of about 3°. As described herein above, LC molecules having a common angular orientation, results in an LC layer 510 having low refractive index variability. substantially no lensing is provided by the LC layer 510, and therefore the TLCL 400 has negligible optical power. This state is an excited state governed by the properties of the variable conductivity layer including electrode 322 geometry and charge mobility in the frequency dependent layer 426 as described herein above. This initial excitation state lies in region A-B shown in FIG. 10 and may vary with material properties of the frequency dependent layer, Vrms and TLCL geometry. While the depicted optical property response to applied frequency is shown in region A-B to have a monotonically increasing cusped variability, such variability may not be relied upon for all liquid crystal materials and/or all Vrms amplitudes. At very low angles such as 4° little torque is applied on the LC molecules by the electric field, and the response has nonlinear effects as a lens is formed. Some LC molecules form alignment domains (disclinations) which can lead to drastic index of refraction variability in this A-B region before charge mobility takes over. As an example, for low Vrms amplitudes a usable low frequency at B can be as low as 100 Hz.

As the frequency of the drive signal is increased beyond B at constant Vrms amplitude, charge penetration into the frequency dependent layer 426 is changed (e.g. reduced). As described herein, as the frequency of the drive signal increases, a nonuniform profile of the electric field develops across the LC layer 510 and the LC molecules have a non-uniform angular orientation. In turn the variability of the index of refraction of the LC layer 510 is non-uniform and the LC layer 510 provides a corresponding lensing effect. Surprisingly, since all of the LC molecules were prealigned by the application of the low frequency B, no disclinations occur (persist) as the lens profile is introduced and the LC molecules efficiently respond to the electric field greatly reducing TLCL lens aberrations.

Within a drive signal frequency range at constant Vrms, between relatively low frequencies and relatively high frequencies, the frequency of the driving signal may be varied to provide a gradually changing optical power. In the context of TLCL 400, FIG. 10 depicts a rising variation in optical power. The optical power response beyond B is typically non-linear, for example a maximum optical power is reached at D, about 25 kHz. It is emphasized that maximum optical power being reached at 25 kHz is a consequence of a particular TLCL geometry, particular frequency dependent material selection, and particular low Vrms drive signal amplitude. Low alignment frequencies in the 100 Hz range and maximum optical power in the kHz range advantageously place the necessary frequency generator components into the manufacturable and miniaturizable realm.

It has been found that increasing the frequency at constant RMS voltage beyond frequency D leads to a gradual reduction in the optical parameter response. Beyond frequency D at the selected RMS voltage, the high frequency applied has a choking effect on charge flow in the frequency dependent layer 426 and the shape of the electric field applied to LC layer 510 is controlled by other TLCL properties, such as but not limited to: hole-patterned electrode 322 geometry and Vrms. In the case of the TLCL 400, optical power begins to weaken gradually beyond maximum optical power at D up to a frequency E.

Figure 11A:
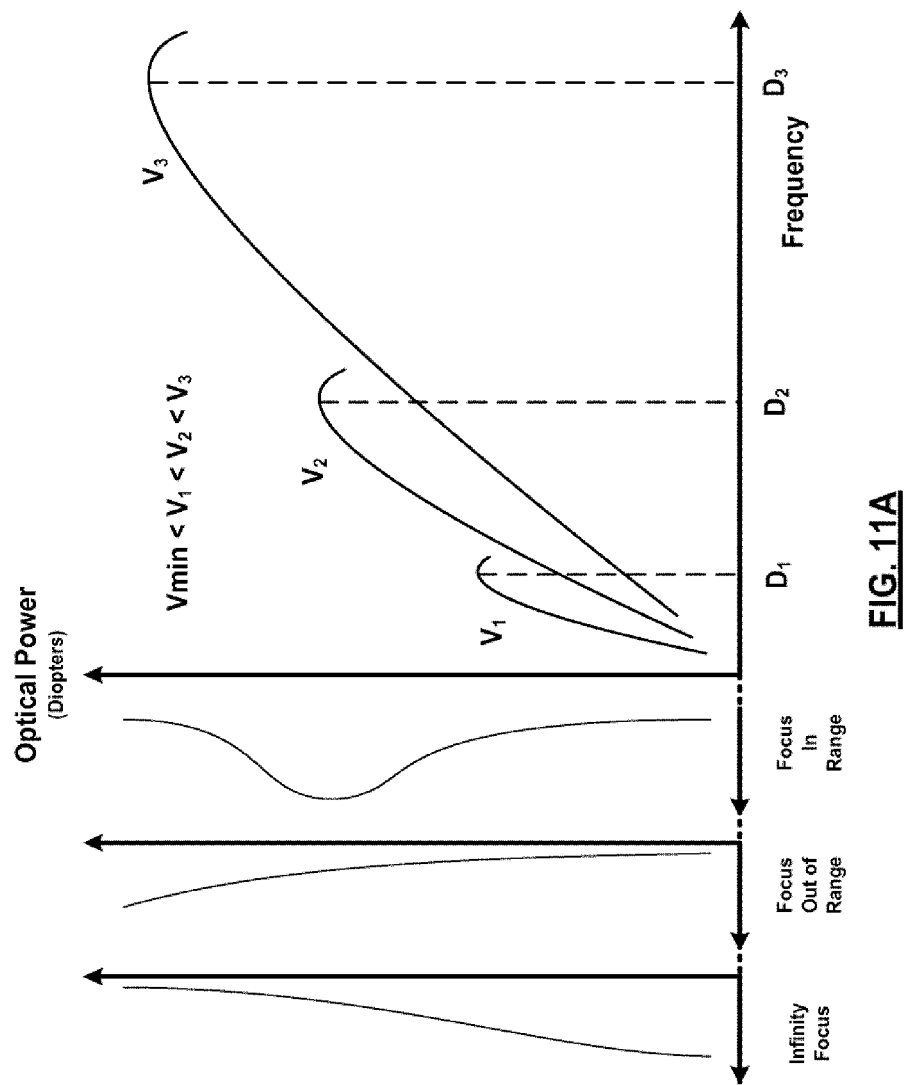
FIG. 11A is a schematic diagram showing a further variation of a tunable liquid crystal lens optical property with drive signal frequency and root means square voltage amplitude.

FIG. 11A shows optical power variability of a frequency controlled TLC lens 400 for different drive signal Vrms amplitudes. For each Vrms amplitude shown, increasing frequency corresponds to an increase (and subsequent decrease) in the optical power of the TLC lens. Depending on the higher Vrms amplitude applied, the alignment frequency B(Vrms) may be higher, the optical power range may have a higher maximum OPmax, that optical power maximum OPmax may occur at a higher frequency D(Vrms) illustrated as D1, D2 and D3 for three different Vrms amplitudes V1, V2 and V3. the choking frequency E(Vrms) may also be higher. Different usable frequency ranges B(Vrms)-D(Vrms) provide different optical power ranges OP(B(Vrms))-OP(D(Vrms)) depending on the Vrms amplitude of the drive signal with substantial overlap at lower frequencies. Such behavior is typical of a TLC lens 400 employing the geometry shown in FIG. 4 and is understood to extend to a TLC lens 500 employing geometry shown in FIG. 5.

For example, the optical power of such a TLC Lens can vary roughly from 8 to 16 diopters, which is suitable for most digital camera applications.

Forced Excitation to Alignment State

It has been discovered that the long relaxation time may be addressed by driving the TLCL with the alignment frequency B. And, further addressed by driving the TLCL with the alignment frequency B(Vrms(Min)).

Frequency Modulation Equipotentials

The frequency dependent layer 426 is employed to dynamically create an effective electrode profile. For example, electric field shaping is dependent on the frequency of the drive signal, which determines the extent of charge penetration into the frequency dependent layer 426. At a high frequency, corresponding to low charge mobility, the geometry of the hole-patterned electrode 322 has a greater contribution to the way in which the gradient control layer shapes the electric field. However, at a low frequency, corresponding to high charge mobility, the frequency dependent layer 426 creates an effective electrode surface, and the electric field shaping control layer 428 shapes the electric field according to the overall electrode geometry resulting from hole-patterned electrode 322 and the frequency dependent layer 426.

Figure 9:
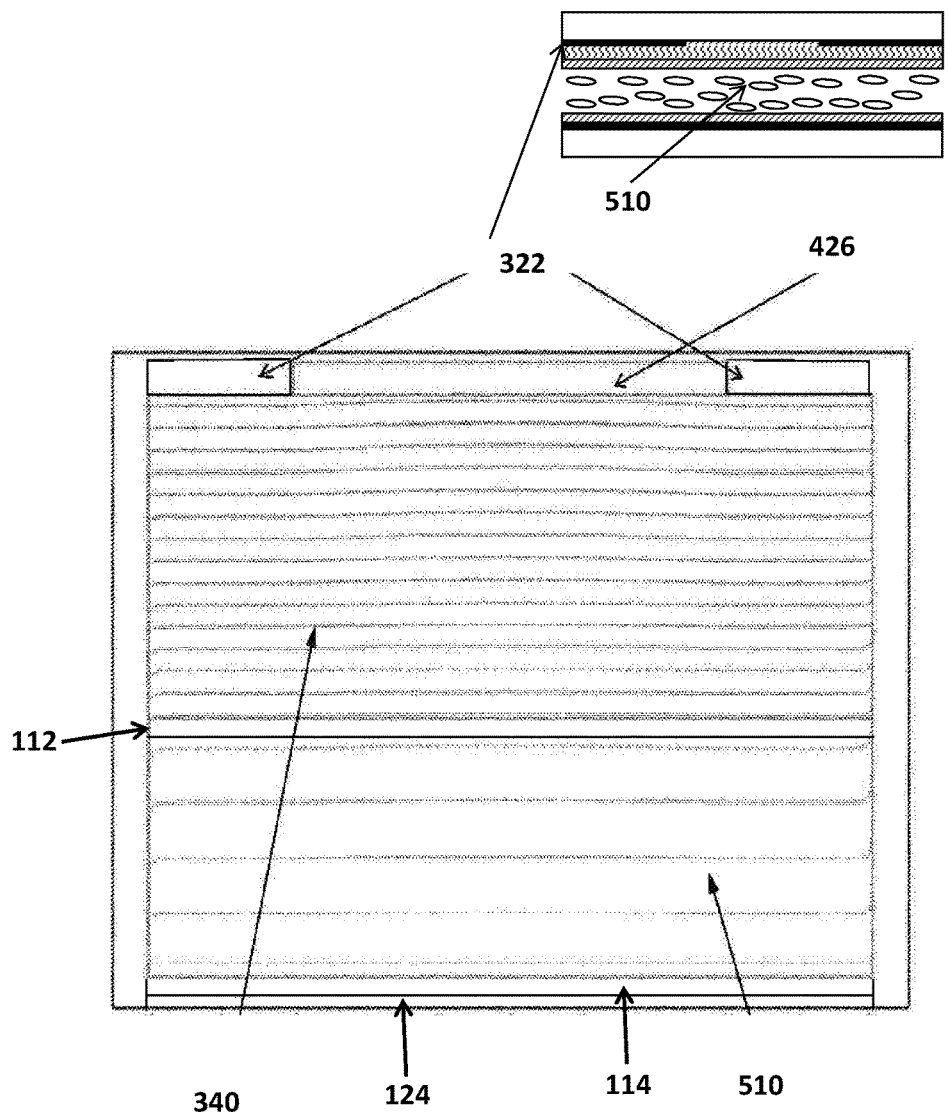
FIG. 9 is a schematic diagram illustrating another equipotentials distribution for a tunable liquid crystal lens subjected to a spatially invariant electric field in accordance with the proposed solution.

With reference to the layered structure of FIG. 4, a drive signal applied between the hole-patterned electrode 322 and the flat electrode layer 124 will, in the absence of any significant charge mobility in the frequency dependent layer 426, create a non-uniform electric field across the LC layer 510. This non-uniform field can, for example, give a lensing profile to LC layer 510 of a particular characteristic as described hereinabove. For example, FIGS. 8 and 9 illustrate corresponding equi-potential planes for the layered geometry illustrated in FIG. 4. As shown, in FIG. 8, the use of a moderately high drive signal, for example 30 kHz at 30 Vrms, creates a moderate amount of charge movement in the frequency dependent layer 426 which generates a particular electric field, shown as having a smooth gradient. The active frequency range depends upon the characteristics of the frequency dependent material and the Vrms amplitude used. The inset illustrates LC molecular orientation having a high variability and therefore the TLCL has a high optical power.

However, when the driving signal applied has a low frequency for which there is a significant amount of charge mobility in the frequency dependent layer 426, the charge penetration into the frequency dependent layer 426 creates an effective electrode structure extending into the control electrode aperture (350) in the center of the hole-patterned electrode 322. An effective electrode is created which is substantially flat across the entire structure. This "horizontal" (radial) extension of the hole-patterned electrode 322 changes the electric field profile to be uniform as a result of the two effectively uniform electrode structures 322-426 and 124. This uniform field has a uniform orienting effect on the liquid crystal molecules so that any lensing effect is erased.

As shown in FIG. 9, the use of a relatively low frequency driving signal, for example 1 kHz at 20 Vrms, results in greater charge penetration into the frequency dependent layer 426. This flattens the electric field profile, introducing correspondingly uniform LC molecular reorientation. The flat equi-potential surfaces correspond to a flat electric field across the diameter of the lens. Here also, the "low" frequency range depends upon the characteristics of the frequency dependent material used. The inset illustrates LC molecular orientation of low variability and therefore the TLCL has a low optical power.

It has been discovered that the use of relatively low frequency drive signals reduces disclinations (orientation defects). Use of flat electric field profiles provided by low frequency drive signals allow the "erasure" of a lens. Therefore lens erasure may be provided at low frequency without necessitating additional electrodes or a drastic change in the driving voltage to very low (e.g., 0 Volts) or very high voltages (e.g., 100 Volts), which tend to reduce TLCL performance or violate voltage limits of a host device.

Figures 22A, 22B:
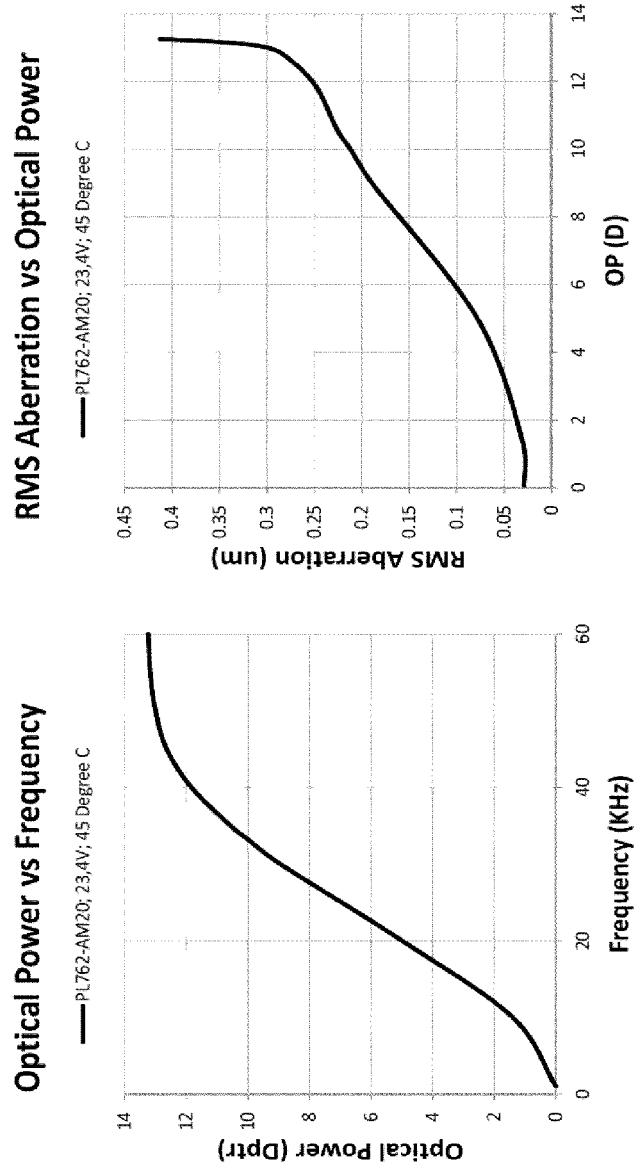
FIG. 22A is a steady state transfer function plot illustrating optical power variability with driving signal frequency in accordance with the proposed solution.
FIG. 22B is a steady state transfer function plot illustrating root means square aberration variability with optical power of a frequency controlled tunable liquid crystal lens in accordance with the proposed solution.

Experimental data presented in FIG. 22A illustrates a steady state transfer function plot showing optical power variability with drive signal frequency for a frequency controlled TLCL 400 having a frequency dependent layer 426. FIG. 22B illustrates a corresponding measured steady state transfer function plot showing RMS aberration variation with optical power for the same frequency controlled TLCL 400. For the particular TLCL 400 geometry tested, RMS aberrations below about 0.2 um can be tolerated, which limits low aberration optical power variability of the TLCL 400 to about 10 diopters and the drive signal to a maximum frequency of about 30 kHz to 33 kHz at constant amplitude of about 28 Vrms to 32 Vrms. It is emphasized that the operational parameters just mentioned are merely illustrative and not intended to limit the invention, these operational parameters depend greatly on TLCL geometry and materials employed.

Focus Control

In accordance with the proposed solution, the frequency variable optical power response of an optical device is employed in a TLC lens to create a lens with a variable focus. Focus can be varied between a minimum and a maximum by employing mixed frequency and amplitude control based auto-focusing algorithm to provide an improved auto-focusing performance.

In accordance with an embodiment of the proposed solution, response curve characteristics shown in FIG. 10 include pre-alignment drive signal configuration within frequency range A to B, a substantially linear optical power response to frequencies in frequency range B to C, and a substantially non-linear optical power response to frequencies in frequency range C to E. The non-linear optical power response in frequency range C to E forms a gradual apex at D. Frequency range B to C, and therefore frequency C may be defined a by what is known in the art as good linear response, typically considered linear within a threshold. Without limiting the invention, frequency C may be an inflexion point on the response curve, however practice may dictate otherwise. The charge flow choking experienced by TLC's in frequency range D to E has been found to have limited use for focusing applications employing a TLC optical device in TLC lens, and in particular for auto-focusing applications.

Non-linearities in the response of the optical device to drive signal frequency changes at a given Vrms amplitude does not impede operation of the optical device. On the contrary, the conservative frequency range A-B of the frequency dependent layer 426, desirably reducing disclinations, provides a relatively wide active frequency range B to D. By configuring TLCL 400 to focus at infinity in the U-LOP ground state or at B(Vrms(Min)), an ample frequency range B to D is advantageously provided for focusing objects between infinity and a closest focusing distance corresponding to maximum optical power OPmax. More advantageously, the decreased optical power response to frequency in frequency range C to D enables relatively more gradual focus tuning at the closest focusing distance. It has been found that for the same TLCL geometry, the usable optical parameter range available within the usable drive signal frequency range B to D for a selected Vrms is typically less than the usable optical parameter range available by applying variable voltage drive signal control. However, the multiple overlapping optical parameter ranges corresponding to multiple Vrms substantially cover the optical power range otherwise provided by variable voltage control.

In accordance with the proposed solution, non-linear properties are exploited to improve optical device operation. With reference to FIG. 11, multiple frequency and Vrms drive signals may provide the same optical power, however not all focusing distances possible for the given TLCL 400 geometry and frequency dependent layer 426 may be attained at a given fixed Vrms. The Vrms may be varied, within a range, to access different focus ranges, however the cost of employing higher Vrms includes increased power consumption and a corresponding increase in the time needed for relaxation.

It bears mentioning that applying drive signals having successively higher frequencies at constant Vrms represents operation in relaxation mode or direction. While this may seem counterintuitive it can be understood based on charge mobility aspects of the frequency dependent layer 426. The high charge mobility at an initial low frequency causes charge to penetrate the frequency dependent layer 426 a great deal and increasing frequency requires removing charge from the frequency dependent layer 426. Considering the capacitive and high resistance properties mentioned hereinabove, removing charge from the layered structure is slow. Conversely, lowering frequency requires further charge addition to the TLC structure and further charge penetration into the frequency dependent layer 426. Therefore, applying successively lower frequencies at constant Vrms represents operation in the excitation mode or direction. The response of a TLC to a relatively fast decreasing frequency drive signal at constant Vrms is not only comparatively fast but desirable.

It is understood that "fixed Vrms operation" or "fixed frequency operation" is referred to in the present specification only to simplify the description of the characteristics of the TLC structures presented. Actual operation, as described herein below, employs mixed frequency and Vrms amplitude drive and in particular a specific mixed signal drive providing fast auto-focus functionality in a TLCL. In accordance with the proposed solution, fixed Vrms operation is employed in order to delay power increase and LC molecular saturation to the extent possible to reduce relaxation times and power consumption.

For a digital camera configured to operate in a manual focus mode the reduction in response speed caused by high drive signals having high Vrms amplitudes may not be an issue. For example, the increased power consumption may be considered a non-issue as power is consumed at increased rate only when the camera is manually actuated by the user particularly to acquire focus. Arranging the camera to focus an infinitely distant scene in the U-LOP ground state on the image sensor, otherwise permits the user to operate the camera to compose the scene at low power consumption.

Focus Search Algorithms (Auto-Focusing)

Frequency controlled TLC lenses exhibit low aberration levels with continuously changing optical power. This type of TLCLs (referred to herein as "continuous TL", or CTL), are suitable for implementing a continuous in-flight auto-focus (IFAF) search algorithm in an auto-focus system.

While the proposed solution is described herein with respect to frequency controlled TLC lenses, the proposed solution may generally be applied to any appropriate CTL.

For in-flight auto-focusing, there preferably is a prescribed table of one or more sequences of control vectors designed to take the TLCL (and CTL in general) across the usable optical range, also called "sweep", in an optimal continuous fashion. Such control vector sequences are referred to as a "sweep regime" or "sweep drive regime". It is preferable but not necessary to synchronize the in-flight sweep regime with the rate at which image frames are captured by the photosensitive image sensor of the digital camera, and hence the rate at which the focus scores are generated.

All Excitation in-Flight Maximum Focus Tracking Implementation

Figure 12:
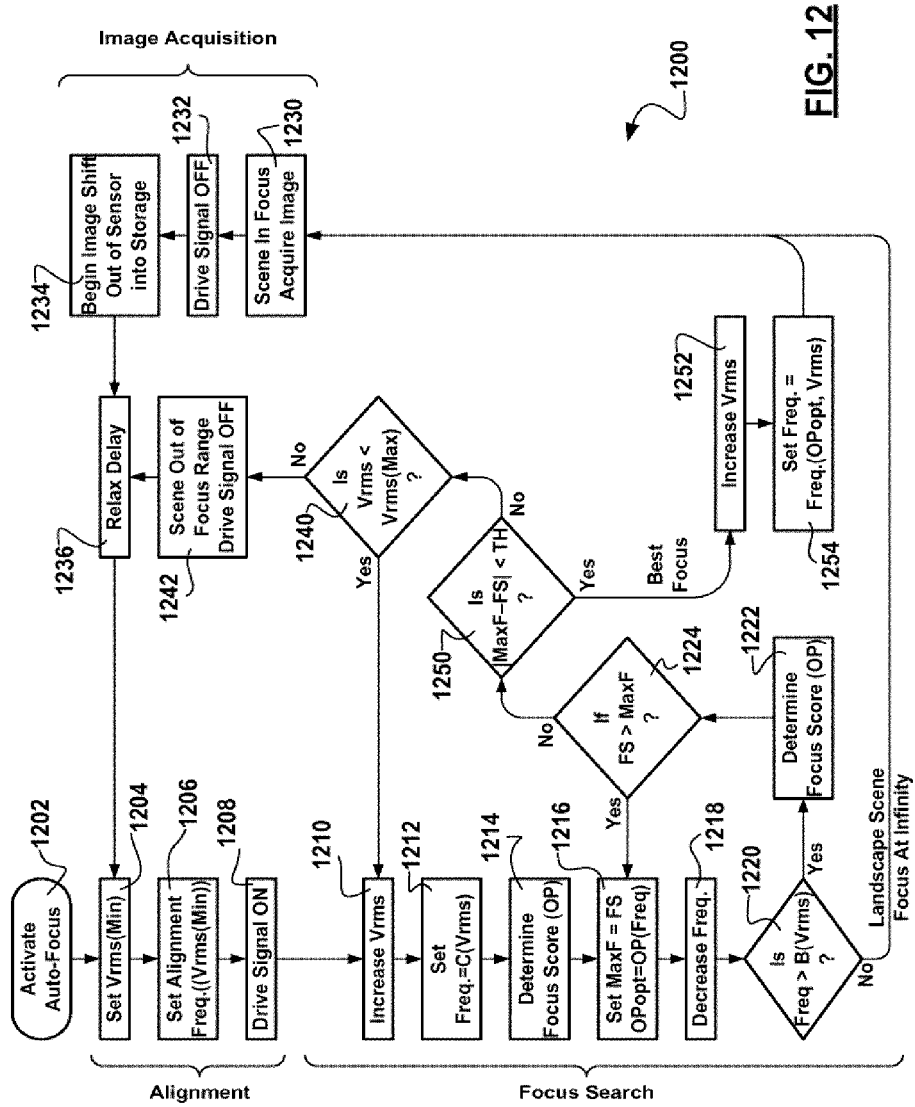
FIG. 12 is a flow diagram showing mixed frequency and root means square voltage amplitude excitation in-flight auto-focusing process of a tunable liquid crystal lens in accordance with the proposed solution.

An in-flight maximum-focus-tracking auto-focusing process is illustrated in FIG. 12 in accordance with an embodiment of the proposed solution. Process 1200 is initiated by the activation 1202 of auto-focus functionality.

In order to reduce disclinations, the process pre-aligns the LC molecules. Initial drive signal parameters for the TLCL are set to a lowest RMS voltage Vrms(Min) 1204 in the TLCL characterization table and set to an initial alignment frequency B(Vrms(Min)) 1206. The drive signal is turned ON 1208 and the LC molecules are lifted from the ground state U-LOP, for example to an angle between 10 to 15 degrees.

The auto-focusing process continues with focus acquisition via a focus search. Having aligned the LC molecules using the low frequency B(Vrms(min)) any further frequency tuning (necessarily employing higher frequencies) at the same Vrms(min) would be in the relaxation mode. In order to perform auto-focusing in the excitation mode, the Vrms amplitude of the drive signal is increased 1210. The choice of Vrms dictates boundary conditions of the auto-focusing process. A balance is sought between focus acquisition processing overheads, power consumption and length of time the relaxation takes. For example, the highest Vrms can always be used which provides access to all available optical powers in a single sweep, however the highest Vrms incurs highest power consumption and guarantees incurring the longest relaxation time. Focusing on near objects may benefit most from employing the highest Vrms first. Conversely employing small Vrms increments increases focus acquisition processing overheads as the lower optical power range is traversed multiple times during the focus search. However the power consumption is conserved and the relaxation time is shortest. Focusing on far objects may benefit most from such conservative Vrms increments. It has been found that a Vrms increase corresponding to a ½ diopter optical power increase strikes a good balance. It is noted that the Vrms increments are expressed in terms of optical power which may not have a linear correspondence with Vrms because of the optical power response curve as described herein. FIG. 11*b* illustrates progressions of charge mobility induced voltage distributions across a cross-section through a TLCL corresponding to FIG. 11*a*. Vrms sweep is illustrated as the vertical progression on the page while frequency sweeps are illustrated as horizontal progressions across the page.

Focus acquisition begins by characterizing the focus curve of the scene. Examples of focus curves are shown in FIG. 11*a* for objects in the scene located at infinity, objects in the scene located too close and out of the focus range, and objects in the scene located in the focus range. The frequency of the drive signal is initially set 1212 to a high value, for example at or near C(Vrms), illustrated as C(V1) in FIG. 11b, and a focus score is determined 1214 for the optical power obtained from the TLC lens characterization table. This being the only focus score determined, a maximum focus score register MaxF is set 1216 to the just obtained focus score (FS). An optimum optical power register OPopt is set to the optical power corresponding to the frequency and Vrms of the drive signal.

In order to determine the variance of the focus score with optical power, the frequency of the drive signal is decreased 1218 in order to drive the TLCL in the excitation direction while holding Vrms constant. Without limiting the invention, decreasing the frequency of the drive signal can be implemented by looking-up an adjacent TLC lens characterization entry having a next lower frequency at the same Vrms. While (1220) the selected drive signal frequency is above B(Vrms), a subsequent focus score is determined 1222 for the optical power of the drive signal having the decreased (1218) frequency. If the newly determined focus score is greater 1224 than the focus score stored in the MaxF register, the process 1200 resumes from 1216 by storing the higher focus score in the MaxF register. The auto-focus algorithm follows this cycle while progressing toward higher focus scores in the excitation direction by decreasing frequency at constant Vrms.

If decreasing frequency 1218 continues to produce better 1224 focus scores, the process 1200 sweeps through the C(Vrms)-B(Vrms) frequency range at constant Vrms following the corresponding optical power response curve eventually reaching 1220 B(Vrms). Without limiting the invention, the speed of the frequency sweep in this excitation direction may be dictated by the frequency density of entries in the TLC lens characterization table. For example, FIG. 11b shows a variable number of characterization table entries for each Vrms. In accordance with other implementations, interpolation may be used to increase the density of the frequency sweep or table entries may be skipped in the frequency sweep to decrease the density of the frequency sweep. Frequency sweep density selection may be made in view of the slope of the optical power response curve and/or the slope of the focus curve. With the highest focus score at B(Vrms) the TLC lens 400 employs the lowest optical power which signifies that the scene being imaged is a landscape scene for which infinity focus is the best focus. This corresponds to the left most focus curve in FIG. 11a.

With the scene in best focus at infinity, a digital image is acquired 1230 by the image sensor. The drive signal is turned OFF 1232. The digital image is shifted out 1234 into storage while LC layer 110 is allowed to relax 1236 to the ground stated U-LOP in order to start the auto-focus process anew from 1204. Shifting the image out of the image sensor is a relatively long process, therefore advantageously relaxing the LC molecules as the image shifts out does not impede auto-focus functionality. Advantageously, focus at infinity is acquired in a single frequency sweep in the excitation direction at the next lowest Vrms above the Vrms(min) employed for LC molecular alignment.

If the subsequently acquired focus score 1222 at the lower 1218 frequency is lower 1224 than the focus score stored in the MaxF register, this signifies that the auto-focus algorithm would be progressing toward lower focus scores in the excitation direction by decreasing drive signal frequency at constant Vrms. A higher focus score may be found at higher Vrms. That is the objects in the scene require an optical power outside the focus range corresponding to the current Vrms.

The process 1200 continues by increasing 1210 the Vrms amplitude of the drive signal and setting 1212 the frequency of the drive signal to D(Vrms) of the increased Vrms. This is schematically illustrated by advancing to the next row in FIG. 11b—advancing to the next row may be performed mid row before B(Vrms) is reached in the frequency sweep. The process 1200 attempts another frequency sweep at the increased Vrms amplitude. If the subsequently acquired focus score 1222 at lower frequency 1218 continues to be lower 1224 than the focus score stored 1216 in the MaxF register, this signifies that a higher focus score may be found at a yet higher Vrms. The process continues by increasing Vrms 1210 until Vrms(Max) is reached in 1240. Without limiting the invention, the speed of Vrms sweep may be dictated by the Vrms density of entries in the TLC lens characterization table. In accordance with another implementation, table entries may be skipped in the Vrms sweep to decrease the density of the Vrms sweep. This would correspond to skipping a row in FIG. 11b while advancing. Vrms sweep density selection may be made in view of the slope of the focus curve. For example, increasing 1210 Vrms to provide a corresponding half diopter increase in optical power has been found to provide adequate auto-focus search coverage.

If Vrms(Max) is reached 1240 while focus scores decrease with decreasing frequency about C(Vrms(Max)), this signifies that the scene may be out of the focus range of the TLCL 400 (to close). This condition is illustrated in the middle focus curve in FIG. 11a. The drive signal is turned OFF 1242 and a relaxation delay is entered 1236. The relaxation delay 1236 in this case is the longest, however such long relaxation delay may not negatively impact auto-focusing speed as typically the user is informed via a user interface to reselect/recompose the scene all of which takes time. The process 1200 resumes anew from 1204.

If the subsequent focus score 1222 is higher than the focus score stored 1216 in the MaxF register after a subsequent Vrms increase 1210, this is indicative of the best focus score being in the focus range of the TLCL 400. This is illustrated in the rightmost focus curve in FIG. 11a. The process 1200 sweeps in the excitation direction through decreasing 1218 frequencies in search of a better focus at frequencies lower than C(Vrms).

If subsequently determined focus score 1222 is found 1224 to be lower than the focus score value stored 1216 in the MaxF register while sweeping through frequency in the excitation direction, this condition is considered indicative of having overshot to peak focus. Assuming adequate frequency sweep density, this focus score variation past peak focus is differentiated from the same condition being encountered far from peak focus by a characteristic low focus score variability about the peak of the focus curve. Without limiting the invention low focus score variability may be detected 1250, by comparing the absolute difference between the last acquired focus score and the focus score stored in the MaxF register with a focus variability threshold TH value.

In accordance with the proposed solution, if low focus score variability is detected 1250, Vrms is increased 1252, that is the drive signal is adjusted in the excitation direction, in order to return to the higher focus score in an image acquisition excitation state. Without limiting the invention, the required frequency at the increased Vrms is set by looking up the (closest) frequency in the TLCL characterization table corresponding to the increased Vrms and the optical power value stored in the OPopt register. For TLC lenses having characteristic optical power response curves as illustrated in FIG. 11a, the required frequency at the higher Vrms is higher and represents a drive signal adjustment in the excitation direction. For example, determining the required frequency may include interpolation.

With the TLCL 400 driven at best focus, process 1200 continues from 1230 by acquiring the image in the image acquisition excitation state, turning the drive signal OFF 1232 and shifting the image out of the sensor into storage while the TLCL 400 relaxes 1236 to the ground state.

Employing non-predictive hill climbing algorithms, such as but not limited to the one illustrated in FIG. 12, causes the auto-focusing system to overshoot the desired optical power for a best achievable focus score requiring backtracking to that desired optical power. Without limiting the invention, focus overshoot may either be incurred (1218) due to sparse frequency sweep density or purposefully incurred (1218) in order to ensure that focus score determination errors are accounted for. Employing prior art variable voltage driven techniques, optical power backtracking requires LC layer 110 relaxation and therefore incurs unacceptable auto-focusing delays. Advantageously, providing backtracking in optical power by increasing drive signal Vrms amplitude with a frequency reset in accordance with the proposed solution, a complete cycle of increasing and decreasing the optical power may be performed always in the excitation mode (that is without requiring relaxation during focus acquisition).

Employing the non-predictive hill climbing algorithm may incur overshoot mitigation with limited computational overhead. For certainty, an exclusive use of the non-predictive hill-climbing focus search algorithm is not implied.

Process 1200 may be modified to implement a full search auto-focus algorithm by storing focus score and optical power tuples during the frequency sweep at a given Vrms at 1216 and comparing (1224) all focus values stored after the frequency sweep as reached B(Vrms) to determine the maximum focus score and the relation of the tuple with maximum focus score in respect of the other tuples.

Hyperdrive Sweep

As mentioned herein above with respect to voltage amplitude controlled TLCs illustrated in FIG. 6B, for some TLCs the usable transfer function does not capture the full range of relevant optical behavior in the TLCL. Aside the optical power range, in terms of diopters, the TLCs also must exhibit good behavior in terms of optical aberrations apart from defocus, as well as sharp, well contrasted images, such as would be reflected in a Modulation Transfer Function (MTF) illustrated in FIG. 6A. Some TLCLs are limited in operation to the low aberration range OPb-OPc (Vb-Vc) illustrated in FIG. 6B due to deleterious effects of driving such TLCLs with drive signals corresponding to the rest of the Modulation Transfer Function illustrated in FIG. 6A. Driving TLCL's too hard (close to OPmax/Vmax) causes problems including instability, overheating, excessive noise, and possible irreparable harm to the liquid crystal material. From the standpoint of a camera system, all of these metrics need to be working at a sufficient level, and responding with sufficient speed, for the camera system to be considered well functioning. The simplest and most direct method to change TLCL 400 from one optical power level to another is just to determine the targeted optical power level, look to the transfer function to see what stable control vector corresponds to that optical power, and then apply the drive signal (voltage) that corresponds to the stable control vector. However, it may be necessary to step thru a sequence of control vectors to increase speed performance, and/or account for any dynamic behavior of TLCL 400 in order to converge towards a desired voltage and hence optical power level:

FIGS. 14 to 20 illustrate the concept of a HyperDrive Sweep (which is related to the overdrive feature described herein) to speed up the time it takes a TLCL to transition to the desired optical power (for focusing), and enhance the ability of the auto-focus algorithm to determine a maximum focus score. HyperDrive Sweep is disclosed in the context of two basic TLCL auto-focus techniques for sweeping through the range of possible optical powers to determine the desired target optical power: "upsweep", and "fly and learn":

FIG. 10 illustrates the "upsweep" method (which will be abbreviated UpS hereafter) for TLCL autofocus. The auto-focus method uses a series of drive signals applied to the TLCL implementing small one diopter steps to make the TLCL to transition from a zero diopter optical power OPc (denoted D0) to a ten diopter optical power OPb (denoted D10) which is assumed for this example to be the greatest usable optical power of the TLCL. Focus Scores (FS) are measured at each diopter to determine a maximum score (i.e. the diopter optical power for which the corresponding focus score is higher than the two adjacent scores). Eleven such steps are needed to make the complete sweep from D0 to D10. Each step requires a different drive signal (i.e. by varying one or more of the following: voltage, pulse frequency, pulse length, or temperature) to cause the optical power to change from 0 (the infinity focus position) to 10 diopters (the D10 position at 10 cm say).

Figure 15:
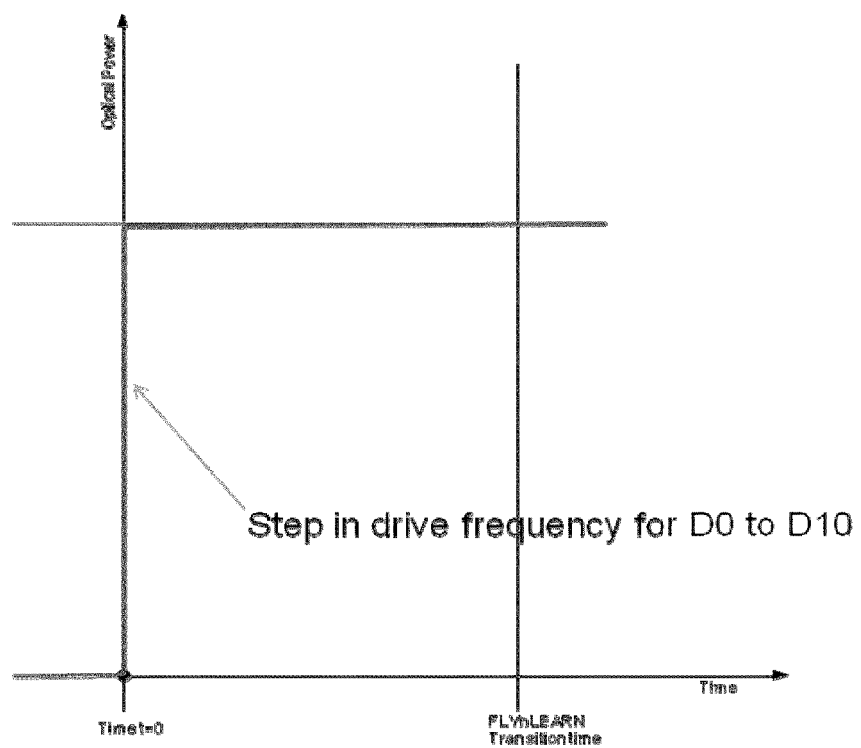
FIG. 15 is a schematic plot illustrating a fly-and-learn auto-focus technique in accordance with the proposed solution.

FIG. 15 illustrates the "Fly and Learn" TLCL auto-focus method which uses a single step function in the drive signal supplied to the TLCL to make it transition from a zero diopter optical power (denoted D0) to a ten diopter optical power (denoted D10) as fast as possible. If the TLCL were infinitely fast in changing its optical power, then the lens would instantaneously go from a low magnification (D0) to a highest magnification (D10). However, because the TLCL technology employees liquid crystals, it takes a finite amount time for the molecules to reorient themselves so that the final magnification factor is achieved.

It has been discovered that the sweep time for the upsweep technique is actually faster than the sweep time of the fly and learn technique. This counterintuitive discovery is understood to be caused by the fact the molecular changes caused by a large drive signal change applied in the fly and learn method can cause anomalies (not necessarily including disclinations) in the liquid crystal material that are avoided in the stepwise increase of drive signal using the upsweep method.

Both the fly and learn algorithm and the upsweep algorithm for autofocus measure focus scores (FS) as a measure of how sharply the image is in focus during a given period of time and map the peak in the focus score set to the proper drive signal for the TLCL such that the most "in focus" image is generated. One key to the fly and learn method and the upsweep method is finding the shortest possible time to measure a sequence of focus scores such that all the various diopter positions are adequately resolved. If the time is too short, then certain diopter steps in the D0, D1, . . . D9, D10 sequence will not be resolved. If the real life object was at one such diopter step, that object could not be resolved and then the final image would be "out of focus." In order to capture still images as fast as possible, it is desirable to make the auto-focus algorithm operate in the shortest possible time. Therefore, it is important in the fly and learn algorithm and the upsweep algorithm to choose the optimal time which allows all diopter steps to be resolved, and at the same time is as short as possible.

Figure 16:
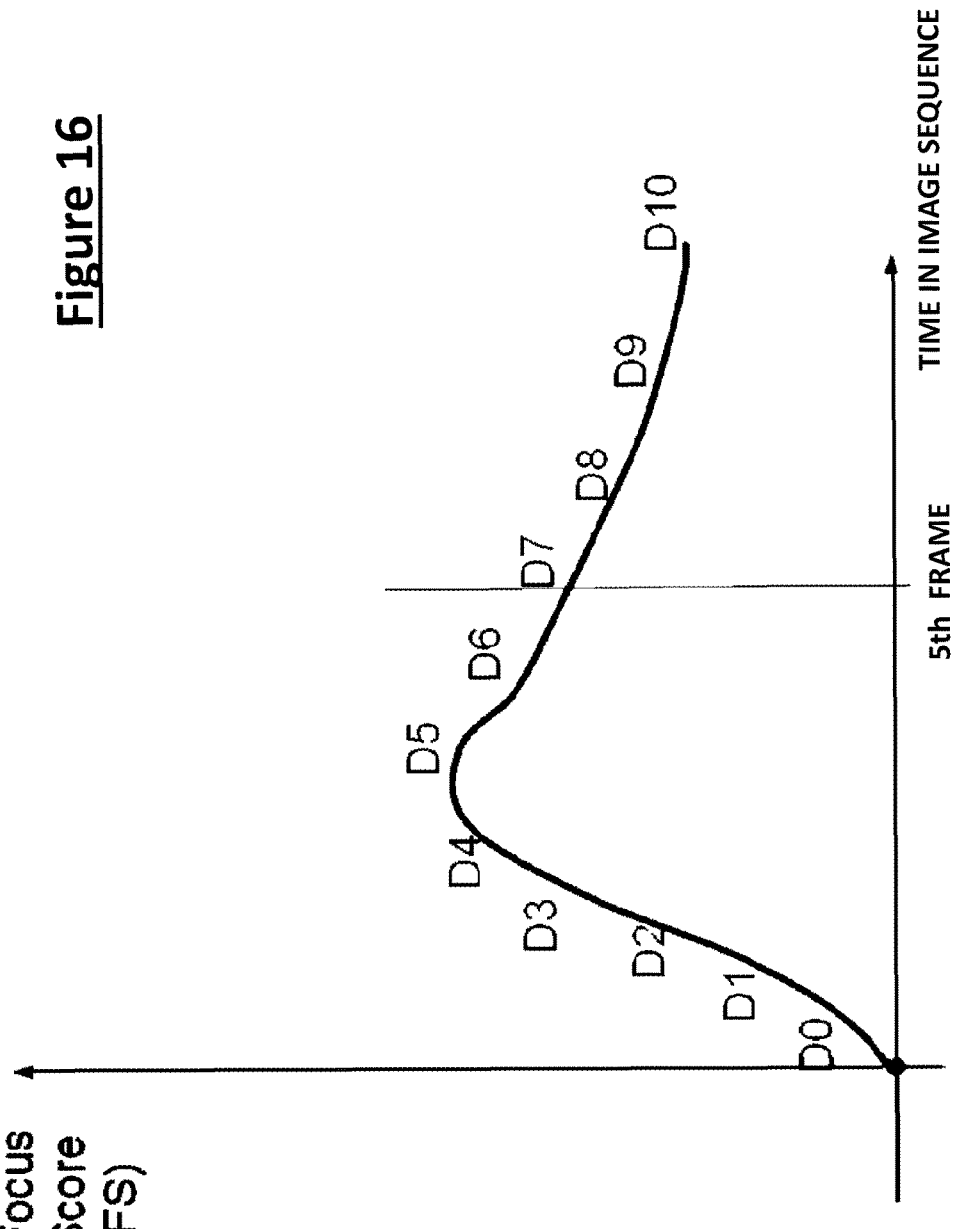
FIG. 16 illustrates a schematic graph showing a measured focus score variation for an image scene in focus by driving the tunable liquid crystal lens to exhibit five diopter magnification.

FIG. 16 illustrates a graph of focus scores acquired during a typical fly and learn or upsweep sequence with the image scene in focus at D5 magnification. The line shows a curve that passes through each of the focus score values which are generated at each frame time during the imaging sequence. The peak near D5 indicates that the image generated with the TLCL transitioning through the D5 optical power point generated the sharpest image in the sequence during the fly and learn or upsweep operation. A mapping between the time when the peak focus score was obtained from the imaging sequence, to the proper drive signal necessary to reproduce this optical power is obtained from a calibration operation.

Figure 17:
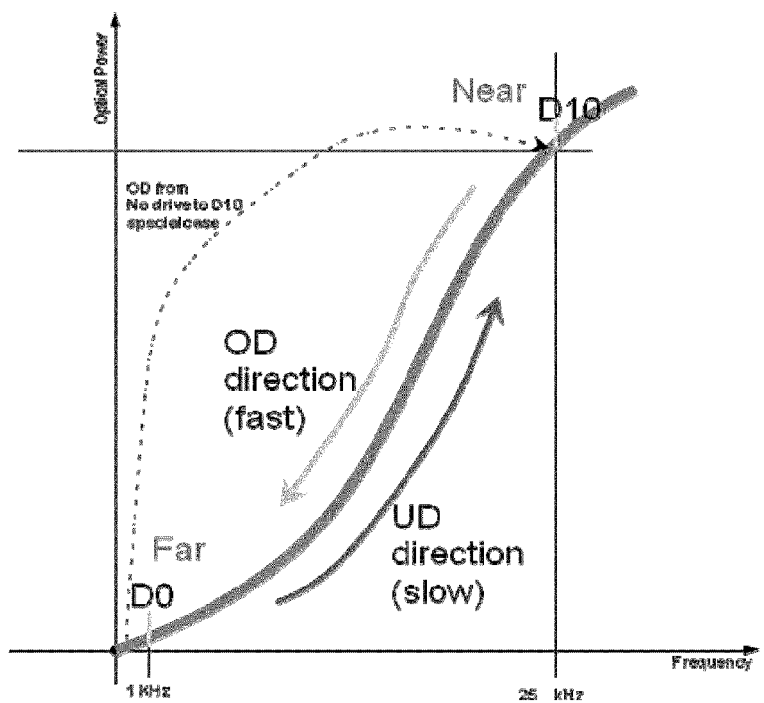
FIG. 17 is a schematic plot illustrating the relationships between near and far field focusing and tunable liquid crystal device excitation speed.

As illustrated in FIG. 17, the TLCL has an unusual (time asymmetric) property that the time it takes for the lens to progress from D0 to D10 is much longer than the time it takes from the lens to progress from D10 to D0, this is particularly so for voltage amplitude modulation control in the low aberration region between OPb and OPc illustrated in FIG. 6B. The "UD" progression direction of the fly and learn or upsweep methods corresponds to (sweeping up) applying drive signals in the (slow) relaxation direction. As a result of this property, the time needed for the fly and learn or upsweep methods to resolve image scenes whose focus score peaks are in the near field (that is, requiring the highest magnification) are significantly longer than for image scenes for which the focus score peak is in the far field (that is, the scene is located far away). Because of this property, it is very difficult to resolve focus scores for images in focus at D9 or D10 within short periods of time. Once peak focus score is determined and the required optical power to acquire a sharp image is determined, backtracking by applying the corresponding drive signal is in the excitation direction and therefore benefits from a fast transition in the "OD" direction illustrated in FIG. 17.

Figure 18:
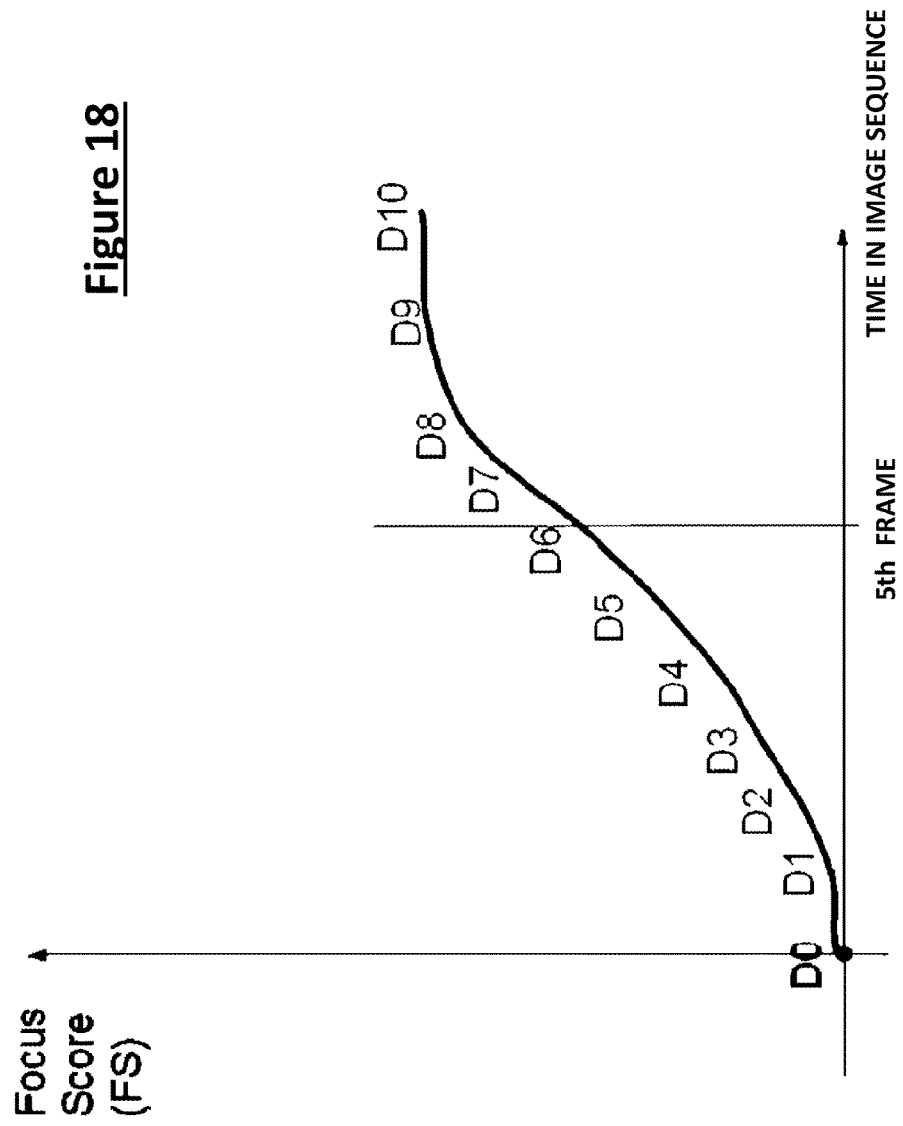
FIG. 18 is a schematic graph illustrating a problem in the focus score variation for an near field scene requiring an optical power at the edge of an allowed operating range.

FIG. 18 illustrates this problem in a focus score plot when the image scene is at D9 or D10. Because of the long settling times for the optical power in the near field region, the fly and learn and upsweep methods can have significant problems in resolving close objects, which is where the human eye can clearly see the difference in small focus changes. An additional problem is that because the image is located at the edge of the usable TLCL range, the peak focus score is not as easily determinable via one diopter optical power steps because there is no defined peak in focus scores without generating a peak focus score value for which adjacent focus scores on either side are less.

To overcome these shortcomings, the fly and learn and upsweep imaging sequences described above are modified as follows: Rather than a step in drive signals from D0 to D10 (stepwise in the case of upsweep, or initially in the case of fly and learn), a stepwise or initial drive signal is used which is greater than what would normally be used to achieved a desired focus. Specifically, a stepwise drive signal corresponding to D11 and D12 (for upsweep) or an initial drive signal corresponding to D12 (for fly and learn) is used. The TLCL may not even be able to image an object as close as D12 (at OPmax in FIG. 6A for voltage amplitude modulation control) with normally allowed aberrations in the lens. But this higher drive signal, which is referred to as the HyperDrive Sweep signal, allows the settling time of the optical poser (for the desired focus score) to be "compressed" so that a focus score peak at D10 can be achieved more quickly and be more easily recognized due to falling focus scores on the far side of D10 at D11 and D12. By hyper-driving the drive signal beyond what is normally useable, the interaction with the liquid crystals causes the D9 and D10 peaks to now become visible. It should be noted that with the HyperDrive Sweep method employed, now the D11 and D12 drive signals cannot be distinguished because they are too close to the final drive signal that is applied to the TLCL.

The use of HyperDrive Sweep signals (i.e. those optical power drive signals that do not result in usable focus values of the TLCL) is counterintuitive because driving TLCL's too hard (i.e. to D11 and D12 for the exemplary TLCL having a maximum usable focus for distance D10) causes problems including instability, overheating, excessive noise, and possible irreparable harm to the liquid crystal material. Therefore, such excessive drive signals are typically avoided. However, if such excessive drive signals (which correspond to non-usable focal values) are carefully applied (i.e. for not too long and not too high given the particular TLCL being used), they can be safely applied to hasten the measurement of focal scores up to the end of the usable range for a particular TLCL and they can be used to generate falling focal scores just beyond the usable range to better identify peak focus score at the end of the usable range.

Figure 19:
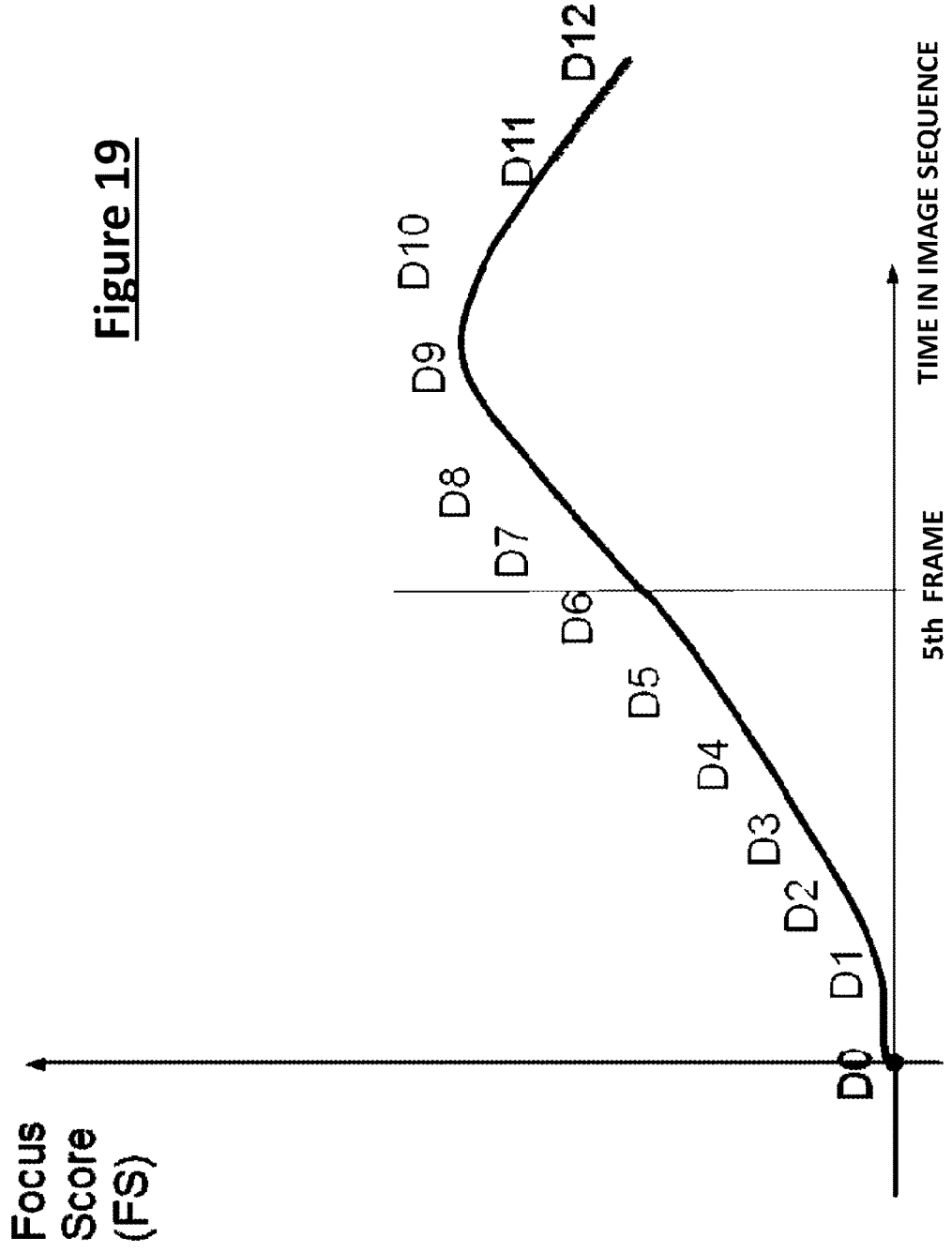
FIG. 19 is a schematic plot illustrating the effect of applying a hyperdrive sweep technique to detecting the focus score peak for a scene close to the edge of allowed operating range.
Figure 20:
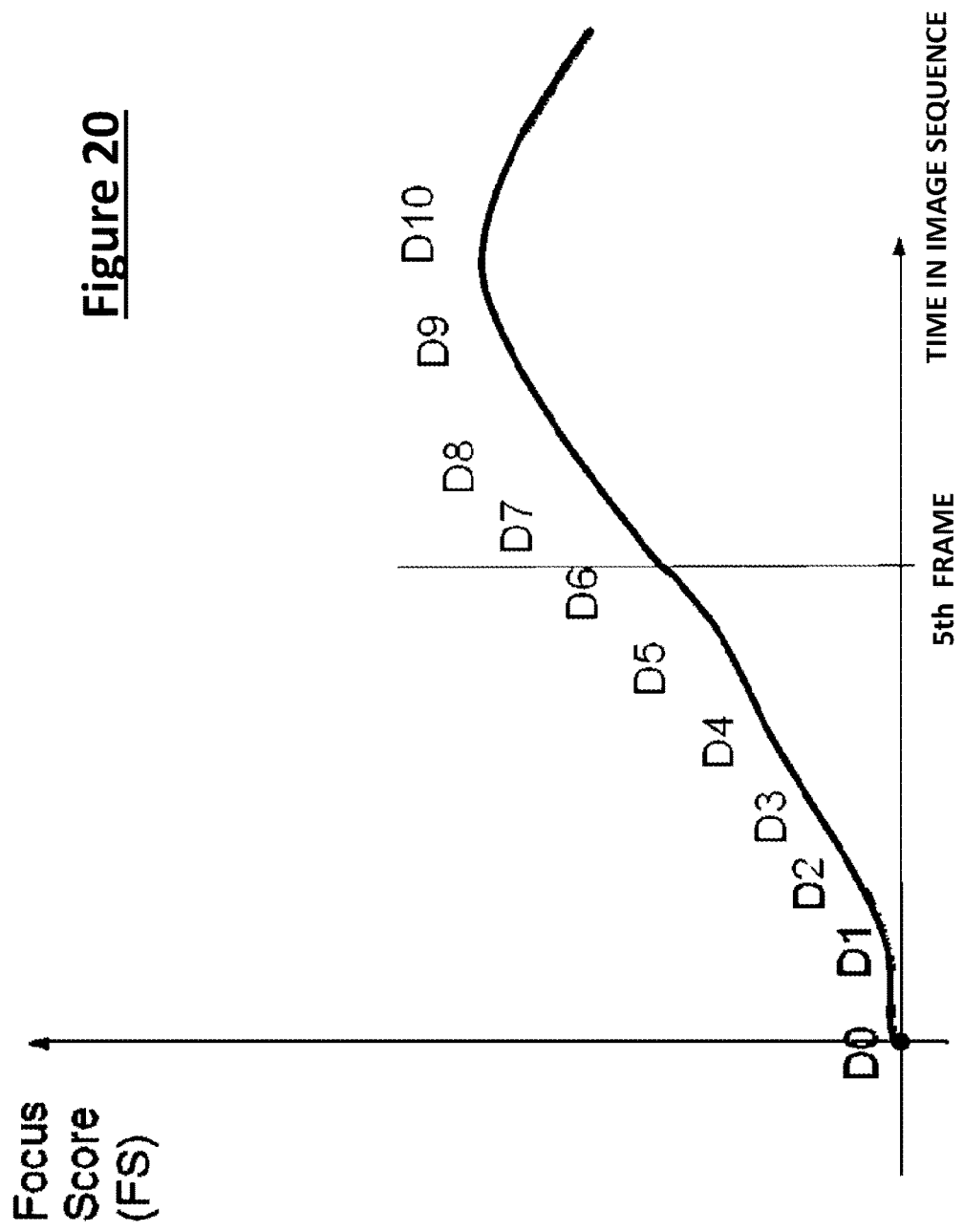
FIG. 20 is a schematic plot illustrating the effect of applying a hyperdrive sweep technique to detecting the focus score peak for a scene at to the edge of allowed operating range.

FIG. 19 illustrates a measured focus score sequence when HyperDrive Sweep is used for an image scene at D9 optical power (distance in the near field). Here the focus score peak can be clearly seen at D9 and the focus score falls to lower values at D10, D11 and D12 magnification factors. Likewise, as illustrated in FIG. 20, when the image scene is located at D10 (which would translate into a distance 10 centimeters from the lens position to the image target position for the TLCL example described herein), then the D10 focus score shows the peak with D9, D11, and D12 having lesser values.

Without limiting the invention, for some TLCL devices, HyperDrive Sweep signals greater than that corresponding to two diopters beyond the usable range may be used. The choice of the HyperDrive Sweep drive signal depends strongly on the geometry (fabrication) of the TLCL. Designs which have a large clear optical aperture typically will have a HyperDrive Sweep signal that is around 15% higher than the D10 drive signal for that type of lens. This is contrasted to small clear optical aperture designs where the HyperDrive Sweep signal can be 35% to 40% larger than the corresponding D10 drive signal for that type of lens.

It is possible to raise the HyperDrive Sweep signal so high that the TLCL molecules do not have enough time to even begin to re-orient themselves in the high electrical field that the drive signal creates. In this case the net optical power generated is very low (typically 3-5 diopters) and the focus scores show very little change in the set, and likewise require a long time to revert back to their D0 position. This level of HyperDrive sweep driving signal should be avoided because of the long term optical problems in can create. Therefore a properly designed HyperDrive sweep permits a clear demarcation of the focus score peak within very short transition period. It is also possible, as mentioned hereinabove, to extend the HyperDrive Sweep algorithm to search the focus score set while the transition period is still taking place. If a clear peak in the focus scores sequence is detected, then the transition period can be terminated (aborted). The same mapping that would be used for the entire transition period can be applied and the best focus (position) determined. The advantage of this extension is that the time for auto-focus acquisition is reduced. However, this reduction in time depends on where the actual scene distance (focal length). If the scene is in the far field, then a great savings in time will accrue; if the scene is in the near field, then only smaller time savings will be realized.

While extensive reference to voltage amplitude modulation TLCL control has been made in describing the HyperDrive Sweep techniques hereinabove, the invention is not limited thereto. For certainty, other TLCL control modes including frequency modulation TLCL control can benefit from using HyperDrive Sweep techniques.

Second Order Considerations

As noted above, the (non-predictive) hill climbing algorithm involves stepping through the optical range of the TLCL, noting the climb up a hill in terms of focus scores (which are determined by the sharpness of an image—typically using vertical edge detection algorithms), and then, immediately after the peak focus score is passed by the required drop in the focus scores, pulling back to the level of optical power at the peak observed focus score. The drawback with non-predictive hill climbing algorithms (other than they have typically been implemented using stepped changes in optical power as opposed to continuous optical power adjustment) is that it requires the system to overshoot the desired optical power and then backtrack to that optical power point. Alternatively to the above focus score tracking to determine the peak in the focus score curve, a more computationally intensive solution would be to consider other continuous sweep strategies, including continuous predictive hill-climb. For example:

A predictive hill climbing algorithm converges on the desired optical power (with the highest focus score) without overshoot and backtracking, thus reducing auto-focus convergence time. This type of predictive algorithm is especially appropriate for a class of TLCLs that can travel across a range of optical power significantly more rapidly in one direction (for example, going from high optical power to low optical power—namely the excitation direction or mode) compared to the reverse direction (the relaxation direction or mode).

The predictive autofocus algorithm operates by taking a focus scores samples across the optical range of the variable focus TLC lens, and then, based on those focus points, and general behavior expected of focus score curves, predicting the focus scores peak before that optical power is reached in the sweep. In the case of the predictive hill climbing algorithm, the system gathers the focus score samples only on the rising side of the peak, and then predicts the peak as it approaches the peak. The focus score curves typically allow such predictions, because the slope of the tangent to the curve starts to reduce significantly as focus scores approach the peak of the curve, approaching zero as the curve comes to the peak. It is possible to take samples at smaller intervals as the slope of the tangent goes down in accordance with a coarse/fine search algorithm, until the auto-focus system produces enough fine grained information to predict the peak before the optical power is adjusted to the other side of the peak, without overshoot, without backtracking and without the requirement for lower focus scores beyond the peak.

An optional feature of cameras using a TLCL and a continuous in-flight auto-focus system is to keep and store (in memory) all the images captured near the peak focus score as the images are being acquired. At that point, the user (manually) or the system (automatically) can select which image to keep based upon focus scores or some other metric. Depending on the memory available, all of these images might be saved, or some subset of them only. For many situations, it may be sufficient simply to store that best image so far according to focus score or other metric, and compare that image, or its value on the metric, to the value on that metric of the newest incoming image. So, for example, one might simply save the image with the best focus score so far, compare it to the newest incoming image on focus scores, and keep the better of the two as the best so far. At the end of the sweep, the best image will have been selected. This sweep may stop at any time at which it is known that better images will not be encountered if the process were to continue—which would likely be the case if, say, the focus scores go into significant decline.

Higher Order Considerations

As an alternative, the auto-focus search drive regime can modify the optical power in a quasi-static regime using a sequence of control vectors where the convergence to the desired optical power can be achieved by stabilizing the "just-past" control vector, which has just generated the highest past focus score. Such TLCL drive regime changes the TLC lens between two optical power points in a continuous fashion using a sequence of control vectors that allows the change in optical power in both increasing and decreasing directions (to allow backward-forward travel) or in just one direction (to allow one-way travel only). This sweep may also be designed to travel between the optical power points in a known time interval. As another alternative the auto-focus search system can drive the TLCL in a transient regime using a sequence of control vectors for lens-tuning in increasing or decreasing directions of optical power, where a specific sequence of control vectors is applied to converge towards the optimal optical power once the corresponding focus scores are generated.

A further technique to speed up the response of a TLCL is the use of so-called overdrives and underdrives. An example of overdrive is the temporary application of a drive voltage or frequency that is different (typically, greater) than the targeted stable drive voltage or frequency. An example of underdrive is the temporary application of a drive voltage or frequency less than the targeted stable drive voltage or frequency (including zero volts). The use of overdrives or underdrives speeds the alignment of the molecules in a TLCL from a level corresponding to one stable voltage to that of another stable voltage, compared to simply applying the stable target drive voltage/frequency and allowing the TLCL to stabilize as determined by that value. In the case of a voltage controlled TLCL, typically, the overdrive will have more energy than the targeted stable control vector, and the underdrive less energy than the targeted stable control vector. In the case of frequency controlled TLCL, the underdrive and overdrive may, for example, have different frequencies and different RMS voltages. As the TLCL approaches the targeted optical power, the overdrive or underdrive is removed (or reduced), and eventually the stable targeted drive voltage or frequency is applied so that the TLCL stabilizes at the targeted optical power. The use of overdrives and underdrives (when properly calibrated) can be very effective in speeding up the response of certain TLCLs. Examples of fast optical power transitions in a TLCL are described in co-pending, commonly assigned: U.S. Provisional Patent Application Ser. No. 61/422,115, filed Dec. 10, 2010, and U.S. Provisional Patent Application Ser. No. 61/473,118 filed Feb. 10, 2011, the entireties of which is incorporated herein by reference.

With reference to co-pending, commonly assigned, U.S. Provisional Patent Application Ser. No. 61/422,115, filed Dec. 10, 2010, the entirety of which is incorporated herein by reference, yet another technique to speed up the response of a TLCL is based on the use of so called "dual frequency" liquid crystals. As will be described hereinbelow, in these kinds of liquid crystals, the molecules have the tendency to align parallel or perpendicular to applied electric field depending upon the frequency of that field. In this case, the liquid crystal axis is typically "attracted" towards the electric field for low frequencies of the driving field (positive dielectric anisotropy of the liquid crystal) while the axis is "repulsed" from the electric field for higher drive field frequencies (negative dielectric anisotropy of the liquid crystal). Thus, for both directions, the dual frequency liquid crystal exhibits quick response times, especially when the above described overdrive technique is used to speed up the liquid crystal molecule response (and hence reduce the response time of lens during the auto focus process).

Tunable Optical Device System

Figure 13A:
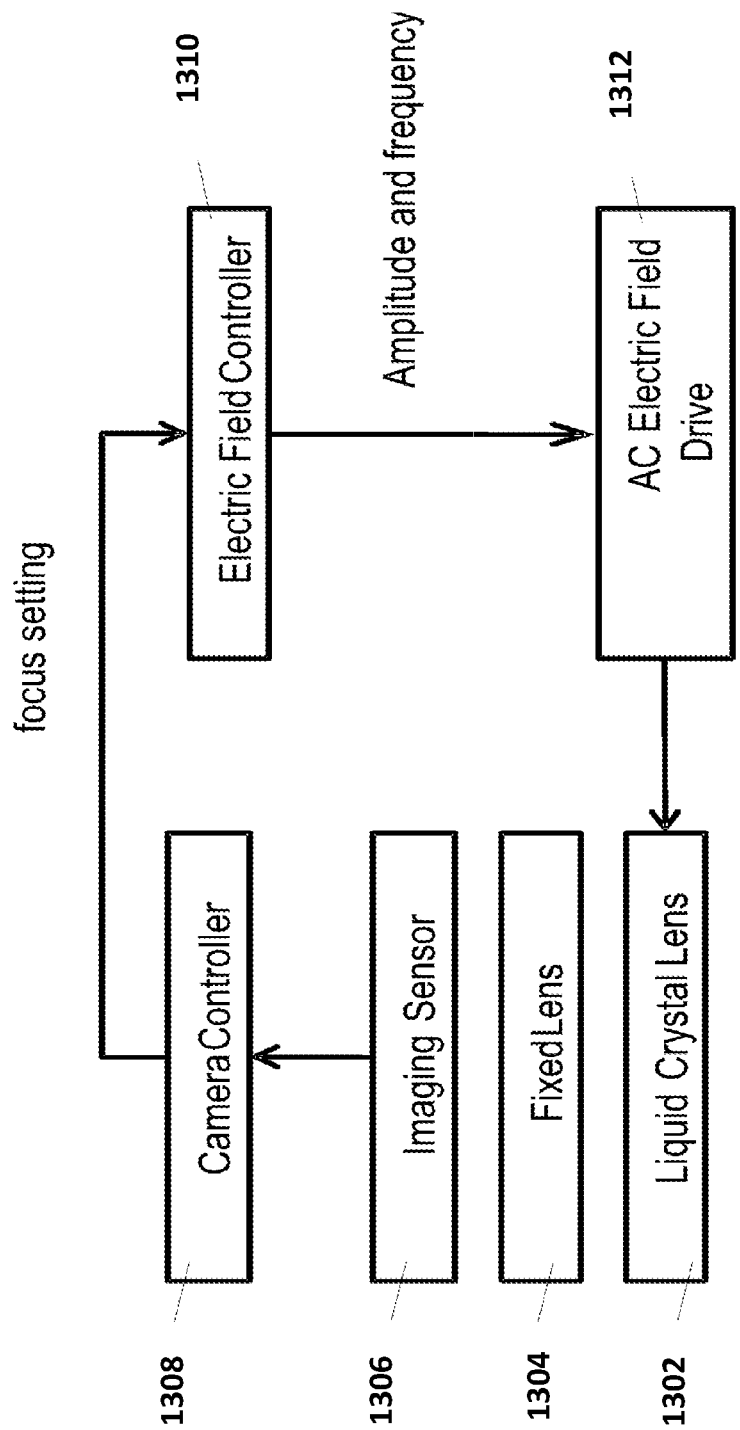
FIG. 13A is a schematic functional diagram showing interconnected tunable liquid crystal lens control components of an optical system providing auto-focus functionality in accordance with the proposed solution.

The control signal for tuning the TLCL optical device can be provided by a variable frequency control signal circuit configured to cause said device to control light propagation in the optical device as a function of drive signal frequency. As an example, in FIG. 13A, there is shown schematically a digital camera system having a TLC lens 1302 optionally combined with at least one fixed lens 1304 to focus an image onto an image sensor 1306 with the TLC lens 1302 providing focus control. The image is fed to a camera controller 1308 including an auto-focus function that outputs a desired focus value. An electric field controller 1310 translates the focus value into at least one electrical parameter. Without limiting the invention, the electric field controller 1310 may employ lookup tables in performing its overall function, or at least as such translation function relates to taking into consideration empirical information regarding the TLC lens 1302 and the general optical system, for example: geometry, material characteristics, temperature, camera properties, etc. The electric field controller 1310 can consider additional inputs (for example provided by additional sensors) in generating the drive signal. Sensing temperature, sheet resistance, capacitance, impedance and/or reactance is described in co-pending commonly assigned International Patent Application PCT/CA2011/050583 filed 21 Sep. 2011, which claims priority from U.S. Provisional Patent Application Ser. No. 61/384,962, filed 21 Sep. 2010, the entireties of which are incorporated herein by reference.

An electric field drive circuit 1312 converts the electrical parameters into a drive signal to be applied to the TLCL 300/400/500. Those skilled in the art would appreciate that components 1308 and 1310, without limiting the invention, can be implemented using microcode executed on a microcontroller, while component 1312 can include voltage sources switched under the control of a microcontroller to have a desired frequency and RMS voltage.

Optical Power Transitions Considerations

Having described techniques for speeding up drive signal sweeps for speeding up auto-focus search algorithms, it has been discovered that one of the most important drawbacks of TLCLs is their low speed in changing optical power. TLC lenses often times exhibit significant response time asymmetry in terms of how quickly continuous progress may be made in one direction through the optical parameter range as opposed to in the opposite direction. In typical TLCLs, the reorientation of liquid crystal molecules may be fast when driven by varying the control signal in a direction of increasing excitation (the long LC molecular axes are attracted by the electric field), however the relaxation of molecules in the inverse direction (back to the original alignment imposed by cell substrate treatment provided by orienting layers) is extremely slow. When employed in a variety of applications including miniature cameras, a TLC lens needs to be relatively thick in order to provide a sufficiently wide range of focus variability. However, by increasing the thickness of the LC layer, the time needed for director reorientation also increases significantly. When the TLC lens is driven via an applied electrical drive signal in the excitation direction, the time required to change optical power is also dependent on the amplitude of the drive signal, the optical power change speed can be increased by applying an electric field of large amplitude. Optical power change speed of this transition is acceptable. In the absence of a driving signal, LC molecular relaxation time is defined by geometric (thickness), energetic (surface enchoring) and visco-elastic (rotational viscosity over elasticity constant) parameters. For simple TLC lenses having geometries useful in general consumer applications, the relaxation time is in the order of 10 s which is unacceptably slow.

Figure 21A:
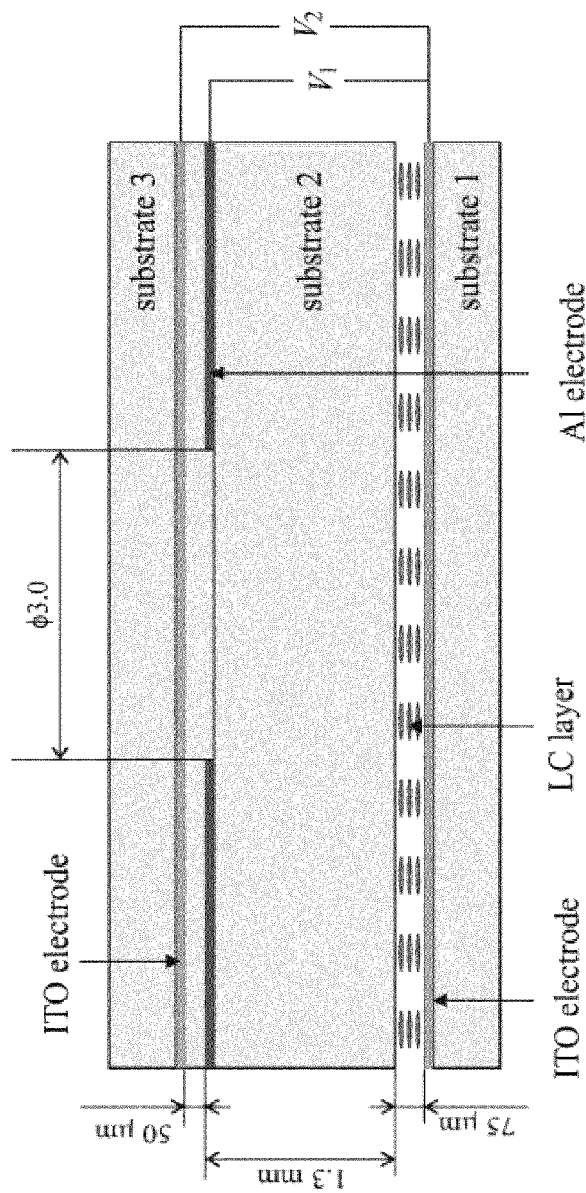
FIG. 21A is a schematic diagram showing a yet another prior art tunable liquid crystal lens device.
Figure 21B:
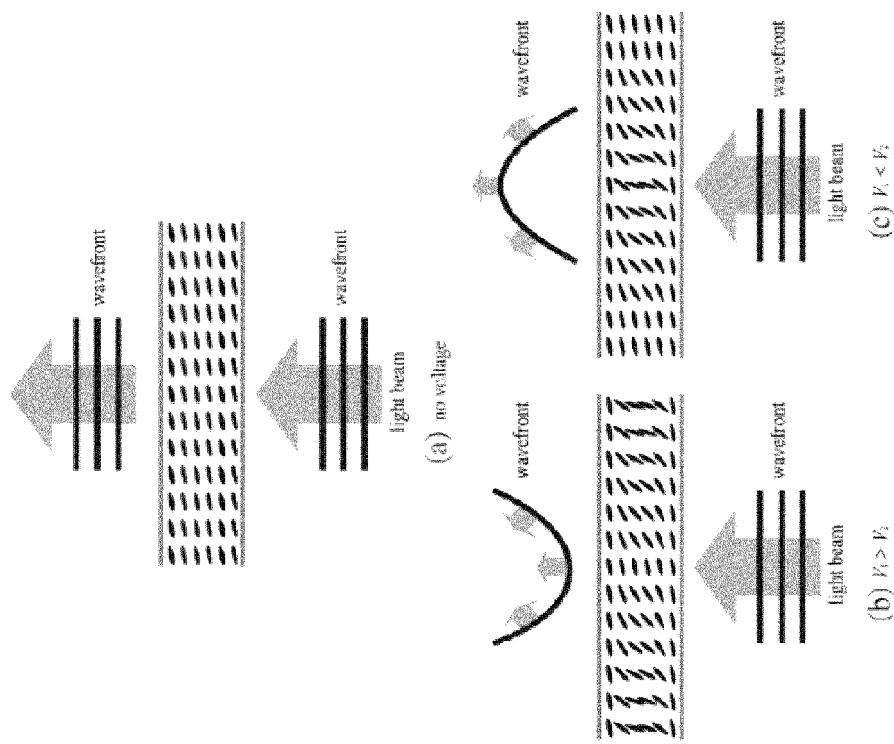
FIG. 21B is a schematic diagram showing the effect of the tunable liquid crystal lens device of FIG. 21A on an incident light wavefront under different drive signal conditions.
Figure 21C:
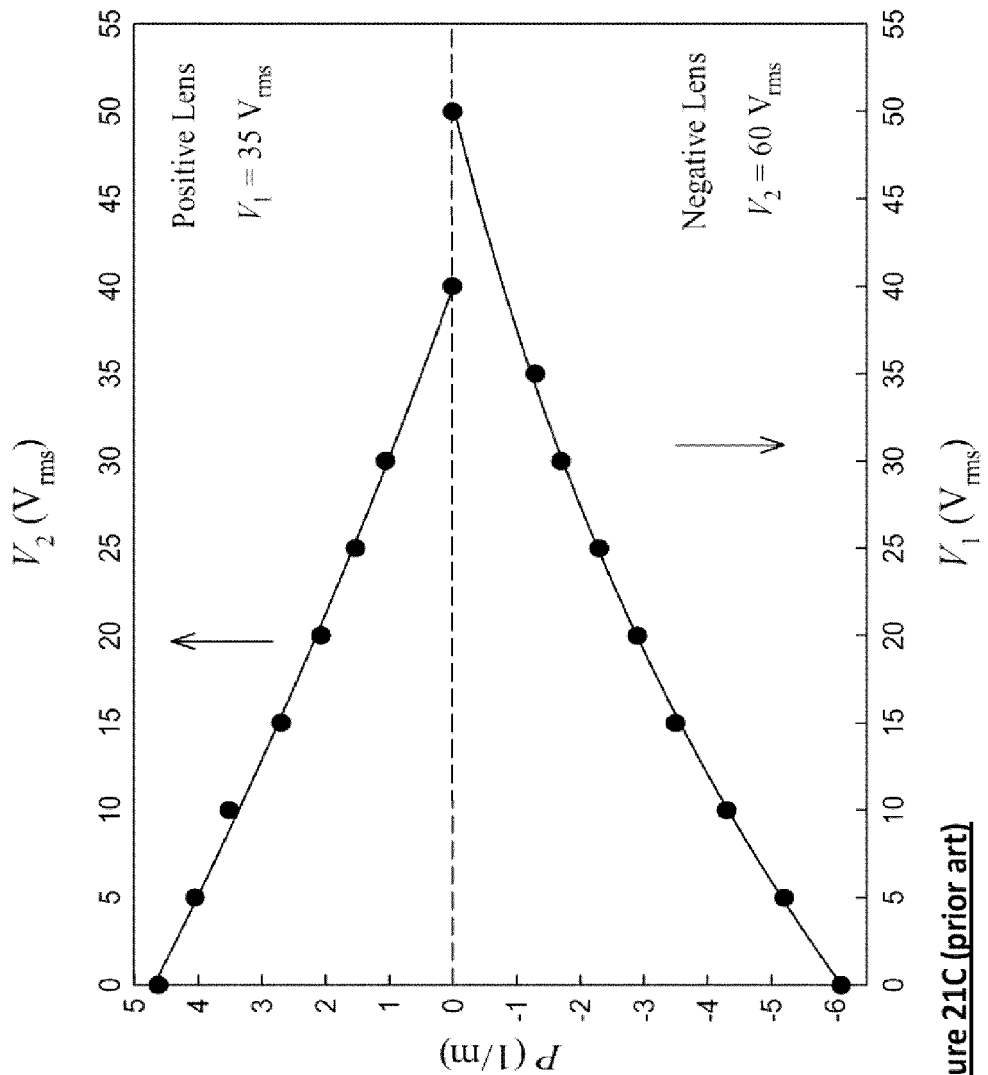
FIG. 21C is a schematic diagram showing optical power variation for the tunable liquid crystal lens device of FIG. 21A under the drive signal conditions shown in FIG. 21B.

In "Liquid Crystal Lens with Focal Length Variable from Negative to Positive Values" IEEE Photonics Technology Letters, Vol. 18, No. 1, p. 79, 1 Jan. 2006, Bin Wang, Moe Ye and Susumu Sato describe driving a TLC lens to vary the optical power in both positive and negative directions. FIG. 21A illustrates Sato's modified TLCL structure. A LC layer of Merck E44 is sandwiched between glass substrates 1 and 2. The inner walls of the substrates are coated with polyimide films (112/114) rubbed in one direction, and the LC molecules initially align homogeneously with a small pretilt angle. A transparent ITO film and an Aluminum film are sputtered and coated, respectively, on substrates 1 and 2 as electrodes. The ITO electrode (124) is on the inner side of the LC cell, while the hole patterned Al electrode (222) is on the outer side of the LC cell. Above the hole patterned electrode (222) there is another ITO electrode (230) sputtered on substrate 3. The upper ITO electrode (230) is separated from the Al electrode (222) with a thin cover glass. The electric field in the LC layer is adjusted by drive signals $V\_1$ across the Al electrode and the lower ITO electrode, and $V\_2$ across the two ITO electrodes. Drive signals $V\_1$ and $V\_2$ are in phase and of the same single frequency of 1 kHz, and are used to reorient the LC directors. Generally, a larger electric field results in a larger LC director tilt angle. The applied electric field is spatially nonuniform and axially symmetrical due to the circular hole in the Al electrode (222). If $V\_1=V\_2=0$, that is, when no voltages are applied, the LC directors align homogeneously in the cell with a small pretilt angle, as shown in FIG. 21B(a). An incident light wave linearly polarized in the rubbing direction of the polyimide layers experiences a uniform phase shift and its propagation behaviors are not changed by the LC cell. If voltages are applied and $V\_1>V\_2$, the electric field in the hole area decreases gradually from the edge to the center of the hole area, and so does the reorientation of the LC directors, as shown in FIG. 21B(b). The refractive index seen by the incident light wave linearly polarized in the rubbing direction increases from the edge to the center and the wavefront of the incident light beam is focused, the TLCL operating as a positive lens. If $V\_1<V\_2$, the electric field increases from the edge to the center, and so does the reorientation of the LC directors, as shown in FIG. 21B(c). The incident light wave experiences a phase retardation that is the smallest at the center. The TLCL behaves as a negative lens, and the incident light beam is defocused. With reference to FIG. 21C, via differential adjustment of $V\_1$ and $V\_2$ at a single low frequency, the optical power of the TLC lens can be adjusted in both directions and the LC cell can have a variable focal length from negative to positive values. However, it is pointed out that the driving method according to this prior art attempt requires maintaining one drive signal at a certain setting while the other drive signal is varied to tune the focal length of the TLC lens, and therefore the slow optical power change identified as being problematic in simple TLCL lenses applies severally to each positive and negative optical power tuning. Just as before, increases in optical power in absolute terms can be achieved faster than decreases in optical power in absolute terms.

Improved Reorientation Speed Via Controlled Shaped Transient Electric Field Drive In general, due to collective molecular interactions, liquid crystals can be reoriented by means of moderate electric fields of several volts amplitude. The reorientation speed, within a control range, is proportional to the driving voltage amplitude of the control signal. However, the orientation process is relatively slow because of a high rotational viscosity γ of liquid crystal molecules. Also, reorientation is usually countered (impeded) by boundary conditions which react to orientational deformation via an elasticity constant K. For example, for a LC cell thickness L, the typical relaxation time $\tau_R$ is defined by:

$$\tau_R \approx \gamma L^2 / (K_1 \pi^2)$$

Very often, during excitation, the reorientation process starts with excitation voltages, which are above a certain threshold value, defined by the dielectric anisotropy $\Delta\epsilon$ of the liquid crystal and the same elastic constant:

$$V_{thresh} = \pi\sqrt{K_1/(\epsilon_0|\Delta\epsilon|)}$$

The same phenomena (viscosity, etc.) also contribute during excitation, and for a given excitation voltage Vexcit, the reorientation time $\tau_{excit}$ (can be defined by) varies according to:

$$\tau_{Excit} \approx \tau_R/[(V_{excit}/V_{thresh})^2 - 1]$$

For example, during prior art Liquid Crystal Display (LCD) operation, the final voltage value also referred to as the bias voltage $V_{bias}$ (when transitioning from one orientational state to another) may be different from zero. Then a relaxation time (can be defined by) varies according to:

$$\tau_{DownExcit} \approx \tau_R/|(V_{bias}/V_{thresh})^2 - 1|$$

Therefore, LCD operation is often considered slow. In accordance with prior art techniques, voltage kicks are often employed to reorient LC molecules from one state to another. For example, suppose that in a steady state, LC molecular orientation would correspond to the voltage (root means square amplitude) Vs1:

To accelerate a reorientation transition in the excitation direction from a small LC molecular director angle to a desired high angle, a high voltage pulse of short duration (higher than Vs1) can be used followed by the desired steady state voltage Vs2. Using such a voltage kick is commonly referred to as overdriving.

For the reverse transition, to accelerate the reorientation transition in the relaxation direction from a large LC molecular director angle to a desired low angle, forced relaxation of molecules can use another technique referred to as underdrive which consists in temporarily removing the drive signal (simply setting the drive signal voltage down to zero the LC molecules are allowed to relax) and then re-establishing the steady state voltage (amplitude) Vs2 of the desired state.

Given that in most recent prior art applications such as LCDs, modulators, etc. the overall liquid crystal alignment has been relatively uniform within each LC cell (pixel for LCDs), the overdrive and underdrive were applied without any particularity, in a spatially uniform "flat" manner consistent with such applications via flat electrodes.

However, recent (developments) applications of liquid crystal technology (including those described in present application) employ various non-uniform LC molecular alignments to achieve specific benefits, for example implementing lenses, prisms, multi-domain LCDs, etc. Experimental data presented in FIGS. 23A and 23B shows that in the case of tunable lenses, the use of flat (LCD drive like) overdrive and underdrive voltages, such as described by Sato in the above mentioned prior art, not only slow reorientation transition times more but also degrade the performance of TLC devices:

In accordance with the proposed solution, the variable response of a TLC optical device to a frequency modulated drive signal is employed to create a TLC lens with variable optical power. Optical power can be varied between a minimum and a maximum by employing intelligent transient mixed frequency and amplitude control.

An experimental TLCL 400 was configured to provide far field focusing of a scene at infinity employing drive signal frequency B(Vrms) of 1 kHz, where an amplitude between 28 Vrms to 32 Vrms was chosen to provide the optical power variability illustrated in FIGS. 22A and 22B. The dotted line in FIG. 23A illustrates optical power transition variability with time in response to a drastic (direct/abrupt) change in drive signal frequency from 1 kHz to about 30 kHz to 33 kHz to provide near focus. As mentioned herein above, this optical power transition is in the relaxation direction and was measured to take 1290 ms to provide roughly a 10 diopter optical power change. The dotted line in FIG. 23B illustrates aberration variability during the same transition. It is noted that while simple frequency drive of a TLCL in the relaxation direction incurs long transition times, least aberrations are incurred.

Figure 23A:
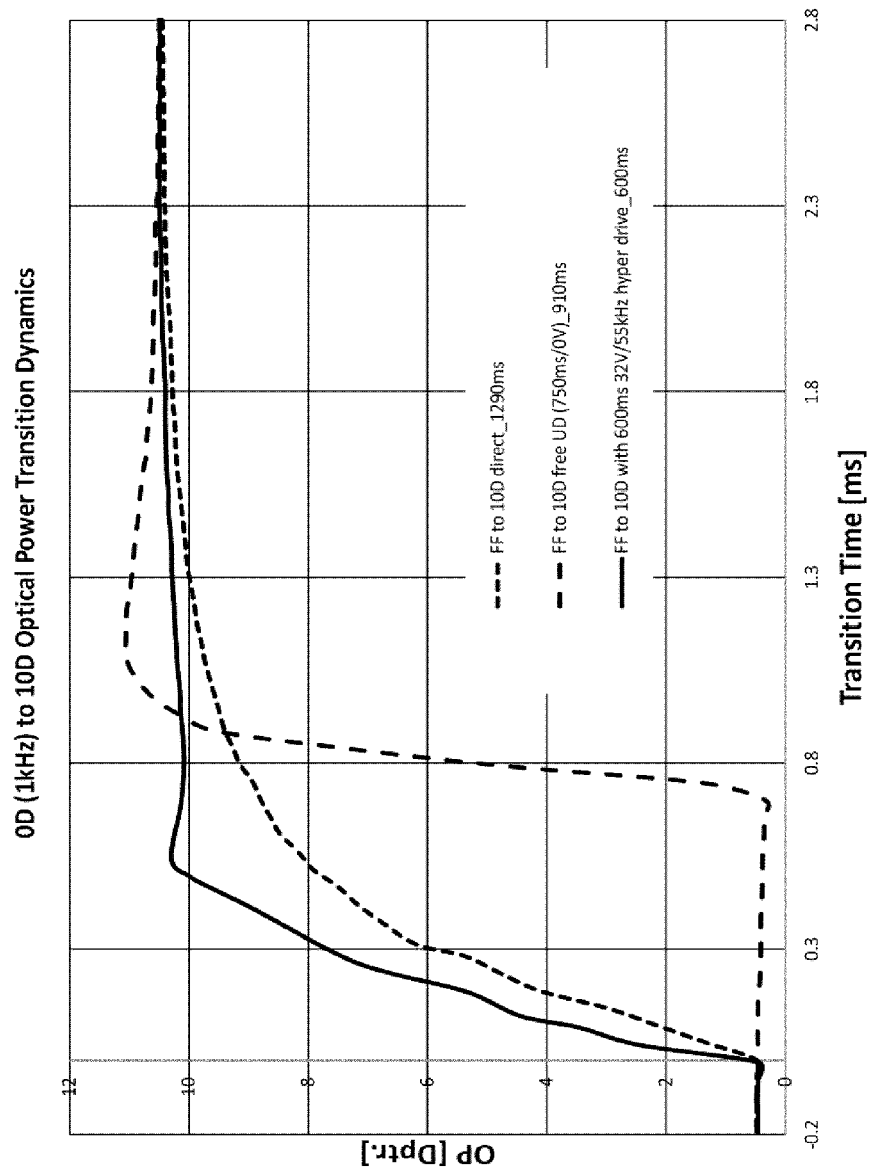
FIG. 23A is an experimental data plot illustrating ten diopter optical power transitions in accordance with the proposed solution.
Figure 23B:
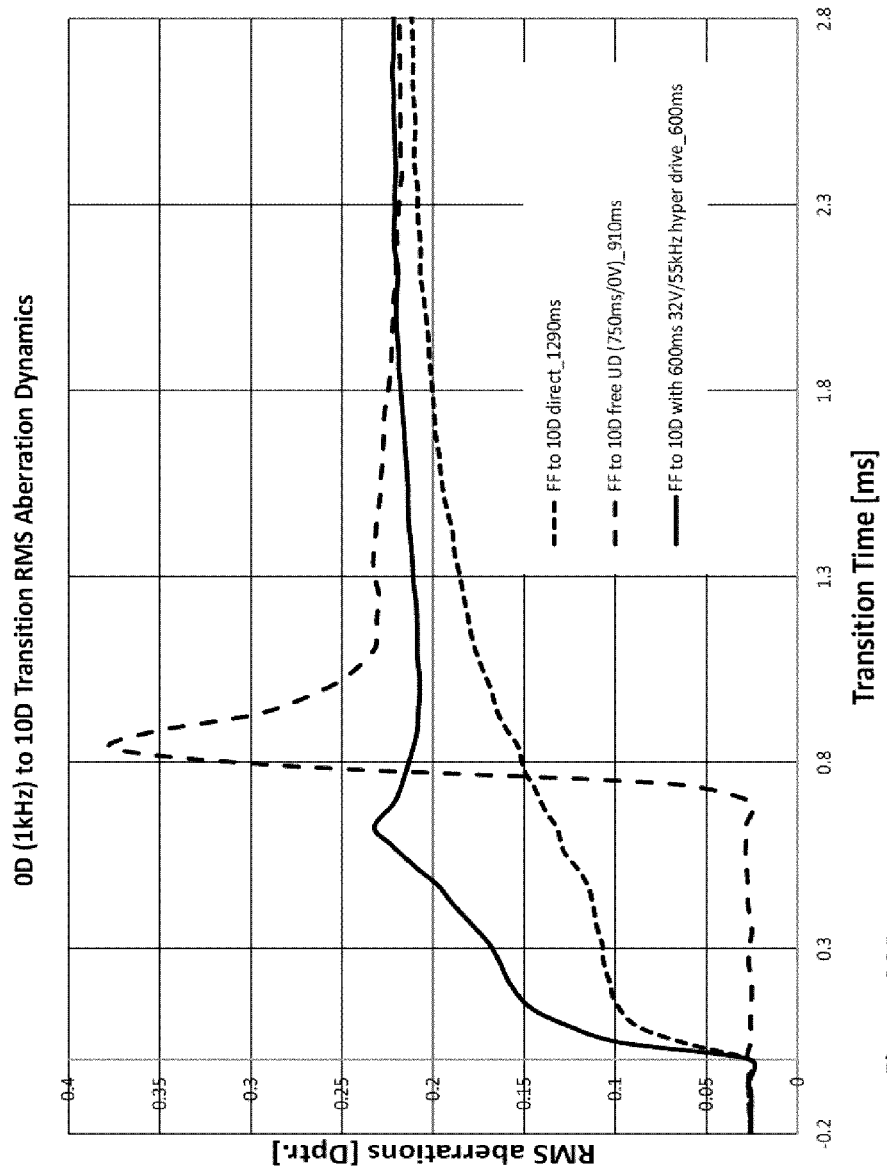
FIG. 23B is an experimental data plot illustrating root means square aberrations corresponding to optical power transitions illustrated in FIG. 23A in accordance with the proposed solution.

Adapting teachings of Sato to the same TLCL 400 resulted in the optical power transition variation illustrated by the dashed line in FIG. 23A. The standard prior art underdrive approach was provided by a drive signal having 1 kHz frequency and (zero) 0 Vrms amplitude applied for 750 ms in order to provide ample time for free relaxation of LC molecules towards the ground state. The optical power appears to remain substantially flat as a substantially flat electrical field is maintained during this extreme transition despite the change in Vrms amplitude implemented via the low frequency of the drive signal which corresponds to employing a flat electrode in Sato. For transitions from an initial focus distance closer than infinity (not shown), the optical power decreases from an initial value towards zero during the underdrive erasing any such initial lens. Following the 750 ms relaxation time, applying the desired drive signal for 10 diopter optical power for the final near focus state (in the excitation direction) results a total transition time of about 910 ms. It is understood that attempts have been made to select the 750 ms relaxation time as the minimum relaxation time of this most extreme 10 Diopter transition. While transition time is improved for the extreme 10 Diopter transition over simple frequency drive, the dashed line in FIG. 23B illustrates corresponding aberration variability during the transition which remains above the tolerable level of about 0.2 μm for a long period of time after optical power at near focus has been reached. This aberration overshoot unfortunately persists long enough to affect other functionality, such as auto-focusing functionality, which therefore results in degraded performance over simple frequency drive. It is emphasized that similar aberration degradation has been found to be incurred by employing the complex geometry and multiple electrode voltage amplitude drive described by Sato.

It has been discovered that taking into account spatial non-uniformity of liquid crystal alignment of a TLC device in generating controlled spatially non-uniform transient electric fields by intelligently using transient control signals, enables fast reorientation transitions for TLCL geometries employing spatially modulated electric field drive. In TLC lens applications an optical power transition controller can be employed.

In accordance with the proposed solution, the solid line in FIG. 23A illustrates a 10 diopter optical power transition in the relaxation direction for the same frequency controlled TLCL 400. The 28 Vrms to 32 Vrms amplitude of the drive signal is maintained constant while a transient frequency overdrive kick at 55 kHz, referred to herein as a hyperdrive frequency kick, is applied for about 600 ms before the 30 kHz to 33 kHz frequency of the near focus state is applied. It is emphasized that the drive signal frequency change from 55 kHz to 30 kHz-33 kHz is in the excitation direction which is very fast resulting in about 600 ms total optical power transition time (within measurement error of about +/−5 ms). It is understood that the 600 ms overdrive transient hyperdrive frequency kick time is selected as the minimum stabilization time permitting the most extreme 10 Diopter optical power transition. The solid line in FIG. 23B illustrates corresponding aberration dynamics for the hyperdrive frequency kick transition, aberrations which settle to an acceptable level substantially at the same time as the optical power. Employing the overdrive transient hyperdrive frequency kick at constant Vrms amplitude provides a twice as fast optical power transition in the relaxation direction compared to simple frequency drive. Compared to employing flat prior art electric field profiles, the proposed solution not only benefits from a faster optical power transition but also benefits from a low aberration transition.

It is emphasized that the transient 600 ms hyperdrive frequency kick time and the 55 kHz overdrive kick hyperdrive frequency are not meant to limit the invention, both values being empirically determined highly dependent on the TLCL 400 geometry and materials tested. It is further emphasized that the invention is not limited to maintaining Vrms constant during the transition, keeping Vrms constant represents the most conservative scenario, the transient hyperdrive kick can be implemented by varying both frequency and Vrms amplitude employing drive signal parameters from a locus similar to that schematically illustrated in FIG. 11A. An example of how frequency hyperdrive kick parameters are empirically determined is described below with reference to FIGS. 29A and 29B. In accordance with the proposed solution, maintaining Vrms constant provides desirable simplifications in drive signal generation and ensures compliance with (not violating) voltage characteristics of the overall device employing TLCL 400 such as, but not limited to a handheld telephone camera.

Figure 24:
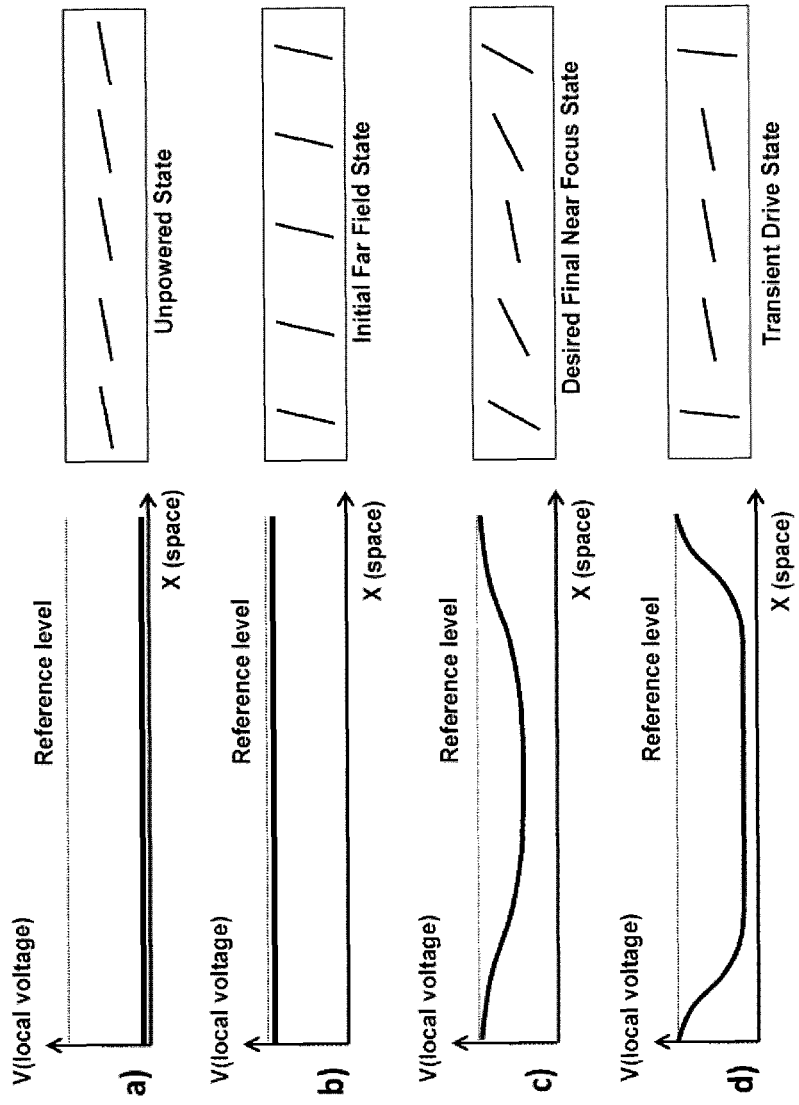
FIG. 24 is a schematic diagram illustrating potential distributions through a liquid crystal layer across a diameter of tunable liquid crystal lens in accordance with the proposed solution.

The above experimental results are understood with reference to FIG. 24 schematically illustrating, in cross-section, a number of steady state potential distributions through LC layer 510 along a diameter of TLCL 400. Presented to the right of each potential distribution, is a schematic illustration of a corresponding director distribution in the same cross-section through LC layer 510.

FIG. 24a illustrates the potential distribution of an unpowered TLCL 400, as well the potential distribution of a prior art flat potential distribution underdrive at 0 Vrms. The director distribution is substantially uniform at low angle corresponding to minimal optical power. FIG. 24b illustrates the potential distribution across the LC layer 510 of TLCL 400 driven in the far field state at 1 kHz and 28 Vrms to 32 Vrms to provide infinity focus. The corresponding director distribution is also substantially uniform however at a high tilt angle. FIG. 24c illustrates the potential distribution across LC layer 510 provided by the hole patterned electrode 322 and frequency dependent layer 426 driven at 30 kHz to 33 kHz and 28 Vrms to 32 Vrms to provide the highest 10 dioper optical power (FIG. 22A) via a smooth spatially modulated electric field providing a smooth spatially variant director orientation. With the TLCL 400 arranged to provide infinity focus configured as in FIG. 24b, the potential distribution illustrated in FIG. 24c provides near focus. FIG. 24d illustrates the steady state potential distribution of a transient hyperdrive frequency state wherein the TLCL 400 is driven with a drive signal of 55 kHz and 28 Vrms to 32 Vrms. It is pointed out that the transient drive signal applied to the hole patterned electrode 322 and frequency dependent layer 426 generates a highly variant spatially modulated potential distribution across LC layer 510 and a corresponding highly variant spatially modulated director orientation distribution. (Care is taken in selecting the transient frequency hyperdrive signal and its duration in order to prevent the establishment of disclinations.) Depending on the optical power transition, the transient hyperdrive frequency signal may not necessarily correspond to an optical power in FIG. 22A, that is the transient potential distribution profile may not correspond to a steady state potential distribution profile of an optical power setting.

With reference to the above described states, the transition corresponding to the dotted line illustrated in FIGS. 23A and 23B corresponds to a transition from the initial far field state illustrated in FIG. 24b directly to the desired final near field focus state illustrated in FIG. 24c. With reference to FIGS. 10, 11A and 22A such a transition is understood to be in the relaxation direction, wherein charge mobility in the frequency dependent layer 426 is decreased which is a slow process of about 1290 ms.

With reference to the above, an implementation of Sato's teachings corresponds to the state sequence starting with the initial steady state far field state illustrated in FIG. 24b, followed by the application of the unpowered state illustrated in FIG. 24a for about 750 ms and the application of final drive signal of the desired near focus steady state illustrated in FIG. 24c. While somewhat faster than simple frequency drive, the temporary application of the flat potential distribution of the unpowered state induces large aberrations corresponding to the drastic spatial modulation changes.

In accordance with the proposed solution, the variable charge mobility properties of the frequency dependent layer 426 are employed to intelligently subject LC layer 510, having the initial far field potential distribution, to a shaped transient potential distribution softening electric field variations during the transition. That is, starting from the initial steady state far field potential distribution illustrated in FIG. 24b, the spatially modulated transient potential distribution illustrated in FIG. 24d is applied for about 600 ms followed by the application of the final near focus steady state potential distribution illustrated in FIG. 24c. It is noted that due to charge mobility in frequency dependent layer 426, the application of the potential distribution illustrated in FIG. 24d compared to applying the potential distribution illustrated in FIG. 24a leaves directors at the edge of the aperture 360 at high tilt angles during the optical power transition due to high potential values on the edge which greatly contributes to reducing aberrations during the transition. The experimental results demonstrate an accelerated transition while aberrations are kept low.

Figure 25:
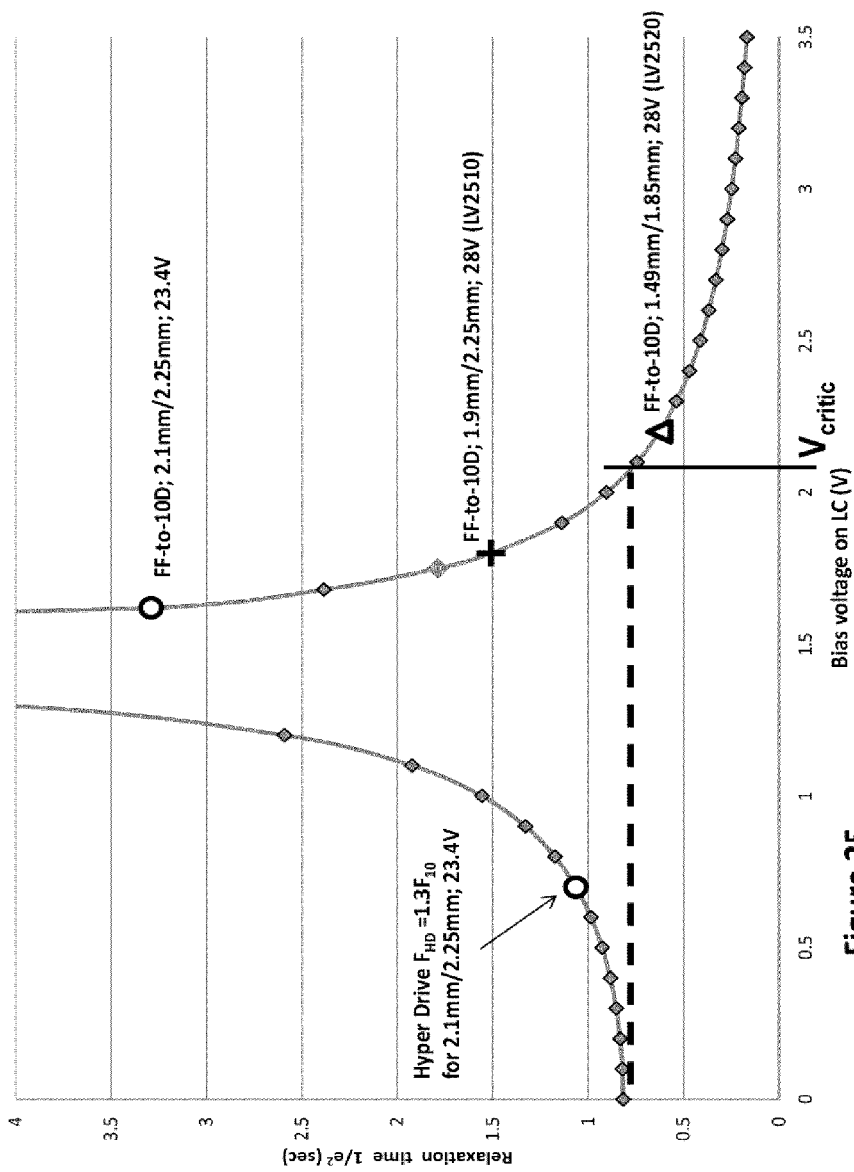
FIG. 25 is a plot illustrating optical power transition times in the relaxation direction for different tunable liquid crystal lens geometries employing frequency hyperdrive optical power transitions in accordance the proposed solution and simple frequency drive transitions.

While improvements in the largest optical power transition in the relaxation direction have been described, in actual operation, lesser optical power transitions are employed. Experimental data shows that further improvements in transition times in the relaxation direction can be achieved by an intelligent application of transient drive signals. In TLC lens applications, an optical power transition controller can be employed, for example:

FIG. 25 illustrates optical power transition time distributions in the relaxation direction. The curve on the left corresponds to employing hyperdrive frequency kicks to provide optical power transitions in accordance the proposed solution, while the right curve corresponds to simple frequency drive transitions. The curves correspond to the lowest aberration optical power transitions.

In accordance with a preferred embodiment of the proposed solution, for TLC optical devices employing spatially modulated director orientations to provide an adjustable optical characteristic, where different director orientational distribution states are generated by spatially modulated electric field distributions, the electric field distribution of the final state must be taken into account to determine (intelligently) whether employing (underdrive/overdrive) transient hyperdrive frequency kicks would provide a time efficient transition. For example, for an optical power transition in the relaxation direction from infinity focus at 0 Diopters to near focus at 10 Diopters, the minimum electric field potential value in the center of LC layer 510 in the final state as defined by a bias voltage can be compared with the a critical voltage Vcritic illustrated in FIG. 25 to intelligently make the determination. The invention is not limited to considering the central potential value, the central potential value it used herein for illustration purposes only, the decision can be made with respect to the potential value over a substantial region around the center of the aperture 360 being compared to the critical voltage Vcritic. Further experimental data shows that the geometry of the TLCL 400 plays a role.

FIG. 25 illustrates transition times in the relaxation direction for TLCLs 400 having different geometries in terms of clear aperture 360 to control electrode diameter 350 TLCL 400 format such as, but not limited to 2.1/2.25, 1.9/2.25 or 1.49/1.85 (all in mm). For example for a 2.1/2.25 format TLCL 400, the direct simple frequency drive transition FF-to-10D relaxation time (top circular point on the right curve) is higher than the hyperdrive frequency kick transition time (circular point on the left curve) while keeping the Vrms amplitude of the drive signal at a constant 23.4V. It is therefore preferable to employ transient frequency hyperdrive control signals in accordance with the proposed solution to provide the same optical power transition in about a third of the time. Employing transient frequency hyperdrive control signals in accordance with the proposed solution would also be indicated for a TLCL 400 having a 1.9/2.25 format (illustrated as the cross point on the right curve, the corresponding point on the left curve being lower than that of the 2.1/2.25 format TLCL).

It is appreciated that the left curve tends to a constant minimum hyperdrive frequency kick optical power transition time. This minimum transition time has a corresponding transition time on the simple frequency drive curve on the right which corresponds to bias critical voltage Vcritic.

For example, for a 1.49/1.85 format TLCL 400, the triangular point on the right curve corresponds to a minimum central voltage much higher than the threshold voltage Vcritic and therefore the corresponding simple frequency drive relaxation time is smaller than any possible hyperdrive frequency kick optical power transition relaxation time which would lie above the dashed horizontal line. For this TLCL format, simple frequency drive control provides a faster optical transition time for the FF-to-10D transition. It is reemphasized that while the examples describe an full 10 Diopter optical power transition, in practice smaller optical power transitions would correspond to different points on the two curves and therefore the TLCL 400 geometry alone is not the sole factor to be considered in determining whether to employ either one of frequency kick hyperdrive as proposed herein or simple frequency drive. As well, the decision to whether employ a hyperdrive frequency kick to implement and optical power transition can be made based on a substantial region around the center of the aperture 360 being compared to the critical voltage Vcritic.

In accordance with one implementation, a lookup table (not shown) can be employed to store at least sample optical power transition parameters for use by an optical power transition controller (1320). In accordance with another implementation, an optical power transition controller (1320) is configured to adaptively determine optical power transition parameters during use.

For certainty, the invention is not limited to employing the proposed transient hyperdrive frequency kick control in the relaxation direction. The proposed solution can be used in both reorientation directions, including in the excitation direction, by creating a potential distribution shape of a desired tendency toward the final state and then applying a driving signal corresponding to the final state.

Fast Optical Power Transition Tunable Optical Device System

In accordance with the proposed solution, the frequency variable optical power response of a TLC optical device is employed in a TLC lens to create a lens with a variable focus. Focus can be varied between a minimum and a maximum by employing a mixed frequency and amplitude control based optical power transition algorithm to provide fast optical power transition performance while keeping aberrations low.

Figure 13B:
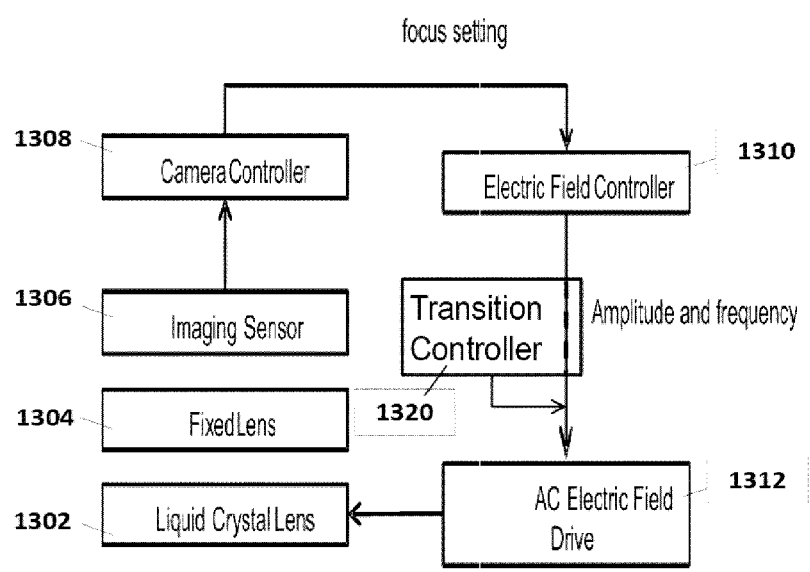
FIG. 13B is a schematic functional diagram showing interconnected tunable liquid crystal lens control components of an optical system providing optical power transition functionality in accordance with the proposed solution.
Figure 14:
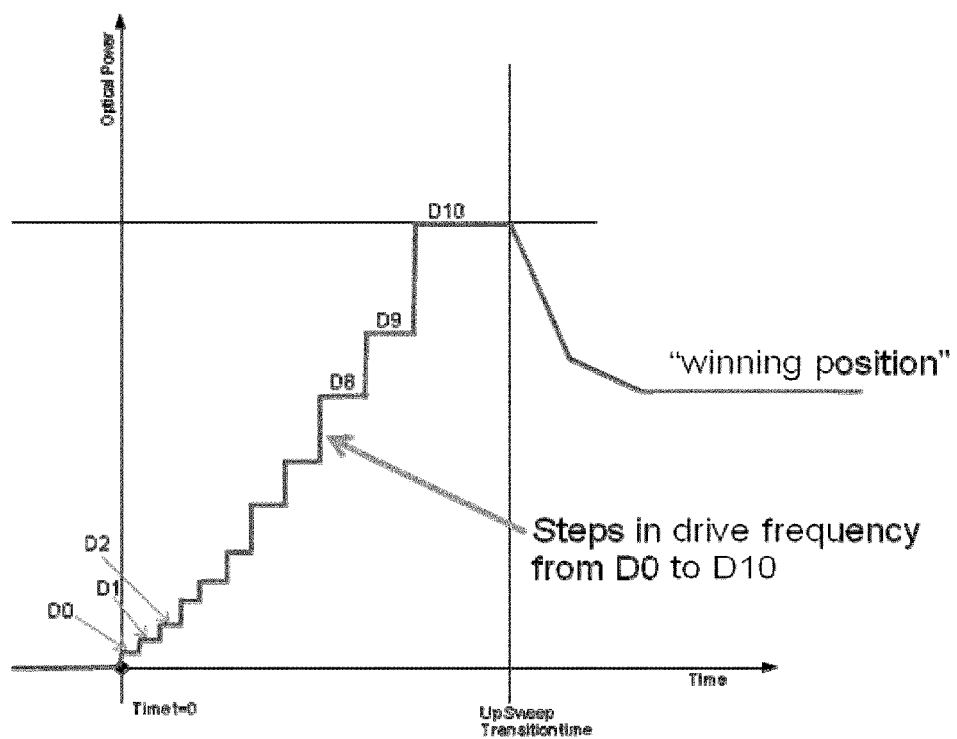
FIG. 14 is a schematic plot illustrating an upsweep auto-focus technique in accordance with the proposed solution.

The control signal for tuning the TLCL optical device can be provided by a variable frequency control signal circuit configured to cause said device to control light propagation in the optical device as a function of drive signal frequency. As an example, in FIG. 13B a digital camera system is schematically illustrated to have a TLC lens (300/400/500) 1302 optionally combined with at least one fixed lens 1304 to focus an image onto an image sensor 1306 with the TLC lens 1302 providing focus control.

A baseline optical power can be provided by employing a body having a lenticular shape 1304 configured to have a suitable composition to provide a lensing effect. Either or both flat surfaces the TLCL 1302 can have a fixed optical element 1304 deposited thereon. A combination of fixed optical power elements 1304 can be employed to shift and/or amplify optical power range of the TLCL 1302. For example, if the fixed optical element provides +11 diopters and if the TLCL 1302 provides optical power variability of 18 diopters, then the optical power provided by such TLCL can change between 11 and 29 diopters.

The image is fed to a camera controller 1308 including an auto-focus function that outputs a desired focus value. An electric field controller 1310 translates the focus value into at least one electrical drive signal parameter. Without limiting the invention, the electric field controller 1310 may employ lookup tables in performing its overall function, or at least as such translation function relates to taking into consideration empirical information regarding the TLC lens 1302 and the general optical system, for example: geometry, material characteristics, temperature, camera properties, etc. to provide drive signals for steady state optical power values.

Figure 29A:
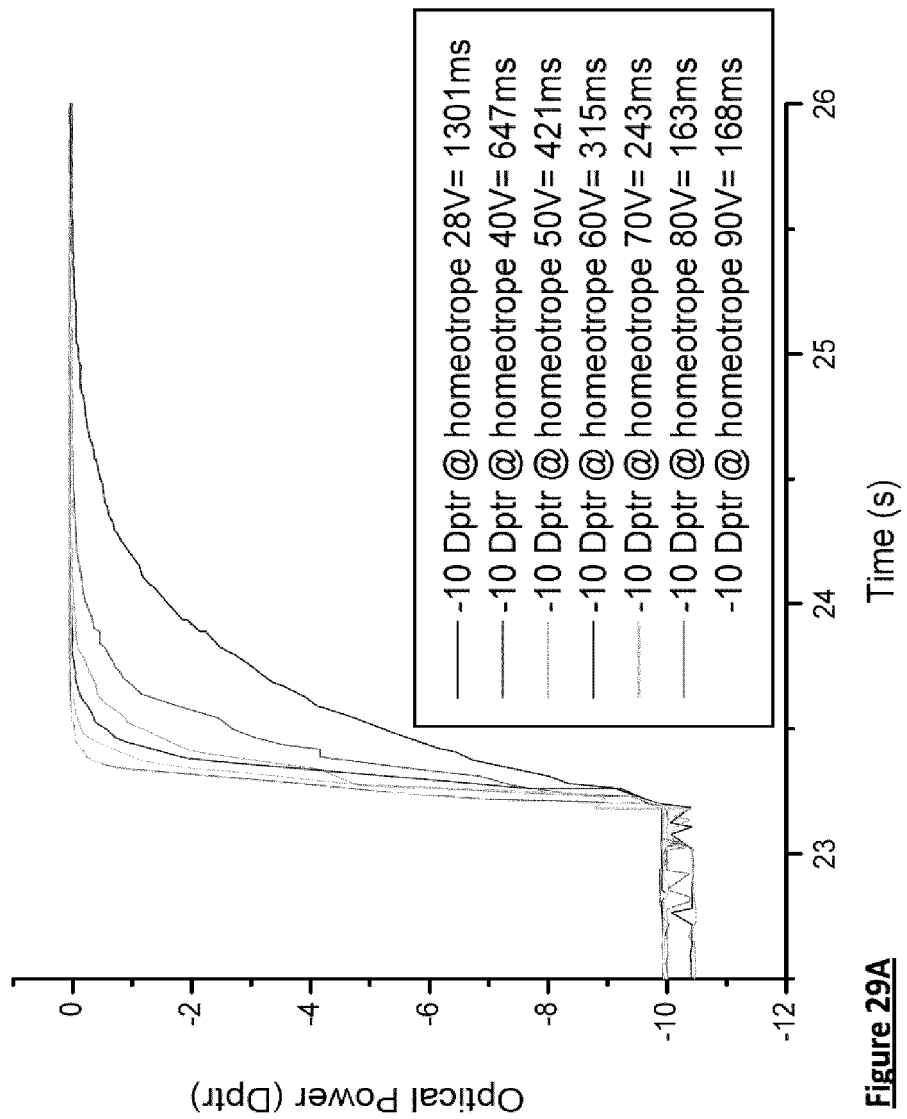
FIGS. 29A and 29B are a schematic diagrams illustrating measured variability in dynamic transitions of a tunable dual frequency liquid crystal lens optical property with drive signal root means square voltage amplitude at constant frequency, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.
Figure 29B:
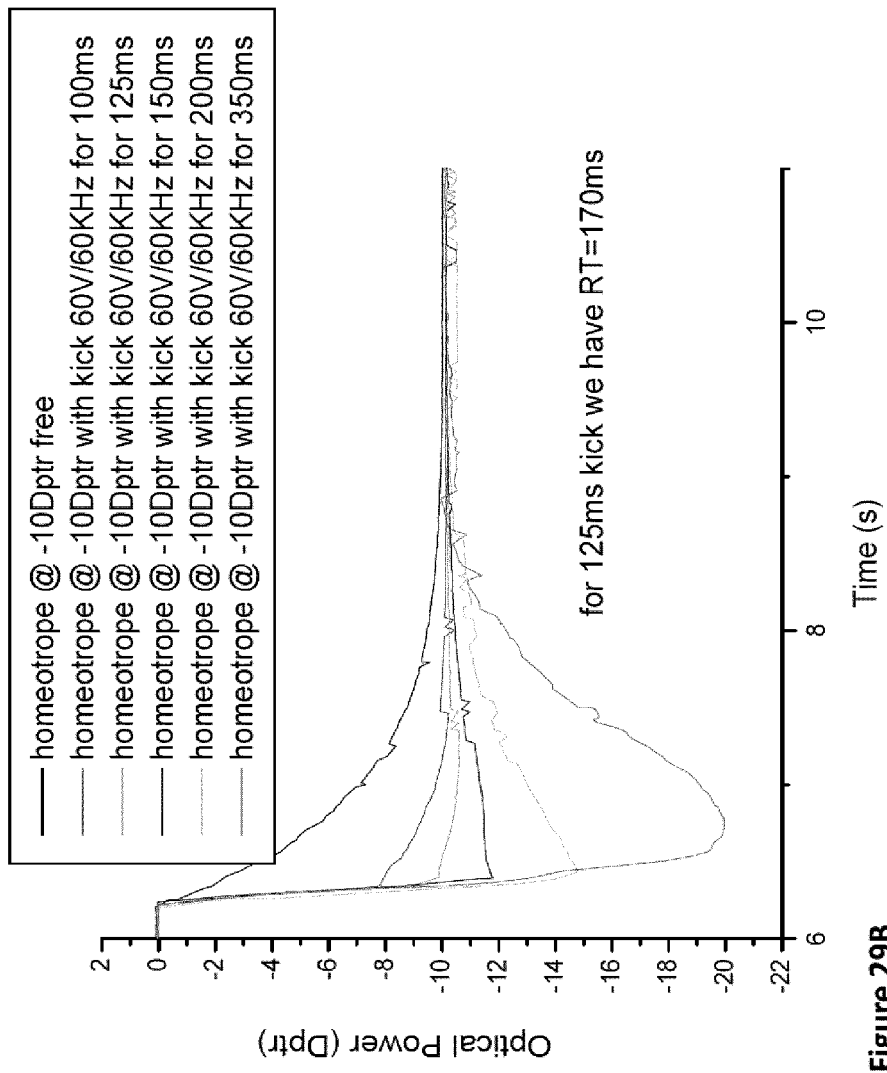

In accordance with the proposed solution, an optical power transition controller 1320 is provided implementing hyperdrive frequency kick functionality described herein above. In accordance with one implementation, transition controller 1320 can employ a lookup table for this purpose. Lookup table entries can include hyperdrive frequency kick parameters for example derived from calibrations (for example as illustrated in FIGS. 29A and 29B). In accordance with another implementation, the transition controller 1320 is configured to adaptively determine optical power transition parameters during use, for example by stepping up and stepping down through control drive signal parameters. Adaptively determining optical power transition parameters can provide self calibration functionality and self calibration results can be stored in the lookup table. Adaptive determination of optical power transition parameters can account for variations in manufacturing runs, TLCL geometry variations, temperature variations, component aging variations, etc.

The transition controller 1320 further implements intelligent decision making machine logic for example to implement the optical power transitions as described hereinabove with reference to FIG. 25. Transition controller 1320 is configured to operate on electrical drive signal parameters provided by the electric field controller 1310, for example passively allowing electric field controller 1310 steady state parameters to pass through and perform the optical power transition functionality upon detecting an optical power transition. In accordance with another embodiment, the transition controller 1320 is configured to perform the optical power transition in response to a focus change indication resulting from auto-focusing functionality for example in accordance with an auto-focus algorithm.

An electric field drive circuit 1312 converts the electrical parameters into at least one drive signal to be applied to the TLCL 1302. Those skilled in the art would appreciate that components 1308, 1310 and 1320, without limiting the invention, can be implemented using microcode executed on a microcontroller, while component 1312 can include voltage sources switched under the control of a microcontroller to provide a resulting drive signal of desired frequencies and RMS voltages. Such a microcontroller can be configured to obtain focus scores from the image sensor and determine drive signal parameters to operate the TLCL to change optical power towards best focus. For example best focus can be signaled by detecting a maximal focus score and/or best focus can be signaled by detecting a minimal focus score change below a threshold.

For certainty, the invention is not limited to the use of a single transient hyperdrive kick in frequency (and amplitude). With appropriate transition controller 1320 programming a number of transient drive signals can be employed.

Frequency signal generators are known, and only limited details are provided herein with respect to employing such a frequency signal generator to implement a TLCL control component of a tunable optical system. For example, in order to provide low power operation, a miniature frequency generator can include a voltage boost circuit and an "H" bridge circuit having several (4) MOSFETs. The power consumption such a circuit is estimated using typical efficiency numbers from commercially available components and found not to violate operational parameters for a handheld digital camera. The power dissipated by the MOSFET switches have three components; static power, dynamic power and load power. Static power is the sum of all biasing components. Dynamic power is the charge and discharge of the MOSFET gate capacitance and the load power is the power dissipated across the MOSFETs drain and source terminals (Imax*RDS(on)). Assuming the availability of a low voltage power source for controlling drive signal amplitude, voltage can be boosted by either using a switched capacitor ("charge pump") circuit or an inductive circuit. In either case the efficiencies for commercially available products are found to be similar and within operational parameters of miniature digital cameras. Inductive boost offers some advantages over the charge pump.

Implementations of a Fast Optical Power Transition TLCL

It will be appreciated that TLCL optical devices can be fabricated using layer-by-layer assembly and, preferentially, in a parallel way (many units simultaneously, called "wafer level"), the final product being obtained by singulation and, optionally, joining single TLCLs with operation axes (directors) in cross (orthogonal) directions to focus both orthogonal polarizations of light into full TLCLs.

For example, the full TLCL structure 500 can be configured to focus at infinity employing maximum optical power and at a closest focusing distance employing minimum optical power. Depending on whether the TLCL is configured as a positive lens or a negative lens, infinity focus or closest focus can correspond to maximum power drive or minimum power drive. The configuration may depend on factors such selected mode of driving the TLCL, etc.

Top and bottom alignment layers 112/114 can include Polyimide layers about 20 nm thick that are rubbed to yield surfaces which induce a liquid crystal ground state alignment with a low pre-tilt angle, for example 3°. For example, the liquid crystal layer 510 can be 5 to 30 microns thick, with larger thicknesses providing greater optical power. Thicker liquid crystal layers 510 tend to require higher operating temperatures and drive signal power.

The hole-patterned electrode 322 can be made of an opaque metal such as Aluminum (Al), or it can be made of Indium Tin Oxide (ITO) which is transparent. The thickness of the hole-patterned electrode 322 can be about 10 nm. Without limiting the invention, the hole-patterned electrode layer 322 can also be substantially optically hidden and thus would not interfere with the propagation of light through the optical device.

The weakly conductive layer 426 can have a thickness of about 10 nm. The frequency dependent (permitivity or complex dielectric) material of the WCL 426 can comprise a variety of materials such as, but not limited to, titanium oxide. Titanium oxide has semiconductor properties that change with applied drive signal frequency.

In the embodiment of FIG. 5, a hole-patterned electrode 522 and frequency dependent material 526 form a single variable conductivity layer 528 shared between two LC layers 510 reducing thickness.

The TLC lens can be refractive or diffractive.

In the above, extensive reference has been made to variable optical power TLCLs having unipolar optical power variability for example illustrated in FIGS. 10 and 11A. It is understood that TLCLs 300/400/500 can be manufactured or operated to exhibit both negative and positive optical power variability. For certainty, the invention is not limited unipolar TLCLs.

Figure 26:
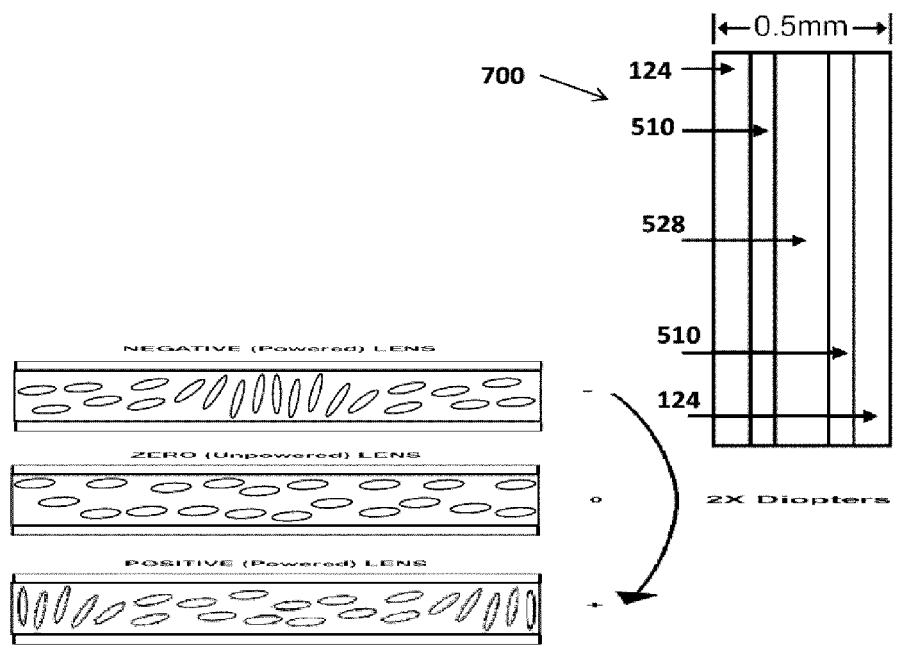
FIG. 26 is a schematic diagram illustrating a distribution of liquid crystal molecular orientations during bipolar operation of a tunable liquid crystal lens in accordance with the proposed solution.
Figure 27:
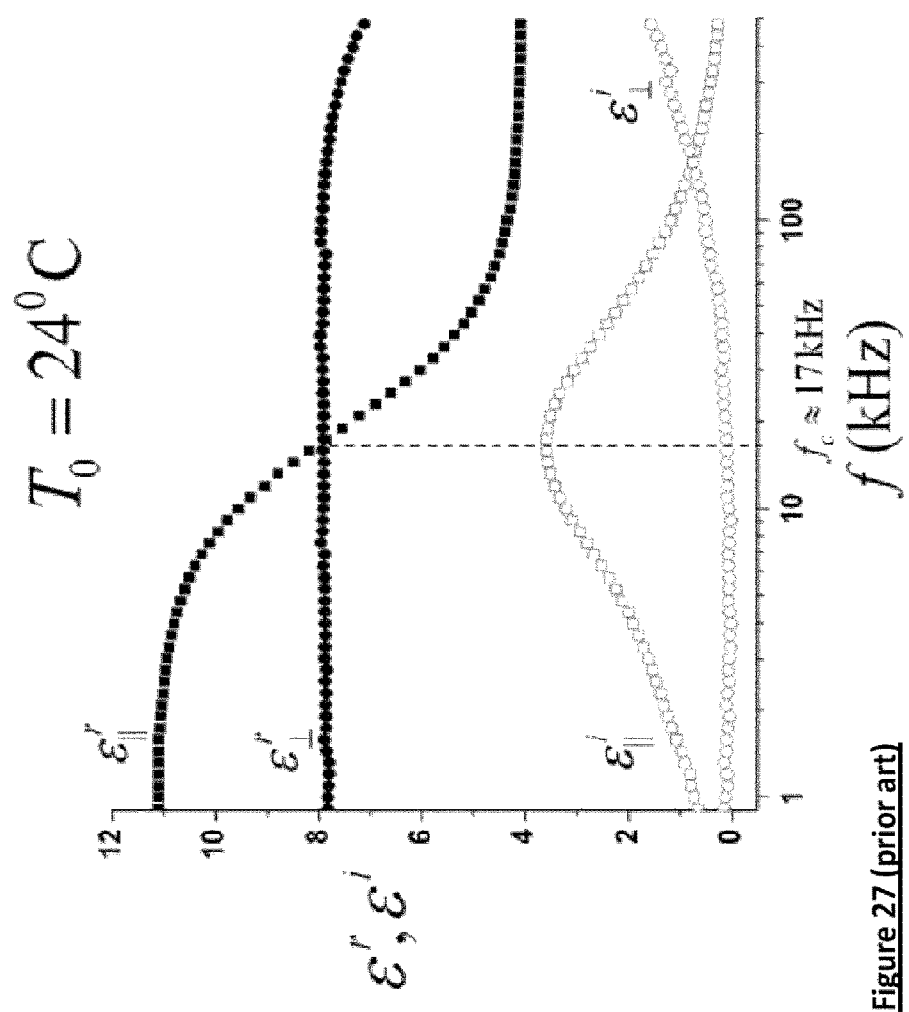
FIG. 27 is a schematic diagram showing a variation of real and imaginary components of the dielectric permitivity tensor of dual frequency liquid crystal material MLC2048 from EM Industries at 24° C.

FIG. 26 schematically illustrates bipolar operation of a LC layer 510. Co-pending commonly assigned U.S. Provisional Patent Application 61/441,647 entitled "Bipolar Tunable Liquid Crystal Lens Optical Device and Methods of Operating Thereof" filed 10 Feb. 2011 describes employing differential drive signals applied across full TLCL structures 700 for example shown in the inset of FIG. 26. Therefore, without limiting the invention, employing a bipolar TLCL 700 infinity focus can be provided by driving the TLCL at maximum optical power of one polarity, closest focus can be provided by driving the TLCL at maximum optical power of the other polarity. It is envisioned that a mixed optical power transition across both polarities can employ frequency hyperdrive while optical power of one polarity is varied in the relaxation direction with the remaining optical power transition in the opposite polarity progressing in the excitation direction.

Optical error correction of aberrations, astigmatism, coma, etc. can also be implemented employing a parametric TLCL structure having segmented electrodes. For example Tunable Liquid Crystal Lenses having a movable optical axis are described in co-pending commonly assigned International Patent Application PCT/CA/2010/002023 entitled "Image Stabilization and Shifting in a Liquid Crystal Lens" claiming priority from commonly assigned U.S. Provisional Patent Application 61/289,995 entitled "Image Stabilization And Shifting In A Liquid Crystal Lens" filed Dec. 13, 2009, the entirety of which is incorporated herein by reference. Commonly assigned U.S. Patent Application 61/410,345 entitled "Methods of Adjustment Free Manufacture of Focus Free Camera Modules" filed 4 Nov. 2010, which is incorporated herein by reference, describes accounting for overall optical system optical error/aberration during TLCL manufacture.

While implementations of the proposed solution have been described employing a single drive signal having a single variable frequency drive signal component, the invention is not limited thereto. A multitude of variable frequency drive signal components can be mixed together and applied simultaneously to create a desired profile for the electric field (via the frequency dependent material). In one implementation the multitude of frequencies combine to a produce transient hyperdrive frequency kick the potential distribution of which has a complex shape, for example addressing regions of the liquid crystal layer below the critical voltage Vcritic and regions of the liquid crystal layer above Vcritic. In another implementation the multitude of frequencies combine to produce a pulse width modulated signal for which the filing factor can be varied. The filling factor can be modified to change the amount of high frequency content in the signal.

Related International Patent Application WO 2010/022080 entitled "In Flight Autofocus System and Method" claiming priority from U.S. 61/089,821 filed 18 Aug. 2008, both of which are incorporated herein by reference, describe the use of a dual frequency liquid crystal layer in a TLCL employing a physical electric field spatial modulation structure. The structure imparts spatial modulation to each electric field component applied by a pair of drive signals characterized by frequencies across the crossover frequency. The superposition/combination of the spatially modulated electrical field components is employed to spatially modulate the orientation of the LC molecules across the aperture. The structurally imposed spatial modulation to all electrical fields, while providing some desirable optical power change characteristics, is less efficient in changing or erasing a lensing effect.

Figure 28:
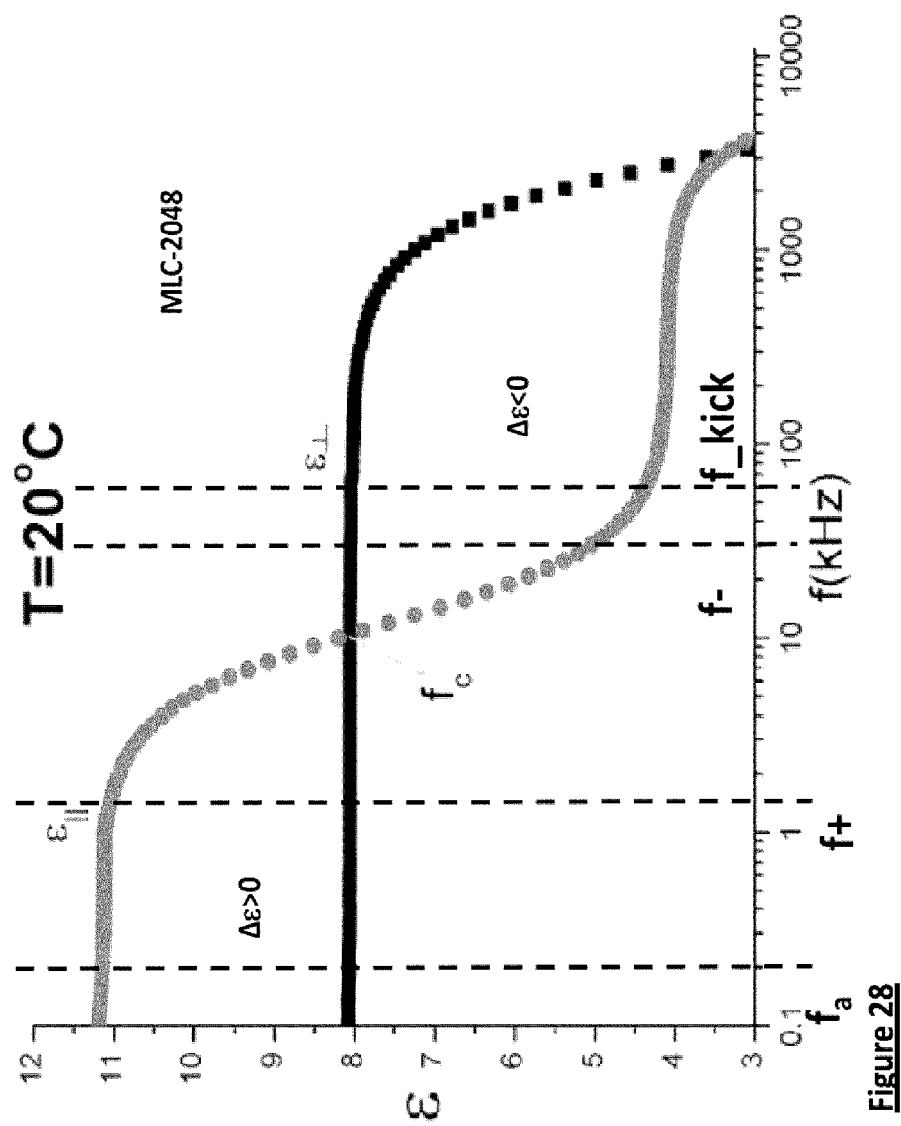
FIG. 28 is a schematic diagram illustrating a variation of real components of the dielectric permitivity tensor the dual frequency liquid crystal material MLC2048 from Merck at 20° C.

In accordance with another embodiment a dual frequency material is employed to improve optical power transitions as described in co-pending commonly assigned U.S. Provisional patent application 61/422,115 entitled "Fast Tunable Liquid Crystal Optical Apparatus and Method of Operation" filed 10 Dec. 2010 which is incorporated herein by reference. A dual frequency liquid crystal material exhibits dielectric anisotropy which is positive for drive signals having low frequencies (e.g., 1 kHz at room temperature) and negative for high driving frequencies (e.g., above a crossover frequency f_c=17 kHz at room temperature 24° C.). This LC material has physical properties wherein the long axes of molecules are attracted by an electric field at low frequencies, and are repulsed by the electric field at high frequencies. FIG. 28 illustrates measured real ($\in'$) and imaginary ($\in'$) parts of the dielectric permitivity tensor of MLC2048 in the frequency range 1 to 500 kHz at 24° C., wherein error bars are smaller than the size of the data points. This dielectric anisotropy makes it possible to further accelerate LC molecular reorientation in a TLCL 400 in what would otherwise have been the relaxation direction.

It has been discovered that the hysteresis exhibited by dual frequency liquid crystal materials can be exploited in a tunable liquid crystal lens optical device to provide improved optical power change speeds in transitioning between low optical power and high optical power states.

It has been further discovered that faster auto-focus acquisition may be achieved by employing continuous TLCL excitation control in accordance with a scheme driving of the TLCL under excitation conditions in both optical power change directions.

At zero frequency and zero Vrms amplitude, the LC layer 510 is governed by the orienting layers 112 and 114. LC molecules are substantially aligned, for example at 3°. The index of refraction of the LC layer 510 has no variability across the aperture. No lensing is provided by the LC layer 510, and therefore the TLCL 400 provides zero optical power. This unpowered (U-LOP) ground state illustrated in FIG. 4 is a passive state governed by the physical properties of the geometry. At very low angles, for example lower than 4°, little torque is applied to the LC molecules by the electric field, and the response has nonlinear effects as a lens is formed.

With reference to FIG. 28, for a given (low) Vrms amplitude above an empirically determined threshold, an initial application of a relatively low frequency f_a drive signal creates an effective uniform electrode profile as charge penetrates across (into) the aperture. A corresponding uniform electric field profile, created due to extensive charge penetration into the frequency dependent layer 426, lifts LC molecules across the LC layer 510 out of the unpowered ground state to have an initial orientation. Substantially all LC molecules will be reoriented to have a common angular orientation, for example 10° to 15° instead of the pre-tilt angle of about 3°. As described herein above, LC molecules having a common angular orientation, results in an LC layer 510 having a low refractive index variability. Substantially no lensing is provided by the LC layer 510, and therefore the TLCL 400 has negligible optical power. This state is an excited state governed by the properties of the variable conductivity layer including electrode 322 geometry and frequency dependent layer 426 charge mobility as described herein above. This initial excitation state frequency f_a is shown in FIG. 28 and may vary with material properties of the frequency dependent layer, Vrms and TLCL geometry. As an example, for low Vrms amplitudes a usable low frequency f_a can be as low as 100 Hz.

A drive signal component of frequency f+, for example 1 kHz having an amplitude preferably between 14 to 40 Vrms, more specifically between 20 to 36 Vrms is employed to operate the DF-LC TLCL 400. This low frequency drive signal component contributes a flat electrical field component to (raise) lift molecules following initial excitation. It has been found that, simultaneously driving the DF-LC TLCL 400 with a second drive signal component of frequency f−, for example 30 kHz preferably having an amplitude between 5 to 50 Vrms, more specifically between 10 to 50 Vrms, improved TLCL driving conditions can be provided. This high frequency drive signal component contributes a spatially modulated electrical field component to (lower) depress molecules.

When the high frequency drive signal component competes with the low frequency drive signal component, a nonuniform profile of the electric field develops across the LC layer 510 and the LC molecules have a non-uniform angular orientation. In turn the variability of the refractive index across the LC layer 510 is non-uniform and the LC layer 510 provides a corresponding lensing effect. As described herein, as the Vrms amplitude of the drive signal component increases, charge penetration into the frequency dependent layer 426 gives the electric field a corresponding lensing profile. Surprisingly, since all of the LC molecules were prealigned by the application of the low frequency f_a, no disclinations occur (persist) as the lens profile is expressed and the LC molecules efficiently respond to the electric field greatly reducing TLCL lens aberrations. While the experimental data relates to a negative lensing effect, the invention is not intended to be limited to negative optical power TLCL lenses. The invention is not limited to the use of different f_a and f+ frequencies, a single frequency can be employed.

By changing Vrms amplitudes and frequencies f+/f− of the combined driving signal, the profile of the electric field can be actively shaped and therefore the LC alignment profile. By appropriately choosing drive signal parameters (Vrms', f+/f−) the creation and the erasure of the lensing effect can both be performed under excitation conditions. For example, if the Vrms amplitude of the low frequency component f+ dominates the Vrms amplitude of the high frequency component f−, then the LC molecules will be actively attracted towards the electric field providing a lensing effect, however extreme dominance causes the LC molecules to uniformly align leading to no lensing effect (Optical Power=0 Diopters). If in contrast the Vrms amplitude of high frequency component f− dominates, then the peripheral molecules will be progressively actively repulsed to create a lens.

Within a drive signal Vrms range, between relatively low Vrms and relatively moderately high Vrms, the Vrms of either driving signal may be varied to provide a gradually changing optical parameter of the DF-LC layer 510 and therefore to provide a gradually changing optical power of the TLCL. The steady state optical power response is typically non-linear. It is emphasized that the reachable maximum optical power is a consequence of a particular TLCL geometry, particular frequency dependent material selection, particular dual-frequency liquid-crystal material selection, etc. Beyond a maximum Vrms amplitude, the applied drive signal has a choking effect on charge flow in the frequency dependent layer 426 and the shape of the electric field applied to LC layer 510 is controlled by other TLCL properties, such as but not limited to: hole-patterned electrode 322 geometry. In the case of the TLCL 400, optical power begins to weaken gradually beyond a maximum optical power. For example, increasing the Vrms amplitude of the f− drive signal beyond 30V while the f+ drive signal amplitude is 20V. Both Vrms dominant drive states are excitation states and the TLCL can achieve relatively quick optical property (optical power) transition.

While the operation of the DF-LC TLCL lens has been described with respect to a single polarization half TLCL, for example having a structure illustrated in FIG. 4, it is understood that a full TLCL, for example having a structure illustrated in FIG. 5 can be driven in the same way to provide a full polarization TLC lens. Low alignment frequencies in the 100 Hz range and maximum optical power in the 30 kHz range advantageously place the necessary frequency generator components into the manufacturable and miniaturizable realm.

In accordance with the proposed solution, FIGS. 29A and 29B illustrate experimentally measured dynamic transitions in tuning dual frequency liquid crystal lens optical power with drive signal root means square voltage amplitude at constant frequency. While the experimental results are provided for a negative TLC lens, the invention is not limited thereto; with appropriate changes in TLCL geometry the results apply equally well to a positive lens.

In particular FIG. 29A illustrates a 10 diopter dynamic transition towards 0 (zero) optical power to achieve homeotrop alignment at room temperature. Table 1 summarizes experimental results showing measured times to achieve homeotrop alignment across 10 diopters by applying a drive signal component having f+=2 kHz of various Vrms amplitudes. A shortest homeotrop alignment time of 163 ms is achieved by employing Vrms amplitude of 80V. At f+=2 kHz, the frequency dependent layer 426 allows significant charge mobility which combined with a 80 Vrms amplitude effectively excites the DF-LC TLCL with a substantially uniform electric field to change optical power, in this case to reduce the optical power (reduce absolute optical power).

FIG. 29B illustrates a 10 diopter dynamic transition to increase a lensing effect. Table 2 summarizes experimental results showing measured times to achieve a 10 diopter change by applying a pulsed drive signal component having f−=60 kHz and 60 Vrms amplitude. The low frequency f+ drive signal component is temporarily removed, while applying a high frequency f− pulse of various durations (widths) before reestablishing both low f+ and high f− frequency drive signal components at appropriate steady state Vrms amplitudes of the end state. The shortest optical power change is achieved in about 170 ms. At f−=60 kHz, the frequency dependent layer 426 has a low charge mobility however the 60 Vrms amplitude dominates which effectively excites the DF-LC TLCL with a substantially uniform electric field to change optical power, in this case to increase the optical power (increase absolute optical power).

These experimental results illustrate an optical power change speed improvement from 1301+1820=3121 ms without employing the proposed solution, to 163+171=334 ms by employing the proposed solution.

TABLE 1

| Time to Homeotrop Alignment (ms) | f+ = 2 kHz Vrms (V) |
|---|---|
| 1301 | 28 |
| 647 | 48 |
| 421 | 50 |
| 315 | 60 |
| 243 | 70 |
| 163 | 80 |
| 168 | 90 |

TABLE 2

| Time to Optical Power Setting (ms) | f- = 60 kHz Vrms 60 V Pulse Duration (ms) |
| --- | --- |
| 1820 | 0 |
| 713 | 100 |
| 171 | 125 |
| 1496 | 150 |
| 2116 | 200 |
| 2522 | 350 |

It will be appreciated that the tunable LC lens optical device 300/400/500 can be fabricated using layer-by-layer assembly and, preferentially, in a parallel way (many units simultaneously, called "wafer level"), the final product being obtained by singulation and, optionally, joining lenses with operation axes (directors) in cross directions to focus both orthogonal polarizations of light.

While the proposed solution has been described with reference to using a drive signal having a single frequency, the invention is not limited to the use of a single frequency. A multitude of frequencies may be mixed together and applied simultaneously to create a desired profile for the electric field via the frequency dependent material. In one implementation the multitude of frequencies combine to produce a pulse width modulated signal for which the filing factor may be varied. The filling factor may be modified to change the amount of high frequency content in the signal.

While the proposed solution has been described with reference to using a single weakly conductive layer having a frequency dependent material, the invention is not limited to the use of a single frequency dependent material. A number of different frequency dependent materials, not necessarily positioned at a single location relative to the conductive electrodes 124 and 322/522, may be employed in order to shape the electrical field of the optical device. As well a frequency dependent layer having a frequency dependent charge mobility that varies along a gradient therethrough may be employed.

While the proposed solution has been described with reference to a TLC lens, without limiting the invention, the proposed solution may be applied to a multitude of optical devices including, for example, a beam steering device, an optical shutter, etc.

It will be appreciated that one TLCL can provide variable focusing, while two TLCLs can provide a zoom lens.

Those skilled in the art will recognize that the various principles and embodiments described herein may also be mixed and matched to create a TLC lens optical devices with various auto-focus characteristics. Electrodes of different shapes and configurations; frequency dependent materials of different types, shapes and positions; dual frequency liquid crystal materials of different types; different drive signal generators; etc. can be used in combination to create a TLC lens optical device with a particular characteristic. The TLC lens devices may be frequency controlled, voltage controlled, or controlled by a combination of the two.

It is to be understood that the present invention is not limited to the embodiment(s) described above and illustrated herein. For example, references to the present invention herein are not intended to limit the scope of any claim or claim term, but instead merely make reference to one or more features that may be eventually covered by one or more claims. Materials, processes and numerical examples described above are exemplary only, and should not be deemed to limit the claims. Components shown and described separately can be combined, and vice versa (e.g. the imaging signal processor and the TL driver can be two subcomponents of a single device).

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. A camera module comprising:
   a tunable liquid crystal lens including a liquid crystal layer exhibiting a liquid crystal molecular orientation distribution in response to at least one drive signal component, said liquid crystal molecular orientation distribution causing a light ray deviation in a light beam passing through said liquid crystal layer imparting an optical power;
   an optical power transition controller configured to selectively drive said liquid crystal layer using at least one transient drive signal component configured to temporarily apply a transient potential distribution across said liquid crystal layer before driving said liquid crystal layer using at least one final steady state drive signal component causing said liquid crystal layer to exhibit a desired final steady state optical power if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said desired final steady state optical power, said selectively driving said liquid crystal layer using said at least one transient drive signal component being responsive to said optical property transition controller detecting a change in said provided at least one steady state drive signal component; and
   a focus controller configured to cause the application of said at least one steady state drive signal component across said liquid crystal layer.

2. A camera module as claimed in claim 1, said transient potential distribution further comprising a transient spatially modulated non-zero non-saturated potential distribution.

3. A camera module as claimed in claim 1, further comprising a control drive signal circuit providing said at least one steady state drive signal component as directed by said focus controller.

4. A camera module as claimed in claim 1, said tunable liquid crystal lens further comprising: an electric field shaping control layer and a transparent electrode layer sandwiching said liquid crystal layer for applying an electric field across said liquid crystal layer in response to said at least one drive signal component, said electric field shaping control layer being configured to spatially modulate said electric field, said spatially modulated electric field inducing said spatially modulated director orientation in said liquid crystal layer, said electric field shaping control layer configured to provide an aperture defining an optical axis for said light beam to pass through said liquid crystal layer.

5. A camera module as claimed in claim 4,
   each of said transient drive signal components having a frequency; and
   said electric field shaping control layer further comprising a transparent weakly conductive layer filling at least said aperture, said weakly conductive layer including frequency dependent material configured to cause said weakly conductive layer to function as a frequency-responsive electric field gradient control layer for shaping said spatially modulated electric field.

6. A camera module as claimed in claim 5, said frequency dependent material being further configured to allow frequency dependent charge mobility within said weakly conductive layer when said electric field shaping control layer is driven with said at least one drive signal component signal having said frequency, said frequency dependent charge mobility causing said electric field shaping control layer to apply a drive signal frequency specific effective electric field profile to said liquid crystal layer, a low frequency drive signal applying an electric field having a substantially flat spatial potential distribution, a high frequency drive signal applying a spatially modulated electric field having a spatially variant potential distribution, said spatially variant potential distribution inducing said spatially modulated director orientation in said liquid crystal layer.

7. A camera module as claimed in claim 1, said liquid crystal layer comprises a dual frequency liquid crystal material, said dual frequency liquid crystal material exhibiting a dielectric anisotropy about a crossover frequency at a corresponding temperature wherein liquid crystal molecular directors are attracted to said applied electric field using a drive signal component of a frequency lower than said crossover frequency and repulsed by said electric field applied using a drive signal component of a frequency higher than said crossover frequency.

8. A camera module as claimed in claim 1, said dual frequency liquid crystal material comprising MLC-2048.

9. A camera module as claimed in claim 1, wherein selectively driving said liquid crystal layer responsive to detecting said optical power change, said optical power transition controller being further configured to detect an optical power transition in a relaxation direction.

10. A camera module as claimed in claim 1, said tunable liquid crystal lens further comprising a pair of liquid crystal orienting layers sandwiching said liquid crystal layer therebetween to form a liquid crystal cell, each of said orienting layers including a coating rubbed in a predetermined direction to induce liquid crystal molecular alignment at a low pretilt angle in a ground (unpowered) state, said tunable liquid crystal lens imparting said optical power in respect of a single light polarization of said light beam, said camera module further comprising a dual liquid crystal layer structure configured to impart complimentary optical power for two orthogonal light polarizations.

11. A camera module as claimed in claim 1, further comprising at least one image acquisition component configured to acquire an image through said tunable liquid crystal lens, said focus controller being further configured to determine a focus score of said acquired image.

12. A method of operating a tunable optical device to cause an optical property transition, the method comprising:
selectively applying a drive signal sequence of at least two drive signal components including using at least one transient drive signal configured to temporarily apply a transient potential distribution across a liquid crystal layer before driving said liquid crystal layer using at least one final steady state drive signal causing said liquid crystal layer to exhibit a desired final steady state spatially modulated optical property variation if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said final desired steady state.

13. A method as claimed in claim 12, temporarily applying said transient potential distribution further comprises temporarily applying a transient spatially modulated non-zero non-saturated potential distribution.

14. A method as claimed in claim 12, further comprising applying an initial low frequency drive signal component to align liquid crystal molecular directors at an initial low pretilt excitation angle.

15. A method as claimed in claim 12, selectively applying said at least one transient drive signal component being responsive to detecting a change in at least one steady state drive signal component applied.

16. A method as claimed in claim 12, each of said transient drive signal components having a frequency, said tunable optical device having an electric field shaping control layer and a transparent electrode layer sandwiching said liquid crystal layer for applying an electric field across said liquid crystal layer in response to said at least one drive signal component, said electric field shaping control layer being configured to spatially modulate said electric field, said spatially modulated electric field inducing said spatially modulated director orientation in said liquid crystal layer, said electric field shaping control layer defining an aperture and comprising a transparent weakly conductive layer filling at least in said aperture, said weakly conductive layer including frequency dependent material causing said weakly conductive layer to function as a frequency-responsive electric field gradient control layer shaping said spatially modulated electric field.

17. A method as claimed in claim 16, said liquid crystal layer comprises a dual frequency liquid crystal material, said dual frequency liquid crystal material exhibiting a dielectric anisotropy about a crossover frequency at a corresponding temperature, the method further comprising:
applying a drive signal component of a frequency lower than said crossover frequency causing liquid crystal molecular directors to be attracted to said applied electric field; and
applying a drive signal component of a frequency higher than said crossover frequency causing liquid crystal molecular directors to be repulsed by said electric field.

18. A method as claimed in claim 15, detecting said change further comprising detecting a change in said optical property in a relaxation direction.

19. A method as claimed in claim 17, further comprising:
extinguishing said drive signal component having said frequency lower than said crossover frequency and applying said drive signal component having said frequency higher than said crossover frequency for a predetermined duration at a predetermined amplitude to cause an optical power change; and
reestablishing both drive signal components after said predetermined duration at frequencies and amplitudes corresponding to a desired end optical power value.

20. An auto-focus method for acquiring focus in an imaging system, the method comprising:
selectively applying a drive signal sequence of at least two drive signal components including using at least one transient drive signal component configured to temporarily apply a transient potential distribution across a liquid crystal layer of a tunable liquid crystal lens before driving said liquid crystal layer using at least one final steady state drive signal causing said liquid crystal layer to exhibit a desired final steady state spatially modulated optical property variation if a substantial portion of said liquid crystal layer is to be subject to a final potential having a magnitude lower than a critical potential else driving said liquid crystal layer using said at least one final steady state drive signal component directly, said transient spatially modulated potential distribution being of a desired tendency toward said desired final steady state, said liquid crystal layer exhibiting a liquid crystal molecular orientation distribution in response to said at least one drive signal component, said liquid crystal molecular orientation distribution causing a light ray deviation in a light beam passing through said liquid crystal layer imparting an optical power;

obtaining a focus score from an image generated by said light beam;

determining parameters for said drive signal components to cause said optical power to change; and repeating the method.

21. An auto-focus method as claimed in claim 20, temporarily applying said transient potential distribution further comprises temporarily applying a transient spatially modulated non-zero non-saturated potential distribution.

22. An auto-focus method as claimed in claim 20, wherein selectively applying said drive signal sequence further comprising using said at least one transient drive signal component configured to temporarily apply said transient potential distribution across said liquid crystal layer when said optical power transition is in a relaxation direction.

23. An auto-focus method as claimed in claim 20, said determining parameters further comprising determining parameters for said drive signal components to cause the focus score to increase following obtaining at least two focus scores.

* * * * *